United States Patent [19]

Struble

[11] Patent Number: 5,657,550

[45] Date of Patent: *Aug. 19, 1997

[54] HAND-HELD GAP AND CONTOUR MEASURING GAUGE

[75] Inventor: James E. Struble, Eaton Rapids, Mich.

[73] Assignee: JS Research and Development, Inc., Eaton Rapids, Mich.

[*] Notice: The term of this patent shall not extend beyond the expiration date of Pat. No. 5,551,162.

[21] Appl. No.: 543,178

[22] Filed: Oct. 12, 1995

Related U.S. Application Data

[63] Continuation-in-part of Ser. No. 321,969, Oct. 12, 1994, Pat. No. 5,561,162.

[51] Int. Cl.$^6$ .................................................. G01B 7/14
[52] U.S. Cl. .............................. 33/548; 33/544.4; 33/546; 33/613
[58] Field of Search .......................... 33/1 N, 1 PT, 33/187, 194, 501.05, 533, 542, 544.4, 546, 548, 551, 552, 556, 557, 558, 559, 560, 600, 613, 645, 783, 784, 832, 833

[56] References Cited

U.S. PATENT DOCUMENTS

| | | |
|---|---|---|
| 3,733,704 | 5/1973 | Farabaugh . |
| 3,855,708 | 12/1974 | Tann et al. . |
| 4,221,053 | 9/1980 | Bobel, II et al. . |
| 4,265,026 | 5/1981 | Meyer .......................... 33/542 |
| 4,314,406 | 2/1982 | Barnes . |
| 4,345,380 | 8/1982 | Vis . |
| 4,473,952 | 10/1984 | Mariani ........................ 33/542 |
| 4,606,129 | 8/1986 | Barrowman et al. ......... 33/613 |
| 4,731,935 | 3/1988 | Struble . |
| 5,551,162 | 9/1996 | Struble ........................ 33/613 |

FOREIGN PATENT DOCUMENTS

| | | | |
|---|---|---|---|
| 1091817 | 4/1955 | France ................................ 33/544.4 |
| 1538021 | 1/1990 | U.S.S.R. ............................ 33/544.4 |
| WO 90/01672 | 2/1990 | WIPO . |

Primary Examiner—G. Bradley Bennett
Attorney, Agent, or Firm—MacMillan, Sobanski & Todd

[57] ABSTRACT

A device for measuring the gap between the opposed facing surfaces of two adjacent parts, and simultaneously measuring the contour between outwardly facing surfaces of the parts. A gap measuring element is mounted to be movable along a first path relative to a first reference member carried by the main body. The first reference member is selectively engagable with one of the parts. The gap measuring element is insertable into the gap for engagement with the other of the parts. The gap measuring element is coupled to a transducer for generating a signal representative of the relative position of the gap measuring element along its path. The signal is proportional to the gap between the opposed facing surfaces of the parts. Additionally, a contour measuring element is mounted to be movable along a second path relative to a second reference member carried by the main body. The second reference member is selectively engagable with the outwardly facing surface one of the first and second parts. The contour measuring element is engagable with the outwardly facing surface of the other of the first and second parts. The contour measuring element is coupled to a transducer for generating a signal representative of the relative position of the contour element along the path, the signal being proportional to the contour of the adjacent outwardly facing surfaces. A calibration block and an adjustable zero block which may be used to prepare the measuring device for taking gap and contour measurements are also disclosed.

40 Claims, 30 Drawing Sheets

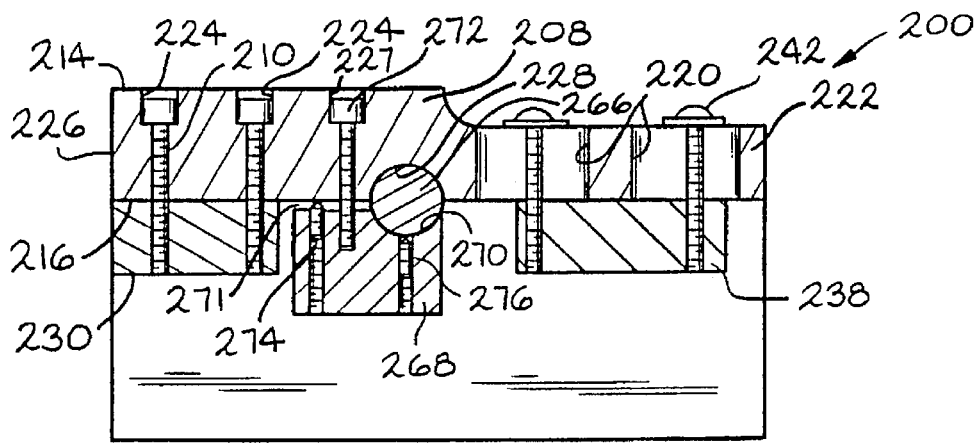
FIG. 19
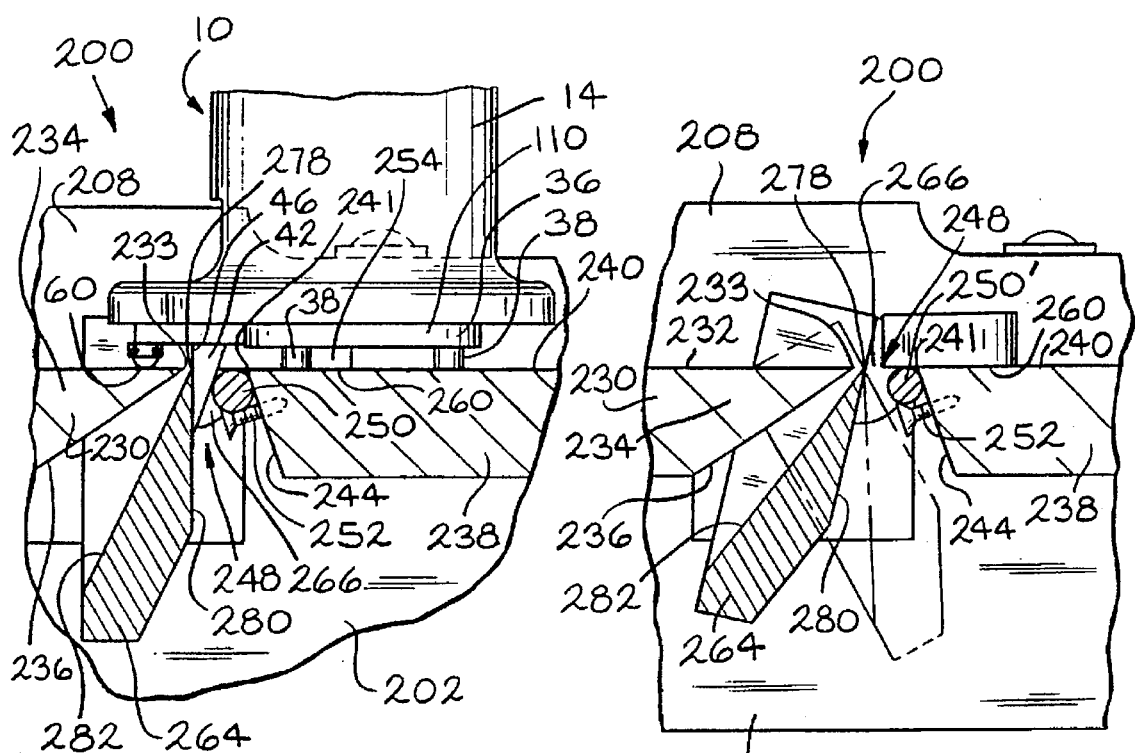
FIG. 20
FIG. 21

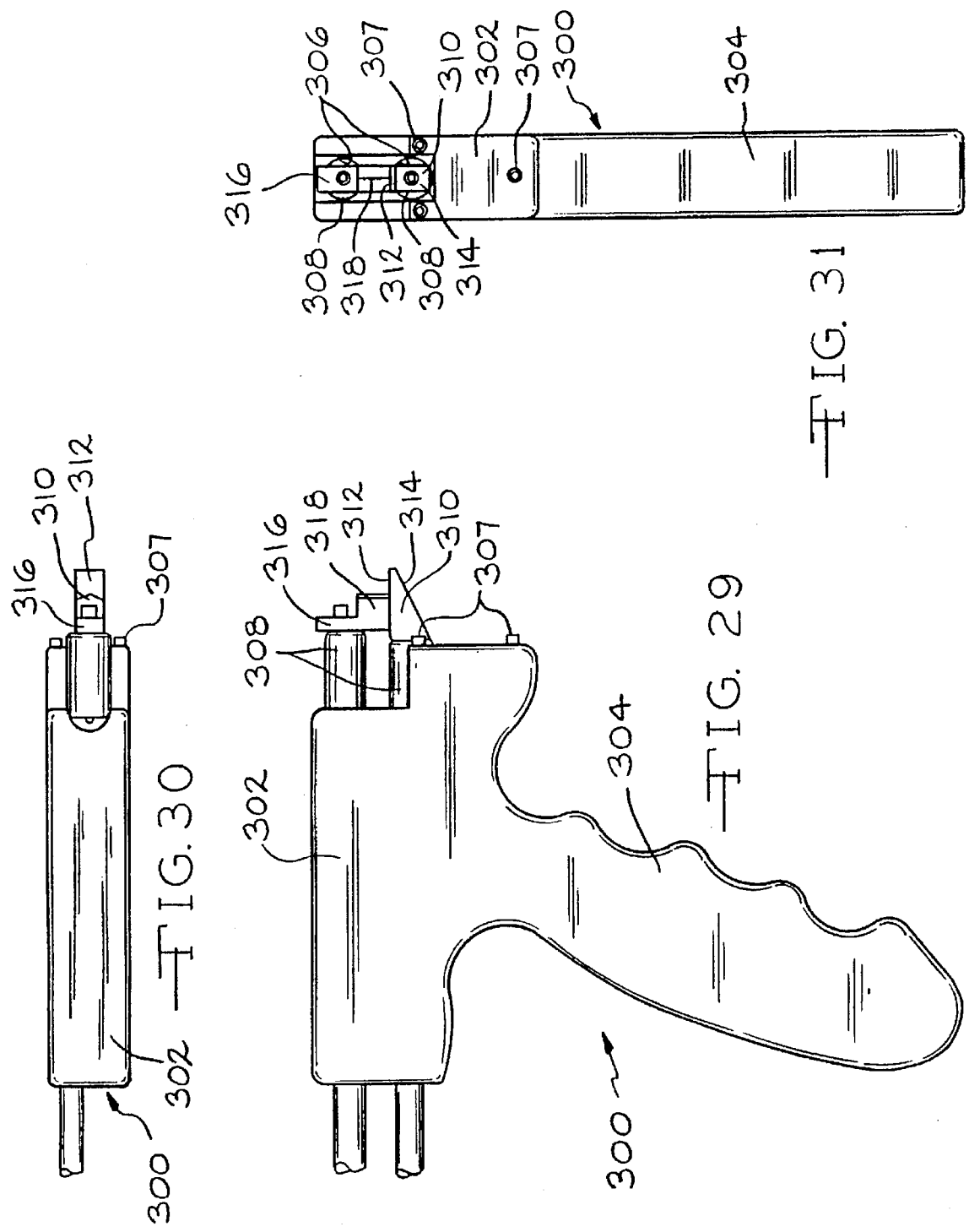

HAND-HELD GAP AND CONTOUR MEASURING GAUGE

This application is a continuation-in-part of application Ser. No. 08/321,969 filed on Oct. 12, 1994, now U.S. Pat. No. 5,55 1,162.

BACKGROUND OF THE INVENTION

This invention relates in general to measuring instruments and in particular to hand-held transducer gauge devices for taking contour (flushness) and gap measurement readings of two adjacent parts.

In manufacturing operations there is often a need to measure the gap between two adjacent parts as well as to measure the flushness or contour of surfaces of the parts in order to inspect the effect of previous manufacturing operations, or to insure the proper position of one part relative to another. For example, it may be desirable to check the installation of the hood on an automobile by checking, at various locations., the gap between the hood and the adjacent fender of the automobile. Additionally, it may be desirable to measure the vertical alignment of the hood with the adjacent fender of the automobile, to ensure hood is flush with the adjacent portion of the fenders. Such a measurement of flushness is also known as a contour measurement.

A variety of gauging devices are available for making these measurements, ranging in complexity from a hand-held ruler to automatic probes controlled by servo-systems and providing digital outputs of their measured positions.

SUMMARY OF THE INVENTION

This invention relates to a device for measuring the gap between the opposed facing surfaces of two adjacent parts, and simultaneously measuring the contour between outwardly facing surfaces of the parts. The device is preferably hand-held, and has a main body with a gap measuring element supported relative to the main body. The gap measuring element is mounted to be movable along a first path relative to a first reference member carried by the main body. The first reference member is selectively engagable with one of the parts. The gap measuring element is insertable into the gap for engagement with the other of the parts. The gap measuring element is coupled to a transducer for generating a signal representative of the relative position of the gap measuring element along its path. The signal is proportional to the gap between the opposed facing surfaces of the parts. In a preferred embodiment the gap measuring element is wedge-shaped and engages both of the opposed facing surfaces while the first reference member engages an outwardly facing surface of one of the parts.

A contour measuring element is also supported relative to the main body. The contour measuring element is mounted to be movable along a second path relative to a second reference member carded by the main body. The second reference member is selectively engagable with the outwardly facing surface of one of the first and second parts. The contour measuring element is engagable is with the outwardly facing surface of the other of the first and second parts. The contour measuring element is coupled to a transducer for generating a signal representative of the relative position of the contour element along the path, the signal being proportional to the contour of the adjacent outwardly facing surfaces.

A zero block which may be used to prepare the measuring device for taking gap and contour measurements will preferably include provisions for forming an adjustable gap, varying the angle between two faces thereof, and varying the radius at an edge of the gap.

Various objects and advantages of this invention will become apparent to those skilled in the art from the following detailed description of the preferred embodiment, when read in light of the accompanying drawings.

BRIEF DESCRIPTION OF THE DRAWINGS

FIG. 19 is a vertical sectional view of the zero block taken along the lines 19—19 of FIG. 14.

FIG. 20 is an enlarged partial vertical sectional view of the zero block with the measuring device of FIG. 1 positioned thereon to take gap and contour measurements.

FIG. 21 is an enlarged partial vertical sectional view of the zero block illustrating the adjustable face angle and adjustable radius features thereof.

FIG. 29 is a side view of another embodiment of a hand-held gap and contour measuring device according to the invention.

FIG. 30 is a top view of the measuring device illustrated in FIG. 29.

FIG. 31 is an end view of the measuring device illustrated in FIG. 29.

DETAILED DESCRIPTION OF THE PREFERRED EMBODIMENT

Preliminarily, it should be noted that certain terms used herein, such as "upper", "lower", "top", "bottom", "distal", "proximal", "clockwise", "counterclockwise", "front", "back", and "side", are used to facilitate the description of the preferred embodiment of the invention. Unless otherwise specified or made apparent by the context of the discussion, such terms should be interpreted with reference to the figure under discussion. The term "distal" should is be taken to mean the portion of the component under discussion which is normally closest to the surface being measured, and thus normally most distant from the user holding the measuring device in an operating position. Similarly, the term "proximal" should be taken to mean the portion of the component under discussion which is normally farthest from the surface being measured, and thus normally closest the user holding the measuring device in an operating position. Such terms are not intended as a limitation on the position in which the device may be used. Indeed, it is contemplated that the device may be easily hand-held in any desired orientation for use.

Refining now to the drawings, there is illustrated in FIGS. 1 through 5 a hand-held gap and contour measuring device 10. The measuring device 10 includes a main body 12 having a distal base 14 and a proximal head 16. As used in this application, the distal portion of the measuring device 10 means the portion of the measuring device 10 which is contemplated to generally be farther away from the viewpoint of an operator during use of the measuring device 10. Similarly, the proximal portion oft he measuring device 10 means the portion which will normally be seen by an operator to be the closer of two longitudinally separate portions of the measuring device 10. Thus, it is anticipated that the measuring device 10 will most frequently be held in a manner such that the head 16 is somewhat closer, in the operator's field of view, than the base 14, although it is recognized that the measuring device 10 may be held otherwise for convenience of the operator in a particular situation.

Figure 13:
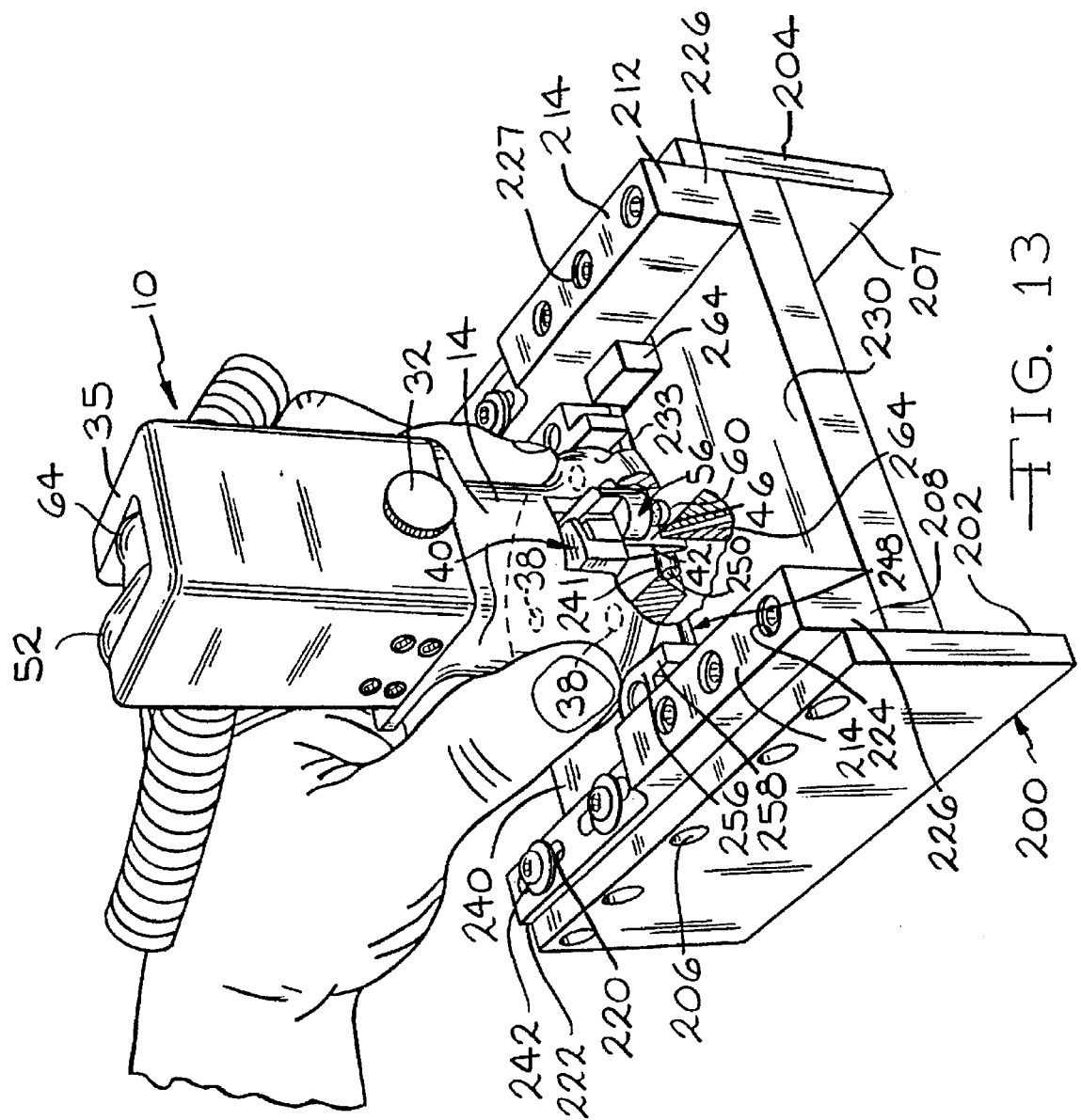
FIG. 13 is a perspective view of a zero block which may be used to prepare the measuring device illustrated in FIG. 1 for taking gap and contour measurements.
Figure 14:
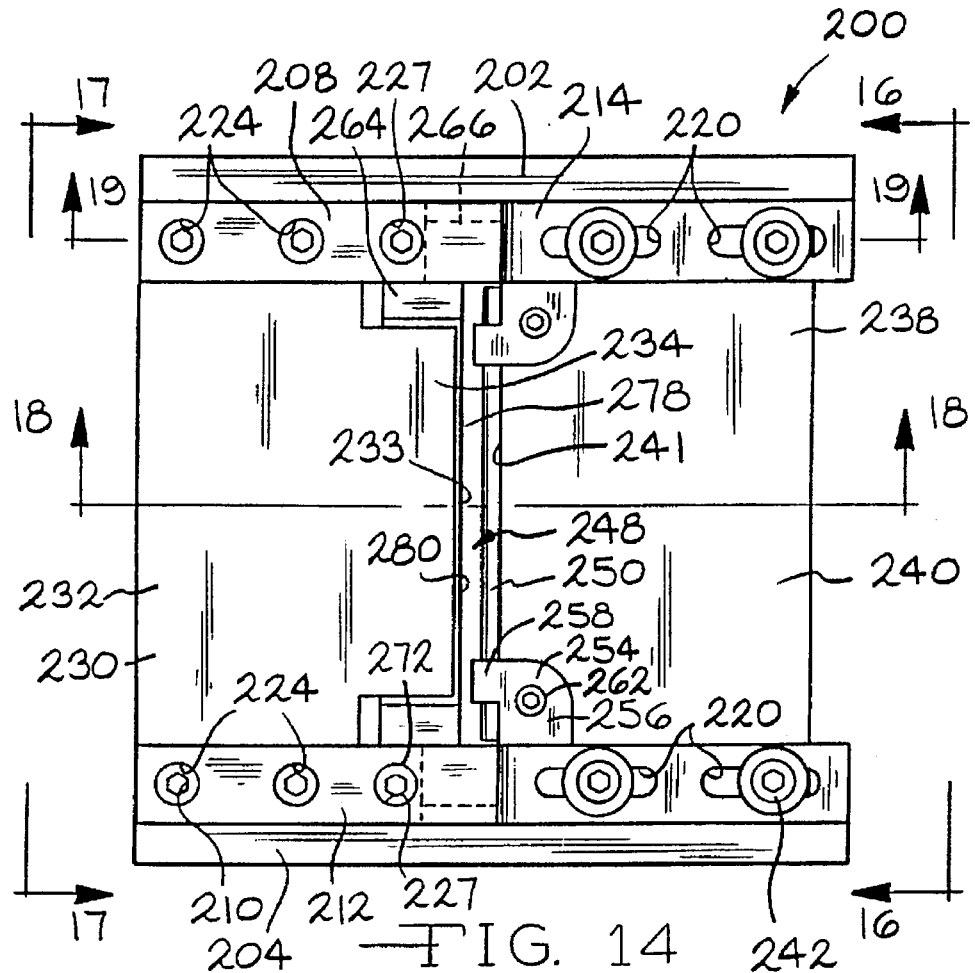
FIG. 14 is a plan view of the zero block illustrated in FIG. 13.
Figure 15:
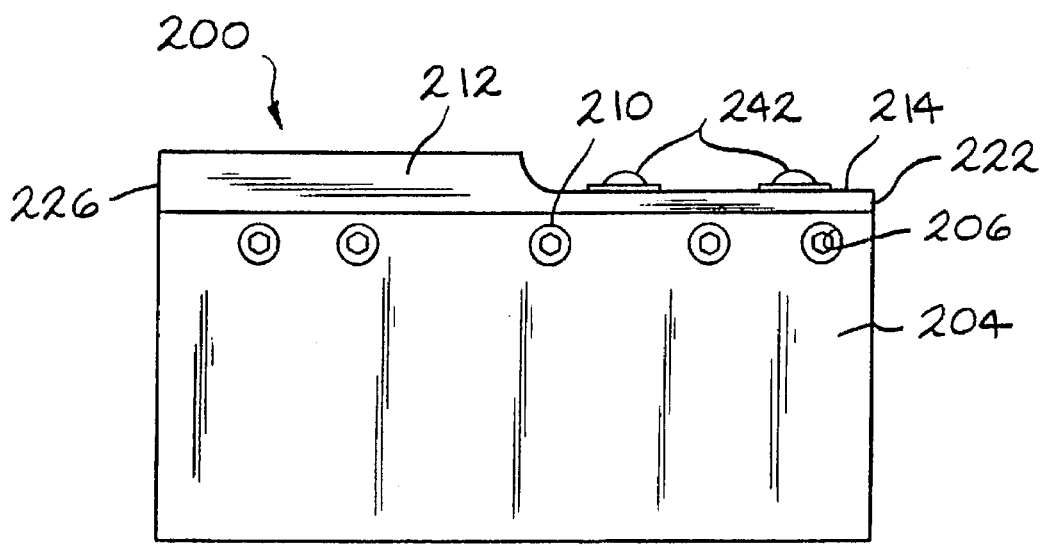
FIG. 15 is a side view of the zero block illustrated in FIG. 13.
Figure 16:
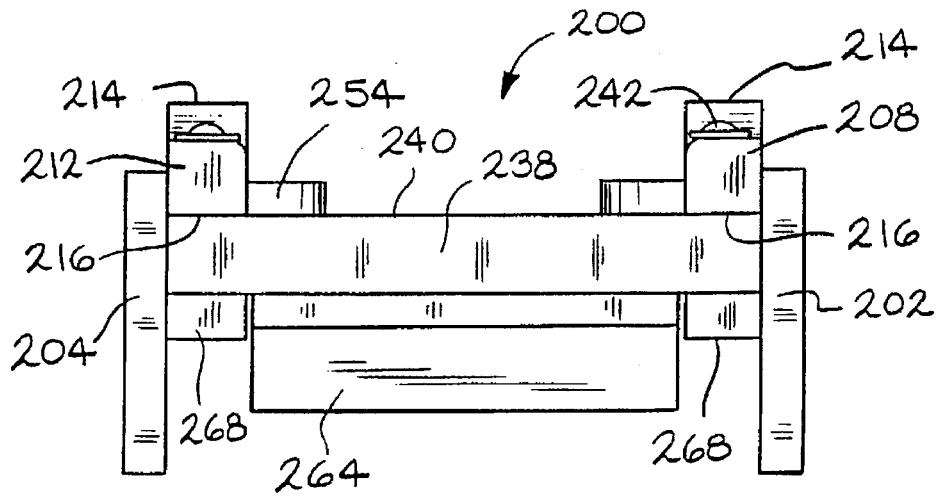
FIG. 16 is a first end view of the zero block taken along the lines 16—16 of FIG. 14.
Figure 17:
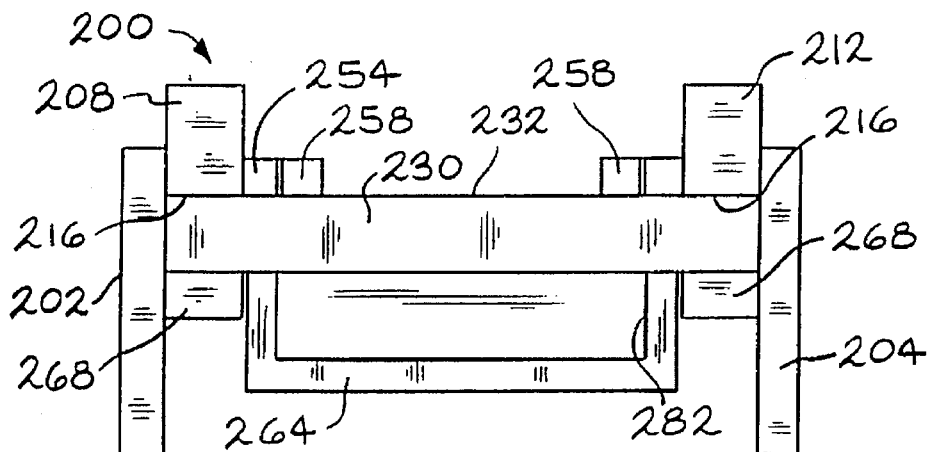
FIG. 17 is a second end view of the zero block taken along the lines 17—17 of FIG. 14.
Figure 18:
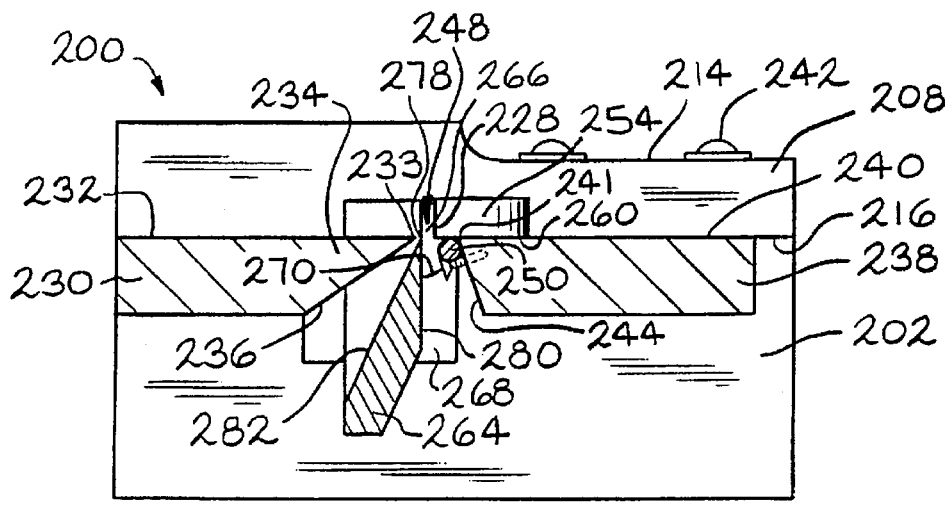
FIG. 18 is a vertical sectional view of the zero block taken along the lines 18—18 of FIG. 14.

The base 14 is suitably formed of a rigid material such as aluminum or stainless steel as a cylindrical body. The base 14 is provided with circumferential distal flange 18 and a rectangular proximal flange 20. Both of the distal flange 18 and the proximal flange 20 extend radially outwardly from the base 14. The cylindrical portion 22 of the base 14 between the distal flange 18 and the proximal flange 20 defines a grip area within which an operator may hold the measuring is device 10 with one hand during use of the measuring device 10 (FIG. 13). A bore 23 (FIG. 4) extends longitudinally through the base 14. A radial extension 24 is formed on the distal flange 18. An opening 26 is defined thorough a portion of the cylindrical portion 22 of the base 14 and the distal flange 18 in the region of the radial extension 24 which communicates between the radially outer surface of the base 14 and the bore 23. The purpose of the opening 26 will be explained below.

The head 16 may be suitably formed of aluminum or stainless steel. Two spaced apart longitudinally extending bores 30 are formed through the head 16. The purpose of the bores 30 will be discussed below. A first thumbscrew 32 and a second thumbscrew 34 are threaded into the head 16. The purpose of the thumbscrews 32 and 34 will be discussed below. The proximal end of the head 16 forms an internal, generally U-shaped raised guard 35, the purpose of which will be discussed below.

The main body 12 also includes a reference member 36 disposed partially within the bore 23 through the base 14. A portion of the reference member 36 extends longitudinally out of the distal end of the bore 23. The reference member 36 is secured in the base 14 in a manner which will be described in detail below. Three reference pads 38 are provided on the axial face of the reference member 36. The distal faces of the three reference pads 38 define a plane perpendicular to the longitudinal axis of the main body 12. Typically the reference pads 38 are formed by cap screws fully threaded into the reference member 36. The purpose of the reference pads 38 will be explained below.

A gap measuring element 40 is supported by the main body 12 in a manner which will be further explained below. The gap measuring element 40 is mounted to be reciprocally movable along a path perpendicular to the plane defined by the three reference pads 38 on the reference member 36. The gap measuring element 40 includes a wedge 42 having a pair of angled contact faces 44 and 46. The wedge 42 of the gap measuring element 40 is mounted on an arm 48. The arm 48 is fixed to the movable portion of a transducer 50 (FIG. 4) mounted in one of the bores 30. As depicted by the dashed lines in FIG. 4, the wedge 42 can be pivoted on the arm 48 relative to the main body 12 about an axis generally parallel to the path of movement of the gap measuring element 40. A fixed portion of the transducer 50 may be fixed in the bore 30 by, for example, a set screw (not shown).

As will be further describe below, the transducer 50 generates an indication representative of the relative position of the gap measuring element 40 along the path of the gap measuring dement 40. In a preferred embodiment, the transducer 50 will generate an electrical signal. However, it is contemplated other indications may be produced by the transducer 50. Thus, as used herein, the word "transducer" should be interpreted to mean any type of device which converts a movement along a path to some type of indication. Thus, for example, a transducer may be a dial micrometer. The transducer 50 may suitably be of the electrical signal producing type described in my co-pending U.S. patent application No. 08/253,770, the disclosure of which is hereby incorporated by reference. The electrical signal generated by the transducer 50 may be transmitted to a conventional data collection and display circuit (not shown) by an electrical cable 52. The cable 52 is connected to the transducer 50 within the space enclosed by the guard 35 formed on the proximal face of the head 16. Thus the guard 35 helps to protect the connection between the cable 52 and the transducer 50 from accidental damage.

A contour measuring element 56 is also supported by the main body 12. The contour measuring element 56 is mounted to be reciprocally movable along a path perpendicular to the plane defined by the three reference pads 38 on the reference member 36. The contour measuring element 56 includes a generally L-shaped arm 58 having a longitudinally extending contact tip 60 fixed at one end thereof. The other end of the arm 60 is coupled to a transducer 62 (FIG. 4) to move a movable portion of the transducer 62 to generate an electrical signal representative of the relative position of the contour element 58 along its path. The transducer 62 is preferably identical to the transducer 50 in structure and operation, and the fixed portion of the transducer 62 may be similarly fixed in a bore 30 by a set screw (not shown). The signal generated by the transducer 62 is transmitted to the data collection and display circuit by an electrical cable 64. The connection between the cable 64 and the transducer 62 is protected by the guard 35.

A cable 66 extends longitudinally out of the outer face of the proximal flange 20, and extends generally beside the head 16. The purpose of the cable 66 will be explained below.

Referring now to FIGS. 6 through 10, it can be seen that the head 16 includes a generally rectangular skirt portion 70. A pair of ribs 72 are formed on the internal surface of a first pair of opposed sides of the skirt portion 70. The ribs 72 reinforce the skirt portion 70 in the areas where the thumbscrews 32 and 33 extend through the skirt portion 70 of the head 16. Additionally, two opposed sets of apertures 74 are formed through the second pair of opposed sides of the skirt portion 70.

As indicated above, each of the transducers 50 and 62 is provided with a respective stationary portion 75, which is fixed within the associated bore 30 through the head 16, and which extends through the space surrounded by the skirt portion 70 of the head 16 and into the hollow base 14. Each of the transducers 50 and 62 is also provided with a movable portion 76 which is disposed within the hollow base 14, and which may be moved reciprocally, in a telescoping fashion, relative to the associated fixed portion 75. The movable portions 76 are spring loaded to urge them away from the respective fixed portion 75 of the transducers 50 and 62. Respective threaded fasteners 77 fix the arm 48 to the movable portion is 76 of the transducer 50 and the arm 58 to the movable portion 76 of the transducer 62.

A pair of linear ball slide bearings 78 are provided, each having a respective first portion 80 and a second portion 82 which is axially movable relative to the first portion 80. Slide bearings which are believed to be suitable may be obtained from Tusk Direct, Inc. of Bethel, Conn. Each slide bearing 78 is mounted to the inner surface of a respective side of the second pair of opposed sides of the skirt portion 70 of the head 16 by means of fasteners 84 (only one shown) extending through the apertures 74 to engage the associated first portion 80 of the slide bearing 78.

A pair of spaced apart lugs 86 extend axially out of the base 14 into the interior of the space surrounded by the skirt portion 70 of the head 16. Each lug 86 is provided with a recessed area 88 (FIG. 10) to provide clearance relative to the adjacent ribs 72 on the skirt portion 70 of the head 16. The second portion 82 of each slide bearing 78 extends between the lugs 86, and is fixed thereto by fasteners 90 (only 3 shown). Note that the first portion 80 of each slide bearing 78 can be moved relative to the second portion 82 thereof to permit access to the fasteners 90, which extend through the second portions 82 of the slide beatings 78. As illustrated by the dashed lines in FIG. 10, the slide bearings 78 permit the head 16 and the components supported thereby, such as the transducers 50 and 62, to slidably move relative to the base 14 along a path generally perpendicular to the path of movement of the reciprocable movable portions 76 of the transducers 50 and 62. Simultaneously the slide beatings 78 prevent longitudinal movement of the head 16 relative to the base 14. The thumbscrews 32 and 34 may be advanced into the head 16 to bear against the lugs 86 to prevent sliding movement of the head 16 relative to the base 14. This may be desirable, for example, during measurement of a gap between adjacent assembled parts of an automobile. The thumbscrews 32 and 34 may be retracted outwardly to release the lugs 86 and permit sliding movement of the head 16 relative to the base 14 during use of the measuring device 10.

The reference member 36 includes a cylindrical stationary member 92 disposed within the bore 23 through the base 14. The stationary member 92 is seated against a shoulder 94 (FIGS. 7 and 8) formed on the inner surface of the bore 23, near the proximal end of the bore 23. Fasteners 96 (shown in FIGS. 6 and 8) extend through the wall of the base 14 defining the shoulder 94 to engage the stationary member 92 and fix the stationary member 92 to the shoulder 94. The stationary member 92 has a rectangular opening 98 formed longitudinally therethrough. The transducers 50 and 62 extend through the opening 98.

Figure 7:
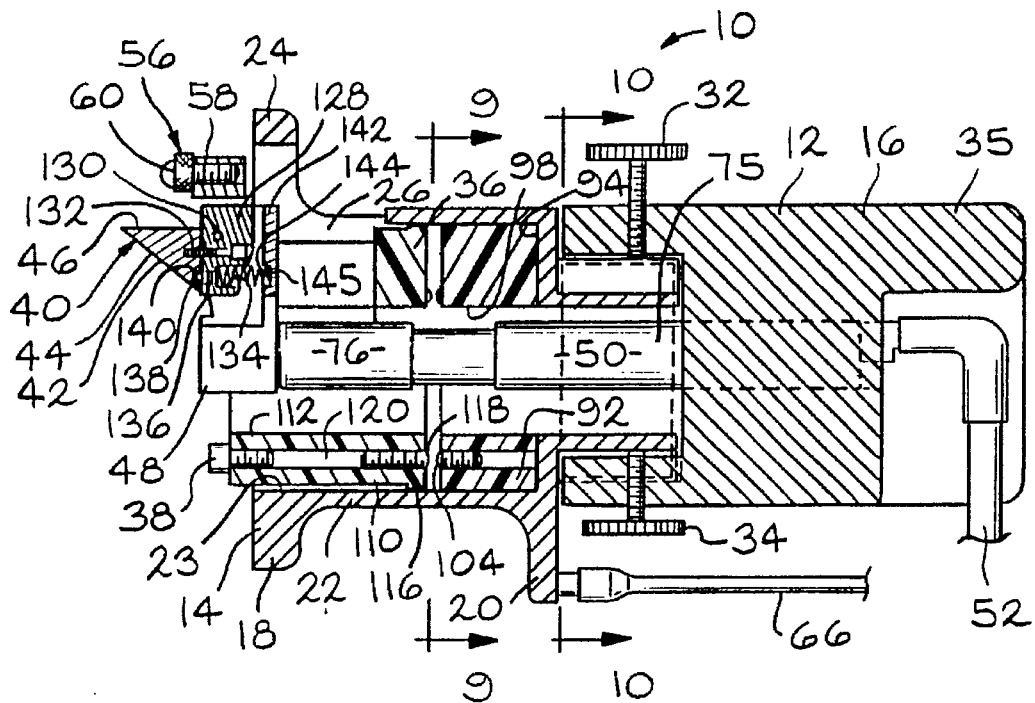
FIG. 7 is view, partly in section, of the measuring device taken along the lines 7—7 of FIG. 4.
Figure 8:
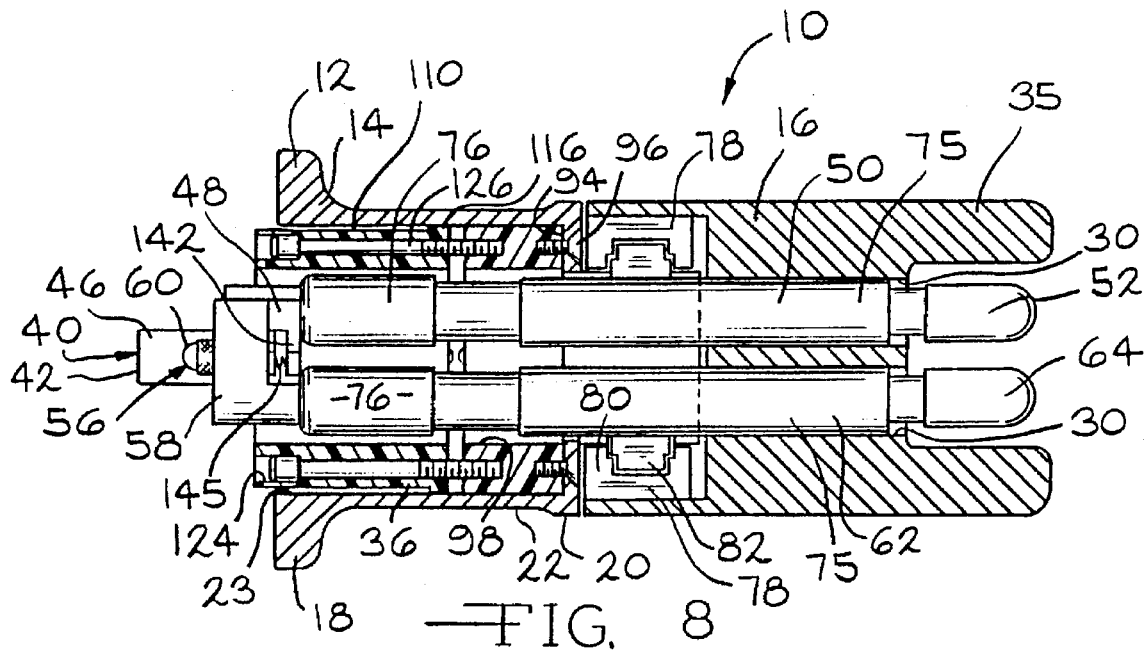
FIG. 8 is view, partly in section, of the measuring device taken along the lines 8—8 of FIG. 4.
Figure 9:
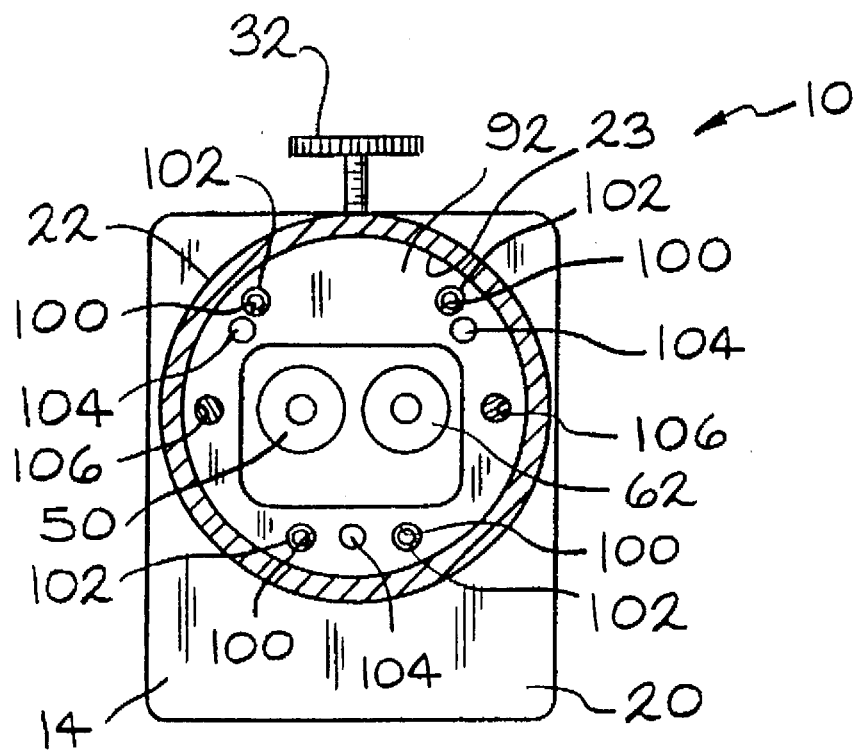
FIG. 9 is vertical sectional view of the measuring device taken along the lines 9—9 of FIG. 7, showing the placement of electrical contacts thereon.
Figure 10:
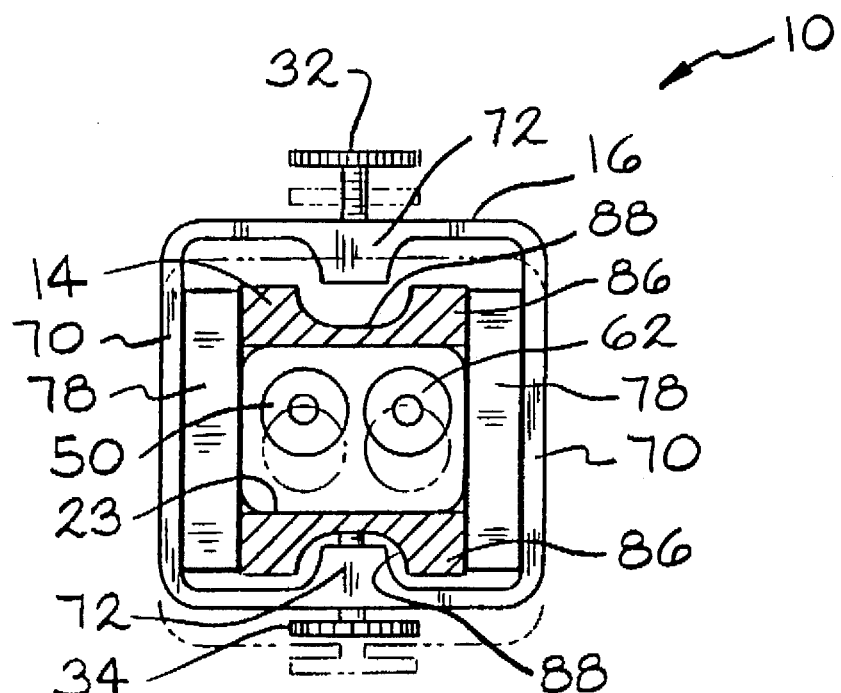
FIG. 10 is vertical sectional view of the measuring device taken along the lines 10—10 of FIG. 7.

As best seen in FIG. 9, four recesses 100 are formed in the distal face of the stationary member 92. Each recess 100 receives one end of a respective compression spring 102. Three equally spaced apart electrical contacts 104 protrude slightly from the distal face of the stationary member 92. As seen in FIG. 7, the electrical contacts 104 may be formed as threaded members disposed in a threaded bore extending axially through the stationary member 92. Connecting wiring (not shown) is provided to connect the electrical contacts 104 to the cable 66 in a manner which will be described below. Finally a pair of threaded recesses 106 are formed on opposite sides of the distal face of the stationary member 92. The purpose of the springs 102, electrical contacts 104, and recesses 106 will be discussed below.

The reference member 36 also includes a cylindrical movable member 110 slidably disposed within the bore 23 through the base 14. The movable member 110 is generally cylindrical and has a rectangular opening 112 formed longitudinally therethrough. The transducers 50 and 62 extend through the opening 112. A notch 114, extending into the opening 112, extends longitudinally in one sidewall of the movable member 110. As will be seen, the notch 114 provides clearance for the contour measuring element 56 and the gap measuring element 40 as they reciprocate along their respective paths. A radially outwardly extending flange 116 is formed on the proximal end of the movable member 110 which slidably engages the bore 23.

Three electrical contacts 118 protrude slightly from the proximal face of the movable member 110, each electrical contact 118 being axially aligned with a respective one of the electrical contacts 104 on the stationary member 92. As seen in FIG. 7, the electrical contacts 104 may be formed as threaded members disposed in the proximal end of a respective one of three threaded bores 120 through the movable member 110. The electrical contacts 104 are electrically interconnected in a manner which will be further explained below. Note that each of the reference pads 38 may be threaded into the distal end of a respective one of the threaded bores 120.

Four recesses (not shown), which are similar to the recesses 100, are formed in the proximal face of the movable member 110 to receive the distal ends of respective ones of the springs 102. A pair of longitudinal countersunk bores 124 are formed through the movable member 110. A threaded fastener 126 extends through each of the bores 124 in the movable member 110 and engages a respective one of the threaded recesses 106 in the stationary member 92. The fastener 126 does not draw the movable member 110 tight against the stationary member 92. Instead, the springs 102 urge the movable member 110 away from the stationary member 92 such that there is a relatively small gap between each of the electrical contacts 118 on the movable member 110 and the associated electrical contact 104 on the stationary member 92. The fasteners 126 limit the size of the gap between the electrical contacts 104 and 122, and retain the movable member 110 in the bore 23. Preferably each bore 124 is counter sunk sufficiently that the head of the fastener 126 does not extend beyond the distal face of the movable member 110 when the movable member 110 is moved to cause the electrical contacts 118 thereon to contact the electrical contacts 104 on is the stationary member 92. As will become apparent below, the fasteners 126 should not extend beyond the plane defined by the distal ends of the reference pads 38 when the movable member 110 is moved toward the stationary member 92 such that the electrical contacts 118 contact the electrical contacts 104 on the stationary member 92. If the heads of the fasteners 126 extend out too far, the range of motion of the movable member 110 during normal measurement operations could then be so restricted that the electrical contacts 118 thereon may not contact the electrical contacts 104 on the stationary member 92.

Figure 6:
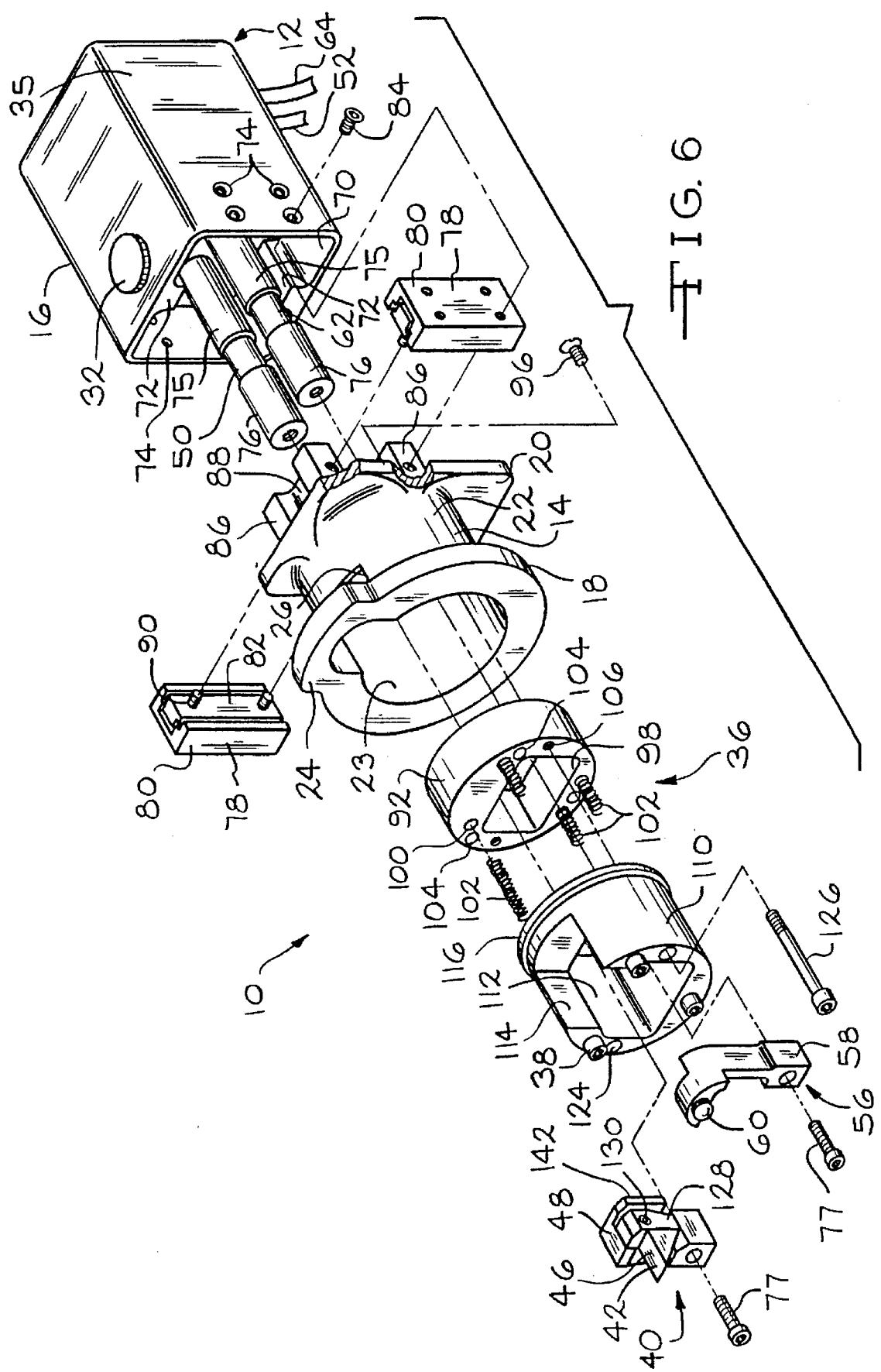
FIG. 6 is an exploded view of the measuring device illustrated in FIG. 1.

As best shown in FIGS. 6 and 7, the wedge 42 is operatively connected to the arm 48 of the gap measuring element 40 by an intermediate arm 128. A pivot pin 130 extends transversely through a bore through the intermediate arm 128 and is threaded into the arm 48. A second pivot pin 132 extends through a longitudinal bore through the intermediate arm 128 and is threaded into the wedge 42 the proximal face of the wedge 42. A second longitudinal bore 134 extending through the intermediate arm 128 is threaded on the distal end thereof. The bore 134 is counter sunk to provide an enlarged unthreaded proximal portion.

A threaded member 136 is disposed partially in the threaded distal end of the bore 134. The distal end 138 of the threaded member 136 extends into an arcuate groove 140 formed in the proximal face of the wedge 42. The groove 140 in the wedge 42 permits the wedge 42 to pivot about the pivot pin 132 as depicted by the dashed lines in FIG. 4, passing above the distal end 138 of the threaded member 136. However, the degree of pivotal freedom that the wedge 42 enjoys is limited by the distal end 138 of the threaded member 136 contacting the ends of the arcuate groove 140. Additionally, the pivot pin 132 may be tightened to lock the wedge 42 in a desired orientation relative to the intermediate arm 128.

The intermediate arm 128 may be pivoted about the pivot pin 130, thereby permitting the wedge 42 to tilt relative to the reference member 36. The pivot pin 130 may be tightened to prevent the intermediate arm 128 from moving relative to the arm 48, and locking the wedge 42 at a desired angle of tilt. A flange 142 extends inwardly from the arm 48 adjacent the intermediate arm 128. Beyond a certain mount of tilt, the intermediate arm 128, on one side or the other of the pivot pin 130, will bear against the flange 142, limiting the amount that the wedge 42 can be tilted. Therefore, while the wedge 42 can be both pivoted and tilted, the degree of freedom of tilt and pivot are both limited. Typically, the maximum tilt of the wedge 42 to be allowed is on the order of about 30 degrees. Thus, the wedge 42 will always pivot about an axis generally parallel (within about 30 degrees) to the path traveled by the gap measuring element 40, even when tilted somewhat.

A recess 144 is formed in the distal side of the flange 142. The recess 144 is generally longitudinally aligned with the bore 134 in the intermediate arm 128. A spring 145 is seated in the recess 144 and in the bore 134 to urge the intermediate arm 128 to rotate clockwise from the position illustrated in FIG. 7. Thus the spring 145 acts to urge the wedge 42 to tilt radially outwardly relative to the longitudinal centerline of the measuring device 10.

Figure 11:
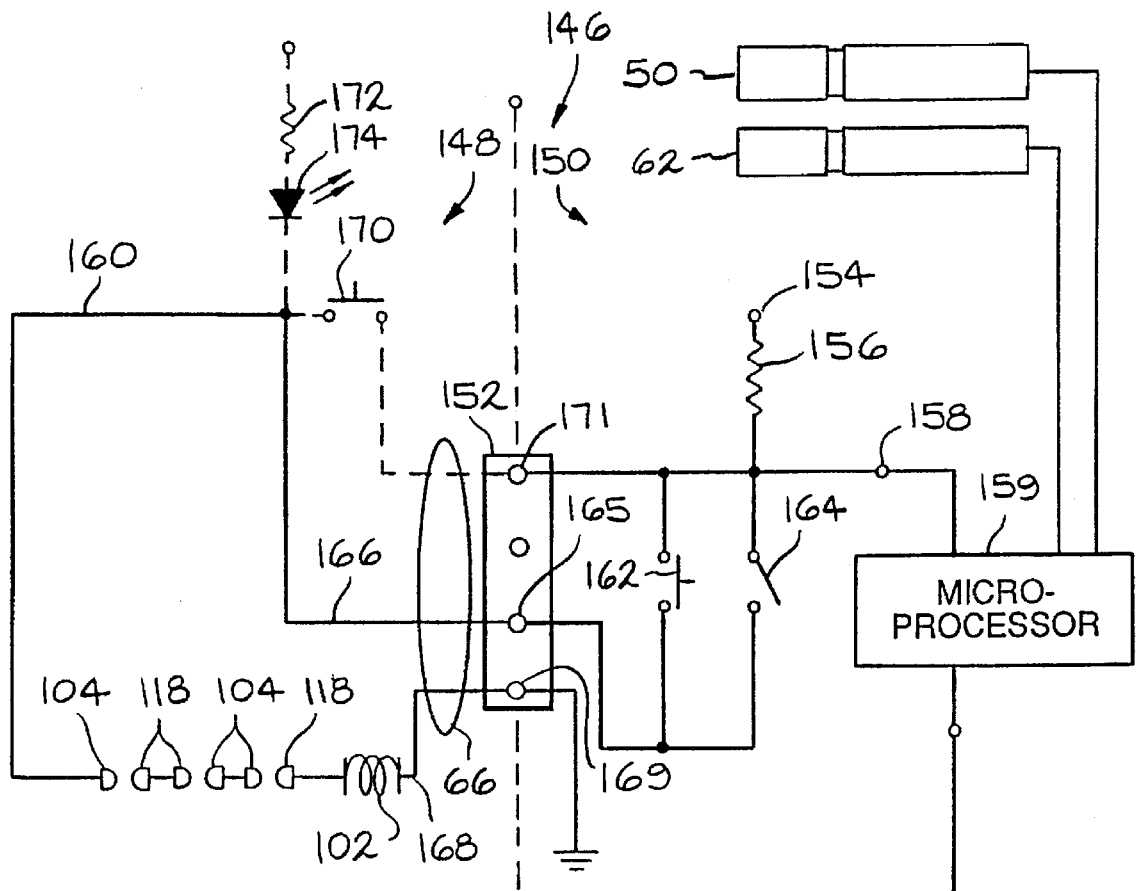
FIG. 11 is a schematic illustration of the electrical circuit containing the electrical contacts illustrated in FIG. 9.

FIG. 11 shows one possible arrangement of the electrical contacts 104 and 118 in a detecting circuit 146. As shown therein, the detecting circuit 146 is generally divided between a portion, generally indicated at 148, which is contained in or mounted on the measuring device 10, and a portion, generally indicated at 150, which is contained in a data collection and display device. The two portions 148 and 150 of the detecting circuit 146 are interconnected as shown by a multiple conductor jack 152. Voltage is applied to the detecting circuit 146 at a terminal 154 within the portion 150 thereof. A dropping resistor 156 is connected to the terminal 154. The output of the dropping resistor 156 is supplied via a terminal 158 to a microprocessor 159 controlling the reading and storing of the electrical signals produced by the transducers 50 and 62. Of course, while the device controlling the reading and storing of the electrical signals is described as a microprocessor, those of ordinary skill in the art will recognize that other devices, particularly electronic switching devices, may be used instead. When the voltage is high at the terminal 158, the microprocessor 159 does not record the signals from the transducers 50 and 62. A low voltage at the terminal 158 is a signal to the microprocessor 159 to record the signals from the transducers 50 and 62.

The detecting circuit 146 provides a circuit path 160 in parallel to the output to the microprocessor 159. A normally open manual record switch 162 and an auto-manual toggle switch 164 are connected in parallel between the terminal 158 and a pin 165 of the jack 152. The pin 165 is connected to a conductor 166 contained within the cable 66. The conductor 166 is electrically connected to a first one of the electrical contacts 104 in the stationary member 92. The circuit path 160 extends through to the associated electrical contact 118 on the movable member 110, and thence to another of the electrical contacts 118, a second and a third electrical contact 104, and then to the third electrical contact 118 on the movable member 110. One of the springs 102 is connected in the circuit between the third electrical contact 118 and a conductor 168. The other end of the conductor 168 is connected, through the cable 66 and a pin 169 of the jack 152, to electrical ground. The circuit path 160 is thus defined parallel to the output to the microprocessor 159.

When the measuring device 10 is positioned to take measurements of gap and contour, it is important that the measuring device 10 be held perpendicular to the surface of the part being measured in order to provide accurate, repeatable measurements. The reference pads 38 on the movable member 110 contact the the surface of the part to be measure, and orient the reference member 110 perpendicular to the surface. When the measuring device 10 is pressed perpendicularly against the surface, compressing the springs 102, each associated pair of electrical contacts 104 and 118 on the stationary member 92 and the movable member 110, respectively, are in contact with one another, providing an uninterrupted current path within that portion of the circuit path 160. If the measuring device 10 is canted when pressed against the surface of the part to be measured, the bore 22 through the base 14 will be tilted relative to the movable member 110, and thus the movable member 110 and the stationary member 92 will contact at an angle. This will prevent all of the associated pairs of electrical contacts 104 and 118 from contacting one another, and the current path in that portion of the circuit path 160 will be interrupted until the head 16 and base 14 are moved to bring the stationary member 92 into alignment with the movable member 110. Note that the spring 102 which forms an uninterrupted part of the circuit path 160, regardless of the relative positions of the movable member 110 and the stationary member 92.

If the auto-manual toggle switch 164 is in the auto (closed) position thereof, contact between all three pairs of electrical contacts 104 and 118 will complete the circuit path 160 to pull the voltage low at the terminal 158, signaling the microprocessor 159 to record the signals from the transducers 50 and 62. If the auto-manual toggle switch 164 is in the manual (open) position thereof, the manual record switch 162 must be closed to pull the voltage low on the terminal 156. As indicated by the dashed line in FIG. 11, a second manual record switch 170, wired in parallel to the manual record switch 162 through a pin 171 of the jack 152 and physically located on the measuring device 10, can be used to provide a remote means of signaling the microprocessor 159 to record the signal output of the transducers 50 and 62 once the electrical contacts 104 and 118 are all closed.

The sub-circuit 160 preferably additionally contains a resistor 172 and a light-emitting diode (LED) 174 connected in series between a terminal 176 and the conductor 166, and physically located on the measuring device 10. With a voltage (of the same polarity and magnitude as that applied to the terminal 154) applied to the terminal 176, the LED 174 will illuminate when each pair of electrical contacts 104 and 118 are closed regardless of the positions of the auto manual toggle switch 164 or the manual record switches 162 and 170. Illumination of the LED 174 is an indication to the operator that the measuring device 10 is properly held perpendicular to the surface of the part being measured, that all the electrical contacts 104 and 118 are closed, and that the signals output of the transducers 50 and 62 may be read and recorded (manually or automatically).

Figure 12:
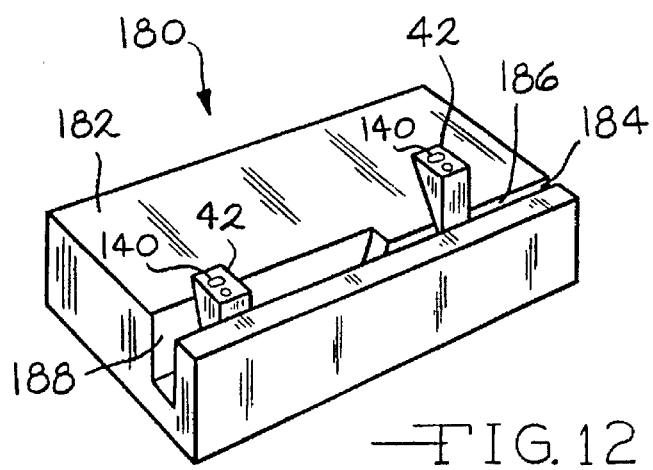
FIG. 12 is an illustration of a calibration block which may be used with the measuring device according to the invention.

FIG. 12 illustrates a typical calibration block 180 to be used with the gap measuring element 40. The calibration block 180 has a flat upper surface 182. A linear notch 184 is formed in the surface 182. The notch 184 includes a relatively narrow portion 186, and a relatively wide portion 188, each of precisely known widths.

To calibrate the gap measuring element 40 of the measuring device 10, the measuring device 10 is positioned with the wedge 42 of the gap measuring element 40 positioned as shown in the narrow portion 186 of the notch 184. The contact face 46 of the wedge 42 is positioned perpendicular to the surface 182 of the calibration block 180. When the reference member 36 is in contact with the surface 182 and all of the associated pairs of electrical contacts 104 and 118 are in contact, a reading is taken of the output of the transducer 50. The signal output of the transducer 50 is modified by the operator using a calibration circuit (not shown) until the reading of the output of the transducer 50 indicates the known width of the narrow portion 186 of the notch 184. For example, if the notch were 2 millimeters wide, the signal output of the transducer would be modified until an indication of 2 millimeters was obtained.

The wedge 42 is then positioned as shown in the wide portion 188 of the notch 184. Note that because the gap being measured is wider than in the narrow portion 186 of the notch 184, the wedge 42 will be positioned lower relative to the surface 182 of the calibration block 180. Thus the movable portion 76 of the is transducer 50 will be extended further from the fixed portion 75 thereof than the movable portion 76 was when the wedge 42 was positioned in the narrow portion 186 of the notch 184, casing a proportional change in the signal produced by the transducer 50. When the reference member 36 is in contact with the surface 182 and all of the associated pairs of electrical contacts 104 and 118 are in contact, another reading is taken of the output of the transducer 50. The gain on the signal output of the transducer 50 is then modified by the operator until the reading of the output of the transducer 50 indicates the known width of the wide portion 188 of the notch 184. Preferably, the measuring device 10 is then repositioned in the narrow portion 186 of the notch 184 to verify that the reading of the output of the transducer still indicates the known width of the narrow portion 186.

The contour measuring element 56 is calibrated by moving the movable portion 76 of the transducer 62 between the full in and full out positions thereof. The transducer 62 has a precisely known length of stroke for the movable portion 76 thereof. The operator changes the calibration circuit (not shown) to adjust the gain applied to the signal produced by the transducer 62 to cause the total indicated change in reading between the full in position and full out position of the movable portion 76 of the transducer 62 to match the known length of stroke thereof. The calibration circuit may also be adjusted to cause the reading of the output of the transducer 62 to read zero when the movable portion 76 is fully extended, or when the measuring device is fully seated on a flat surface, such as the surface 182 of the calibration block 180, or at any other convenient point in the range of travel of the movable portion 76.

FIG. 13 illustrates the measuring device 10 in operative position on a zero block 200 of this invention. As shown in FIGS. 13 through 21, the zero block includes a pair of spaced apart upstanding side walls 202 and 204. A plurality of counter sunk apertures 206 are formed along the upper marginal edge of each side wall 202 and 204. Each side wall 202 and 204 has an inner face 207 facing the s other side wall 204 or 202. An elongate, horizontally extending, support member 208 is secured to the upper marginal edge of the inner face 207 of the side wall 202 by fasteners 2 10 extending through the apertures 206 and engaging the support member 208. Similarly, an elongate, horizontally extending, support member 212 is secured to the upper marginal edge of the inner face 207 of the side wall 204 by the fasteners 210 extending through the apertures 206 through the side wall 204, and engaging the support member 202.

Each of the support members 208 and 212 is rectangular in longitudinal cross-section and has an upper surface 214 and a lower surface 216. A pair of longitudinally extending slots 220 are formed in a first end 222 of each support member208 and212, extending from the upper surface 214 to the lower surface 216 thereof. A pair of vertical bores 224 are formed through a second end 226 of each support member 208 and 212. A third vertical bore 227 is formed between the slots 220 and the bores 224. The lower surface 216 of each support member 208 and 212 is precision machined or ground to a desired degree of flatness. A semi-circular transverse notch 228 is formed in the lower surface 216 of each of the support members 208 and 212.

A horizontal fixed plate 230 extends between the sidewalls 202 and 204. The fixed plate 230 has an upper surface 232 which is precision machined or ground to a desired degree of flatness and which is provided with an inwardly facing linear marginal edge 233. The fixed plate 230 is fixed to the support members 208 and 212 by fasteners 210 extending through the vertical bores 224 to engage the fixed plate 230. The fasteners 210 hold the upper surface 232 of the fixed plate 230 against the lower surfaces 216 of the support members 208 and 212. An inwardly extending tongue 234 is formed on the fixed plate 230. An inwardly facing edge surface 236 (best seen in FIGS. 18, 20 and 21) of the tongue 234 forms an acute angle to the upper surface 232 of the fixed plate 230, for a purpose which will be explained below.

A horizontal movable plate 238 extends between the sidewalls 202 and 204. The movable plate 238 has an upper surface 240 which is precision machined or ground to a desired degree of flatness, and has an inwardly facing linear marginal edge 241 parallel to the marginal edge 233 of the fixed plate 230. The movable plate 238 is supported on the support members 208 and 212 by fasteners 242 extending through the slots 220 to engage the movable plate 238. The fasteners 242 may be selectively tightened to hold the upper surface 240 of the movable plate 238 against the lower surfaces 216 of the support members 208 and 212 and prevent relative movement therebetween. The fasteners 242 may be loosened to permit horizontal movement of the movable plate 238 relative to the support members 208 and 212. The range of motion of the movable plate 238 is limited by the length of the slots 220. An inwardly facing edge surface 244 (best seen in FIGS. 18, 20 and 21) of the movable plate 238 forms an acute angle to the upper surface 240 thereof along the marginal edge 241, for a purpose which will be explained below. Normally it is expected that the marginal edge 241 of the movable plate 238 will be spaced apart from the marginal edge 233 of the fixed plate 230 to form a gap 248 therebetween. The movable plate 238 may be moved relative to the fixed plate 230 to vary the gap 248 therebetween.

A replaceable rod 250 may be attached to the surface 244 along the marginal edge 241. The rod 250 is captured between a pair of screws 252 threaded into the surface 244, and a pair of retaining members 254 fixed to the upper surface 240 of the movable plate 238. Each screw 252 and the adjacent retaining member 254 should contact diametrically opposed points of the rod 250 to avoid applying a torque to the rod 250.

The retaining members 254 each have a body 256 with an outwardly extending arm 258. The lower surface 260 of each retaining member 254 is machined to a desired degree of flatness, and bears against the upper surface 240 of the movable plate 238 and the upper surface of the rod 250. Each body 256 is fixed to the movable plate 238 by a fastener 262. Thus the arm 258 of each retaining member 254 holds the rod 250 level with the upper surface 240 of the movable plate 238. The rod 250 cooperates with the upper surface 240 of the movable plate 238 to define an edge radius. As shown in FIGS. 20 and 21, the rod 250 may be replaced with a selected other rod 250' to define another edge radius, different from that defined by the rod 250. Thus, by replacing the rod 250 with a rod 250' having a different diameter from the rod 250, the zero block 200 can reproduce any edge radius of a part, within the selected design limits of the zero block 200.

An adjustable plate 264 is rotatably supported by the support members 208 and 212. The adjustable plate 264 includes a pair of outwardly extending trunnions 266. The trunnions 266 are rotatably supported within the notches 228 in the respective lower surfaces 216 of the support members 208 and 212 by a respective trunnion support block 268.

Each trunnion support block 268 is provided with a notch 270 in the upper surface thereof which cooperates with the respective adjacent notch 228 in the lower surfaces 216 of the associated support member 208 or 212 to define a generally cylindrical surface for rotatably retaining the associated trunnion 266. The notch 270 is somewhat shallower than a full semi-circle, and as a result, a gap 271 is formed between each trunnion support block 268 and the adjacent lower surface 216 of the associated support member 208 or 212. Each trunnion support block 268 is fixed to the lower surface 216 of a respective one of the support members 208 and 212 by a fastener 272 passing through the associated vertical bore 227. A threaded member 274 disposed in a threaded bore of the trunnion support block 268 and in contact with the associated support member 208 to form a fulcrum point. The fastener 272 engages the trunnion support block 268 between the threaded member 274 and the respective trunnion 266. When the fastener 272 is tightened or loosened, the trunnion support block 268 pivots about the fulcrum formed by the threaded member 274 to cause the trunnions 266 to be respectively more tightly or loosely held between the trunnion support block 268 and the support member 208 or 212. The fastener 272, in conjunction with the threaded member 274, thereby regulates the ease with which the adjustable plate 264 may be rotated relative to the fixed plate 230. The fastener 272 can be tightened sufficiently to hold the adjustable plate 264 firmly in place relative to the fixed plate 230. Additionally, each trunnion support block 268 is provided with a respective set screw 276 which can be advanced within a threaded bore through the trunnion support block 268 to engage the associated trunnion 266 to provide an additional means for fixing the position of the adjustable plate 264 relative to the fixed plate 230.

The centerline of each trunnion 266 is aligned with the marginal edge 278 of a flat surface 280 on the adjustable plate 264. Additionally, the centerline of each trunnions 266 lies within the plane defined by the lower surface 216 of the support members 208 and 212, and thus the upper surfaces 232 and 240 of the fixed plate 230 and the adjustable plate 238, respectively. Thus as the adjustable plate 264 is rotated, the marginal edge 278 remains collinear with the centerlines of the trunnions 266, and level with the upper surfaces 232 and 240 of the fixed plate 230 and the adjustable plate 238, respectively.

It should be noted that when the rod 250 or 250' are secured along the marginal edge 241 of the movable plate, the gap 248 will be defined (and thus measured between) the marginal edge 278 of the adjustable plate 238 and the rod 250 or 250'. If the rod 250 or 250' is removed, the gap 248 will be understood to be defined between the marginal edge 278 and the marginal edge 241 of the movable plate 238. Finally, if no adjustable plate 264 is provided in the zero block 200, the gap 248 will be understood to be defined between the marginal edge 233 of the fixed plate 230 and either the marginal edge 241 of the movable plate 238 or the rod 250 or 250' if installed on the movable plate 238.

As best seen in FIG. 21, a relieved area 282 is defined in the side of the adjustable plate 238 opposite to the flat surface 280. The relieved area 282, together with the angled inner edge surface 236 of the adjacent tongue 234 on the fixed plate 230, permit the adjustable plate 238 to be rotated to a position in which the flat surface 280 forms an angle of about 75 degrees to the upper surface 232 of the fixed plate 230. Similarly, the angled inner edge surface 244 on the movable plate 238 provides relief to allow the adjustable plate 238 to be rotated in the opposite direction, causing the flat surface 280 to form an angle of about 120 degrees to the upper surface 232 of the fixed plate 230. Thus the zero block 200 may be set up to simulate a variety of angled gaps between parts or between a part and a fixture.

In use, the zero block 200 is set up to simulate the nominal dimensions expected to be measured. For example, for simulating measuring a gap between two parts, the rod 250 installed in the zero block 200 will be selected to simulate the nominal radius of a first part. The movable plate 238 will be moved away from the adjustable plate 264 so that the gap between the rod 250 and the flat surface 280 of the adjustable plate 264 is the desired (nominal) gap. The adjustable plate 264 is normally locked in position with the flat surface 280 perpendicular to the upper surface 232 of the fixed plate 30. The wedge 42 of the. measuring device 10 will normally be locked with the contact surface 46 thereof extending perpendicularly to the plane defined by the reference pads 38. Thus, when the reference pads 38 engage the movable plate 238, as illustrated in FIG. 20, the contact surface will be perpendicular to the surface of fixed plate 230. Therefore, there is no need to simulate the radius of the edge of the other part, and the contact surface 46 will engage the flat surface 280 of the movable plate 238.

Following calibration, as described above, the measuring device 10 is positioned to read the gap and contour of the zero block 200, as shown in FIG. 20 and as will be further described below. Since zero block 200 simulates the nominal geometry of parts to be measured, the readings produced by the transducers 50 and 62 will be those which exist when the parts are in their desired configuration. If, during measurement of actual parts, the readings differ from those produced by reading the zero block 200, then the operator will recognize that the geometry of the parts is different from the nominal geometry. The magnitude of the difference will reflect how far from the nominal geometry the parts are.

Setting up the zero block 200 to simulate the geometry between a part and fixture is similar. However, since the edge of a fixture is normally a sharp edge, rather than a radiused edge, the rod 250 is removed, and the marginal edge 241 of the movable plate 238 between the upper surface 240 and the inner edge surface 244 is used to represent the edge of the fixture. Note that since the contact face 44 of the wedge 42 will only contact the upper edge of the fixture surface facing the part, any difference between the angle of the surface 244 to the upper surface 240 of the movable plate 238 and the actual geometry of the fixture is material.

The adjustable plate 264 is set to form an angle between the flat surface 280 thereof and the upper surface 232 of the fixed plate 230 which reflects the nominal geometry of the part relative to the fixture. When placing the measuring device 10 on the zero block 200 in this configuration, the wedge 42 is allowed to tilt so that the contact face 46 thereof lies flush against the flat surface 280 of the zero block 200. With the contact face 44 of the wedge contacting the adjacent marginal edge 241 of the movable plate 238, the readings produced by the measuring device 10 will reflect the desired readings when the actual part is in the nominal geometry relative to the actual fixture.

FIGS. 22 through 25 schematically illustrate the process of using the measuring device 10 to measure a gap between the spaced apart opposed surfaces 286 and the contour between the adjacent outwardly facing surfaces 288 of two parts 290 and 292. The parts 290 and 292 may, for example, be a door and a door post of an automobile. However, it will be recognized that the parts 290 and 292 may be any other pair of adjacent parts, or even adjacent portions of the same part. In such a situation, as indicated above, it will normally be desirable to tighten the pivot pin 130 to prevent the wedge 42 from tilting, and lock the wedge 42 in place with the contact face 46 thereof perpendicular to the plane defined by the reference pads 38. However the wedge 42 will normally be left free to pivot about the pivot pin 132. The thumbscrews 32 and 34 will normally be tightened inwardly, to hold the head 16 in a fixed position relative to the base 14.

Figure 22:
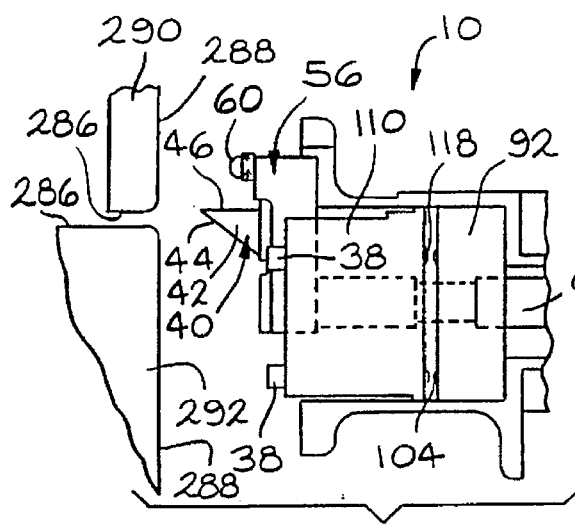
FIG. 22 is a partial side schematic view of the measuring device preparatory to being positioned to take gap and contour readings of two parts.
Figure 23:
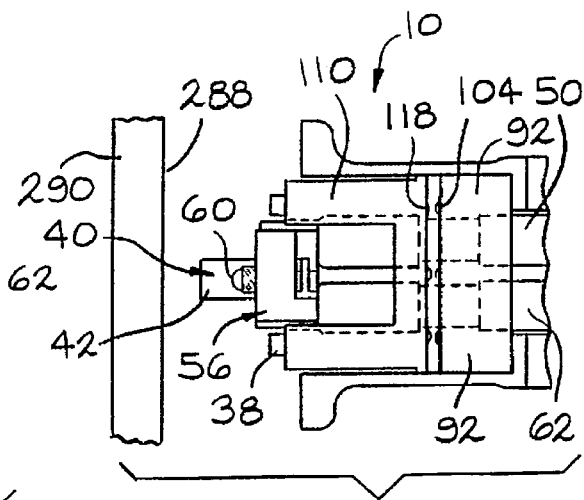
FIG. 23 is a partial top schematic view of the measuring device preparatory to being positioned to take gap and contour readings of the two parts illustrated in FIG. 22.
Figure 24:
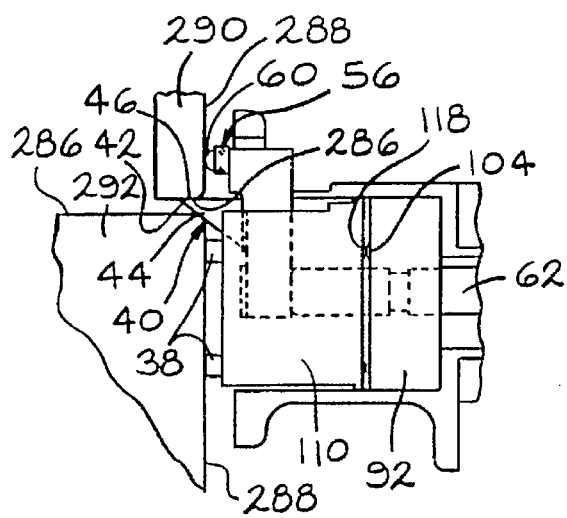
FIG. 24 is a partial side schematic view of the measuring device positioned to take gap and contour readings of the two parts illustrated in FIG. 22.
Figure 25:
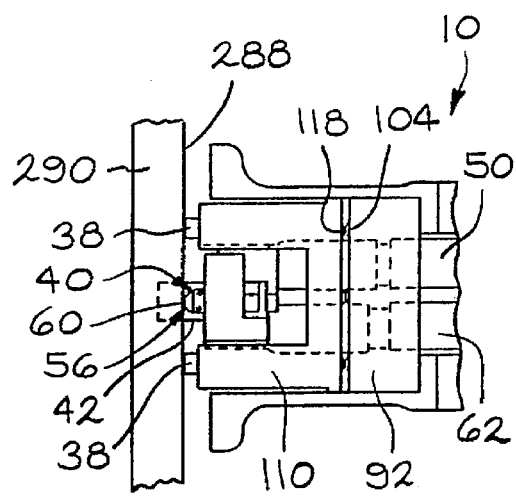
FIG. 25 is a partial top schematic view of the measuring device positioned to take gap and contour readings of the two parts illustrated in FIG. 22.

As shown in FIGS. 22 and 23, the springs 102 will normally move the movable member 110 away from the stationary member 92, breaking the contact between the electrical contacts 104 and 118. When the measuring device 10 is positioned to take gap and contour measurements of the parts 290 and 292, the reference member 36 is pressed against the surface 288 of the part 292, causing the springs 102 to be compressed, and the movable member 110 to contact the stationary member 92. Holding the measuring device 10 with the longitudinal axis thereof perpendicular to the surface 288 of the part 292 causes the electrical contacts 104 to contact the electrical contacts 118, as shown in FIGS. 24 and 25.

As the measuring device 10 is pressed against the surface 288 of the part 292, the gap measuring element 40 is inserted into the gap and contacts the parts 290 and 292, and the contour measuring element 56 contacts the part 292. This causes the gap measuring element 40 and contour measuring element 56 to be pressed into the base 14. The notch 114 in the movable member 110 of the reference member 36, the radial extension 24 on the distal flange 20 of the base 14 and the opening 26 through the cylindrical portion 22 of the base 14 cooperate to provide relieved areas into which the gap measuring element 40 and contour measuring element 56 can be moved.

The measuring device 10 is positioned so that the contact faces 44 and 46 contact the adjacent edges of the surfaces 286 of the parts 290 and 292. Thus the gap measuring element 40 will be moved from a fully extended position to a position somewhere between fully extended and fully retracted. The output of the transducer 50 indicates the size of the gap.

Simultaneously with taking the measurement of the gap between the parts 290 and 292, the contact tip 60 is positioned against the surface 288 of the part 290, causing the contour measuring element 56 to partially retract from a fully extended position. The output of the transducer 62 indicates the flushness or lack thereof of the two parts 290 and 292. The outputs of the transducers 50 and 62 may be simultaneously read and recorded by the microprocessor 159.

Figure 26:
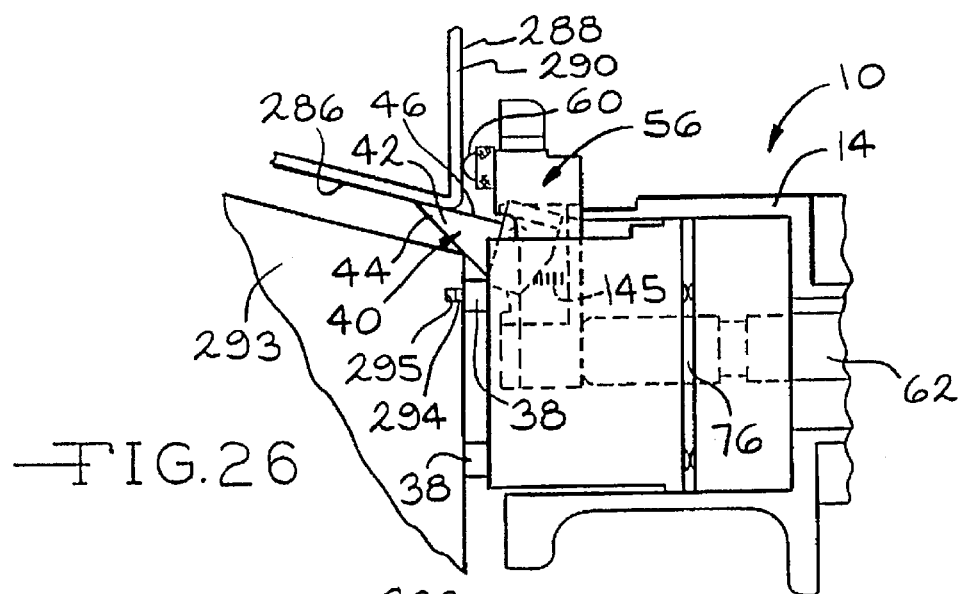
FIG. 26 is a partial side view of the measuring device positioned to take gap and contour readings of two parts having opposed facing surfaces extending at an angle to the outwardly facing surfaces of the parts.
Figure 27:
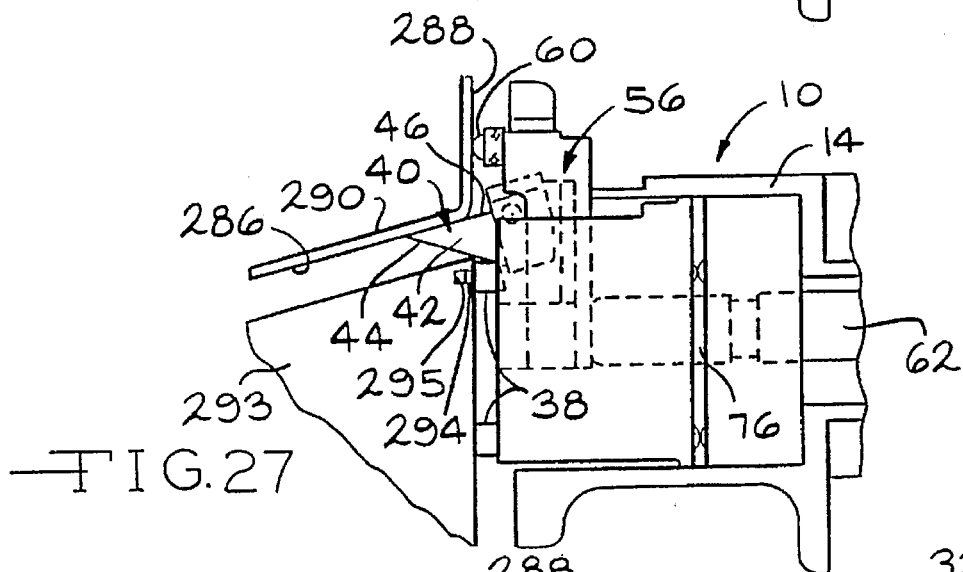
FIG. 27 is a view similar to that of FIG. 26, except the opposed facing surfaces of the parts extend at a different angle to the outwardly facing surfaces of the parts.

Taking gap and contour measurements between a fixture 293 and the part 290 is similar to taking measurements between the parts 290 and 292. As shown in FIGS. 26 and 27, it may be desirable to increase the repeatability of the measurements taken by providing two reference pads 38 which have been modified to form a head 294 thereon. The modified reference pads 38 are substituted for two modified reference pads. The head 294 of each modified reference pad 38 is fitted into a respective locating recess 295 formed into the fixture 293. Providing locating recesses 295 on the fixture 293 helps ensure that different operators will take gap and contour measurement readings from exactly the same point on the fixture 293.

When taking gap measurements between the fixture 293 and the part 290 when the gap therebetween extends at other than a right angle to the outwardly facing surface 288 of the part 290, the wedge 42 is allowed to tilt under the influence of the spring 145. The thumbscrews 32 and 34 are retracted partially out of the head 16, out of contact with the base 14, thereby allowing the head 16 to move transversely to the base 14.

Figure 28:
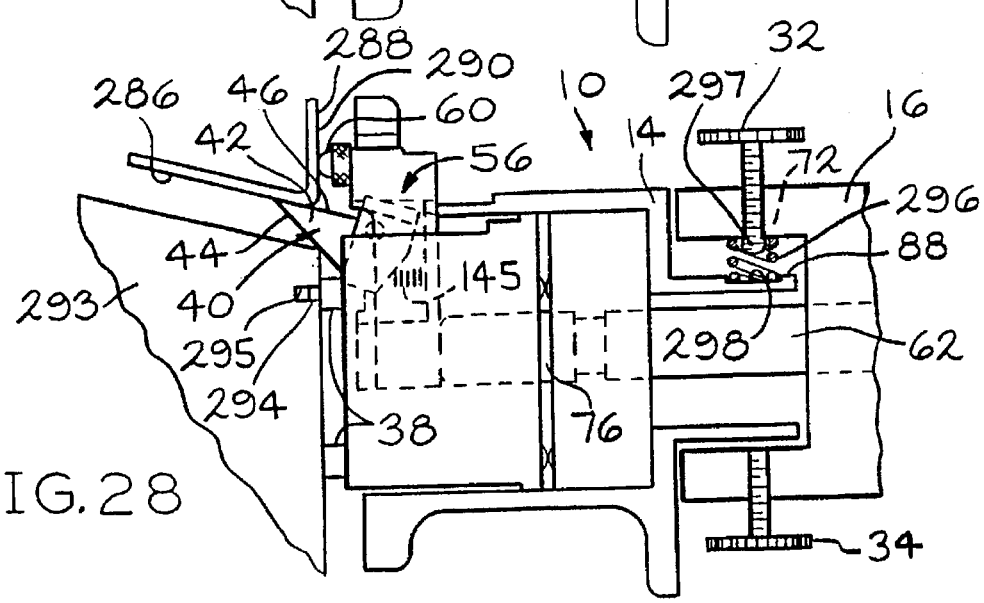
FIG. 28 is a view similar to that of FIGS. 26 and 27 showing a spring which may be added to bias the head portion of the measuring device transversely relative to the base portion of the measuring device.

It is believed that in some applications if the head 16 is allowed to freely move transversely to the base 14, the downward urging of the spring-loaded movable portion 76 of the transducer 50 will cooperate with the rotational urging of the spring 145 to align the wedge 42 in a position where the contact face 46 of the wedge 42 will be flush against the surface 286 of the part 290 and the contact face 44 of the wedge 42 will engage the edge of the fixture 293. However, it also thought that in most applications it will be necessary and desirable to provide an additional spring 296 to act between the head 16 and the base 14 as shown in FIG. 28. Preferably the spring 296 is a coil spring oriented transversely in the measuring device 10.

During assembly of the measuring device 10, after the thumbscrew 32 is threaded into the head 16 and the inner end thereof extends out of the associated rib 72, the inner end of the thumbscrew 32 is upset or peened over to form an enlarged head 297. The radially outer end of the spring 296 is disposed about the head 297 on the inner end of the thumbscrew 32 and bears against the head 16. A recessed spring seat 298 is formed on the base 14, within the recessed area 88, and the radially inner end of the spring 296 is seated therein. Thus, the spring 296 is disposed to urge the head 16, and the components supported thereby, toward the part 290. The radially outer end of the spring 296 is retained in position by the head 297 on the thumbscrew 32. The radially inner end of the spring 296 is retained in position by the recessed spring seat 298 on the base 14. Note that when the thumbscrew 32 is advanced into the head 16, the head 297 of the thumbscrew 32 advances along the centerline of the spring 296, inside the coils thereof, to contact the base 14.

When the wedge 42 contacts the surface 286 of the part 290, the wedge 42 will pivot, slightly compressing the spring 145, until the contact face 46 lies flat against the surface 286 of the part 290. Simultaneously, the spring-loaded movable portion 76 of the transducer 50 will urge the wedge 42 into the gap between the part 290 and the fixture 293, until the contact face 44 of the wedge 42 contacts the edge of the fixture 293.

The reference member 36 ensures the main body 12 of the measuring device 10 is oriented properly relative to the fixture 293. The transducer 50 provides a signal representative of the position of the gap measuring element 40 along the path thereof. The wedge 42 can tilt or be locked into position to ensure the contact face 46 consistently contacts the part 290 and the contact face 44 consistently contacts the part 292 or the fixture 293 in the same orientation. Thus the reference member 36, the transducer 50 and the wedge 42 cooperate to ensure the measuring device 10 can take accurate and repeatable gap measurement readings between the part 290 and the part 292 or the fixture 293 for a wide range of angles of the surface 286 to the surface 288 of the part 290. Additionally, the contour measuring element 56 can simultaneously measure the contour variance between the outwardly facing surface 288 of the part 292 or the fixture 293 and the outwardly facing surface 288 of the part 290.

FIGS. 29, 30, and 31 illustrate another embodiment of a measuring device according to this invention and indicated generally at 300. The measuring device 300 is provided with a housing 302 having a convenient pistol grip 304. A pair of spaced apart bores 306 (FIG. 30) are formed longitudinally through the housing 302.

Three spaced apart reference pads 307 are fixed to the housing 302 to form a reference member, and define a plane perpendicular to the bores 306.

A respective transducer 308 is fixed in each of the bores 306, each similar to the transducers 50 and 62 discussed above. One of the transducers 308 is provided with a wedge 310. The wedge 3 10 is fixed to the associated transducer 308, and can neither tilt nor pivot in the illustrated embodiment. The angled contact surfaces 312 and 314 form a line extending transversely to the housing 302. The wedge 310, together with the associated transducer 308, constitute a gap measuring element.

A contour measuring element is formed of the other transducer 308 and a contact element 316 fixed thereto. The contact element 316 is provided with a bifurcated arm 318 defining a linear contact edge extending perpendicularly to the line formed by the contact surfaces 312 and 314 of the wedge 310. Thus while the wedge 310 is inserted into a gap between parts, with the reference pads 307 engaging a first part, the contact element 316 extends perpendicularly to the gap, and engages the other of the two parts.

The relative movement of each of the transducers 308 provides an indication of the size of the gap or contour between the two parts, as discussed above for the gap measuring element 40 and the contour measuring element 56.

Although not illustrated herein, it is contemplated that the fixed plate 230 or the movable plate 238 of the zero block 200 can be made pivotal or vertically movable relative to the other of the movable plate 238 and the fixed plate 230, thereby permitting simulation of different contours of parts relative to one another or relative to a fixture. Additionally, although the measuring devices 10 and 300 are described as being hand-held, it is specifically contemplated that the measuring devices 10 and 300 may be temporarily or permanently mounted to a fixture, robotic arm, or other structure for taking gap and contour measurements therewith.

Figure 32:
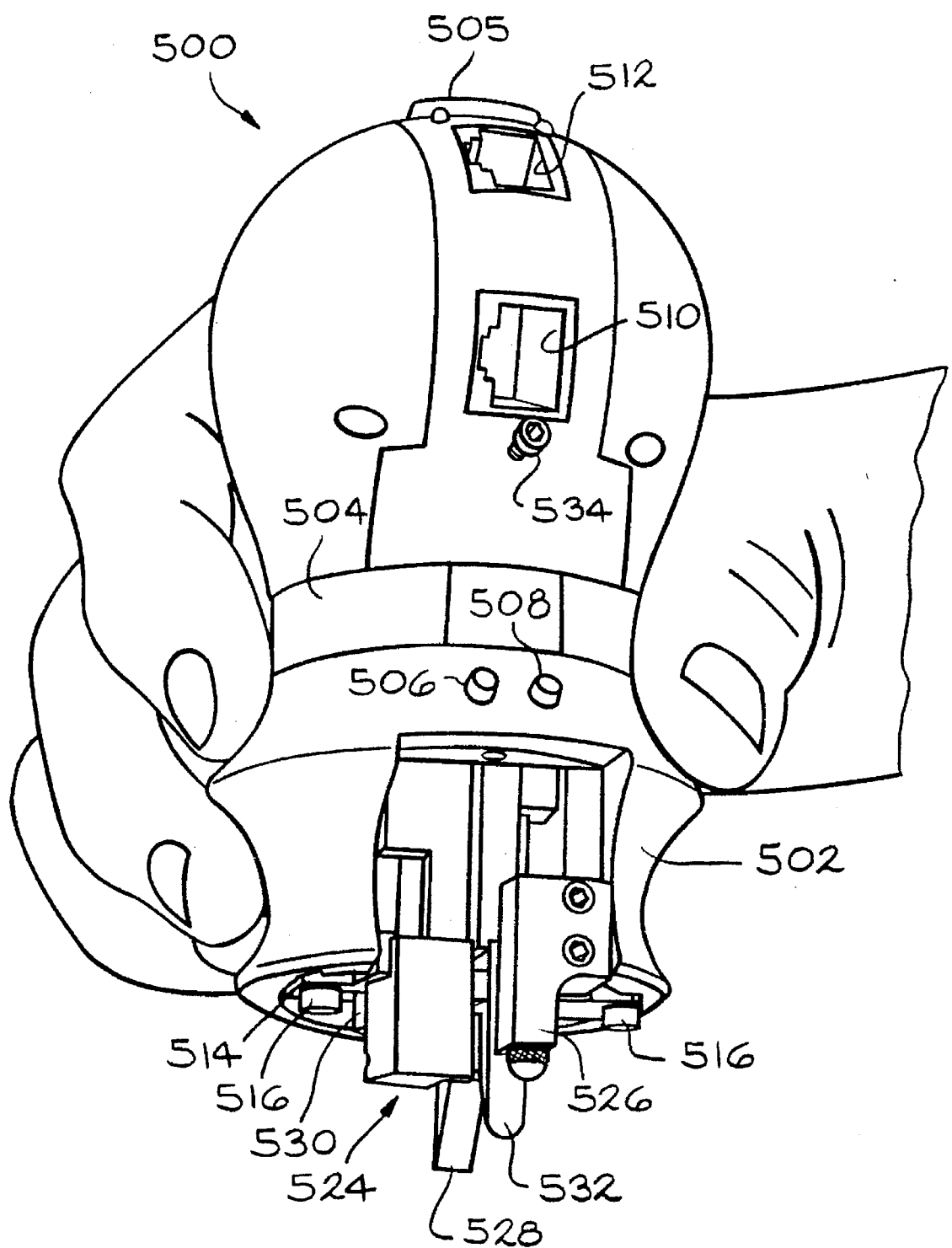
FIG. 32 is a perspective view of another embodiment of a flush and gap measuring device according to the invention.
Figure 33:
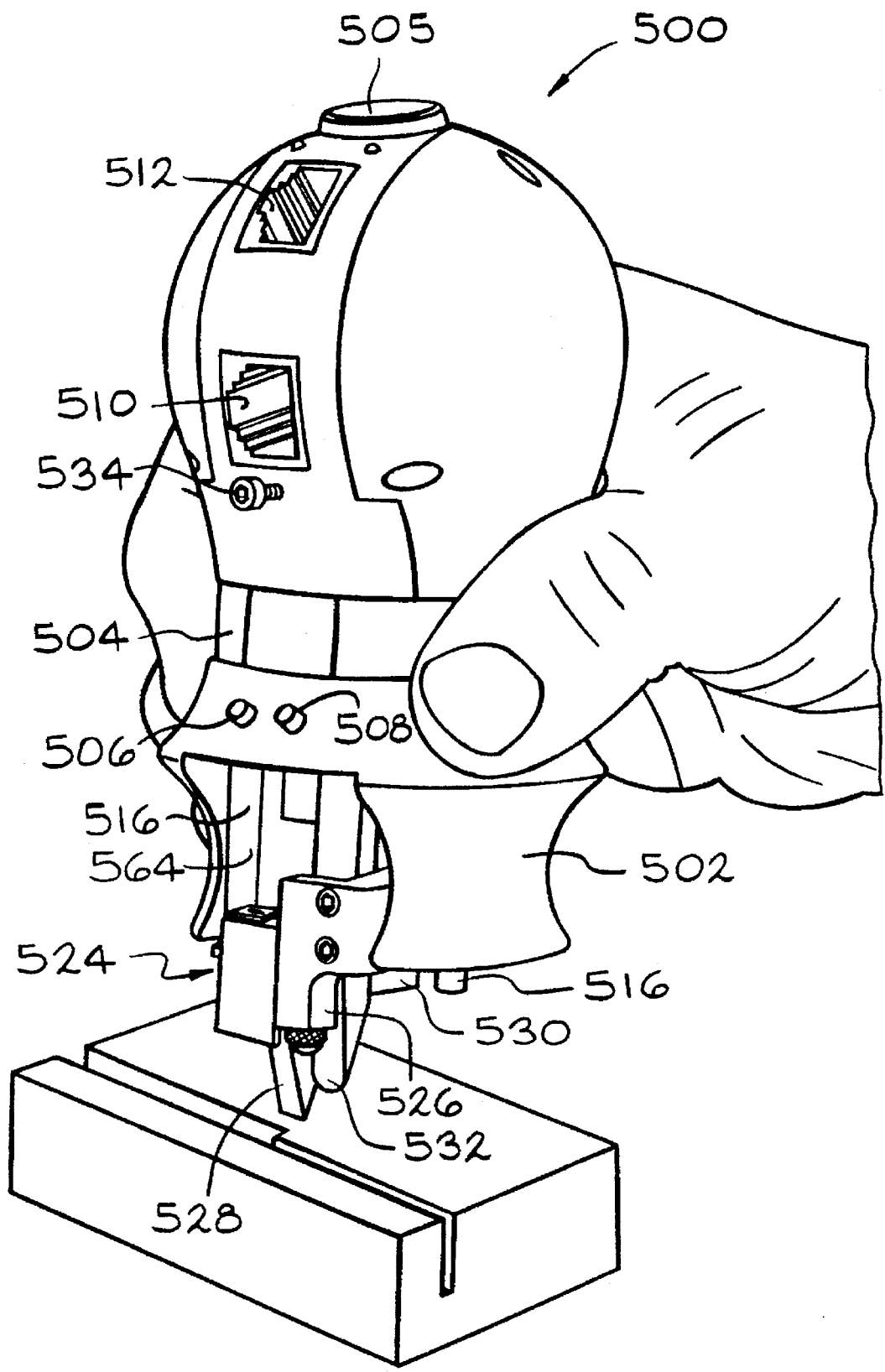
FIG. 33 is another perspective view of the upper portion of the measuring device shown in FIG. 32.
Figure 34:
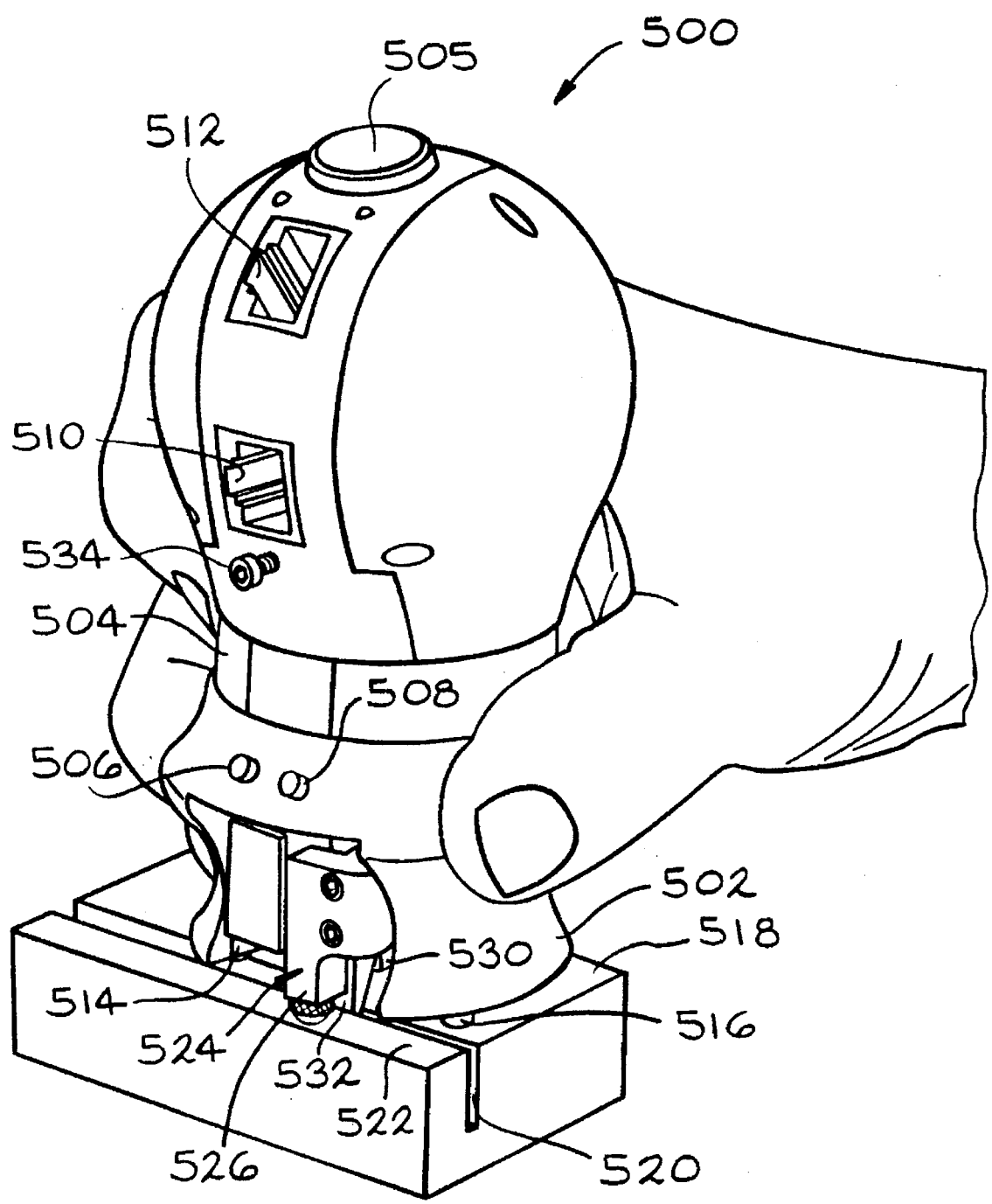
FIG. 34 is a perspective view of the measuring device illustrated in FIGS. 32 and 33 taking flush and gap measurements of two parts of an object and the gap between the two parts.

FIGS. 32 through 34 are perspective views of another embodiment of a hand-held flush and gap measuring device according to the invention, indicated generally at 500. The measuring device 500 includes a generally cylindrical housing 502. The housing 502 may be grasped by an operator in the manner shown to provide access to a tape switch 504 which may be actuated when it is desired to record flush and gap readings with the measuring device 500. A pushbutton manual record switch 505 is provided at the top of the measuring device 500 as an alternate location for initiating the recording of flush and gap readings. The manual record 505 may be more easily accessible, for example, when holding the measuring device 500 horizontally to take flush and gap readings between a pair of vertical surfaces.

A pair of LED lights provide easily seen indications for the operator. As will be further described below, a first LED 506 is illuminated when the measuring device 500 is properly positioned to take flush and gap readings. A second LED 508 is illuminated while the measuring device 500 is taking a flush and gap reading, and thus will be illuminated when the tape switch 504 or the manual record 505 are depressed, or other manual record switches on remote equipment are operated (such as the switch 162 in the data display portion 150 of the detecting circuit 146 illustrated in FIG. 11), or automatic readings are taken An output port 510 is provided which may be used to connect the measuring device 500 to, for example, a display unit 511 (shown in FIG. 58) with batteries for the measuring device 500 and a radio transmitter for transmitting flush and gap measurements to a remote radio receiver of a computer. A second output port 512 is provided which may be used to alternatively connect the measuring device 500 to, for example, an infrared transmitter mounted on the measuring device 500 for wireless transmission of the flush and gap measurements to the display unit 511. Indeed, as will be discussed below, it is contemplated that the measuring device 500 could contain a radio transceiver which could directly link the measuring device 500 to a radio transceiver linked to a separate microcomputer.

Figure 54:
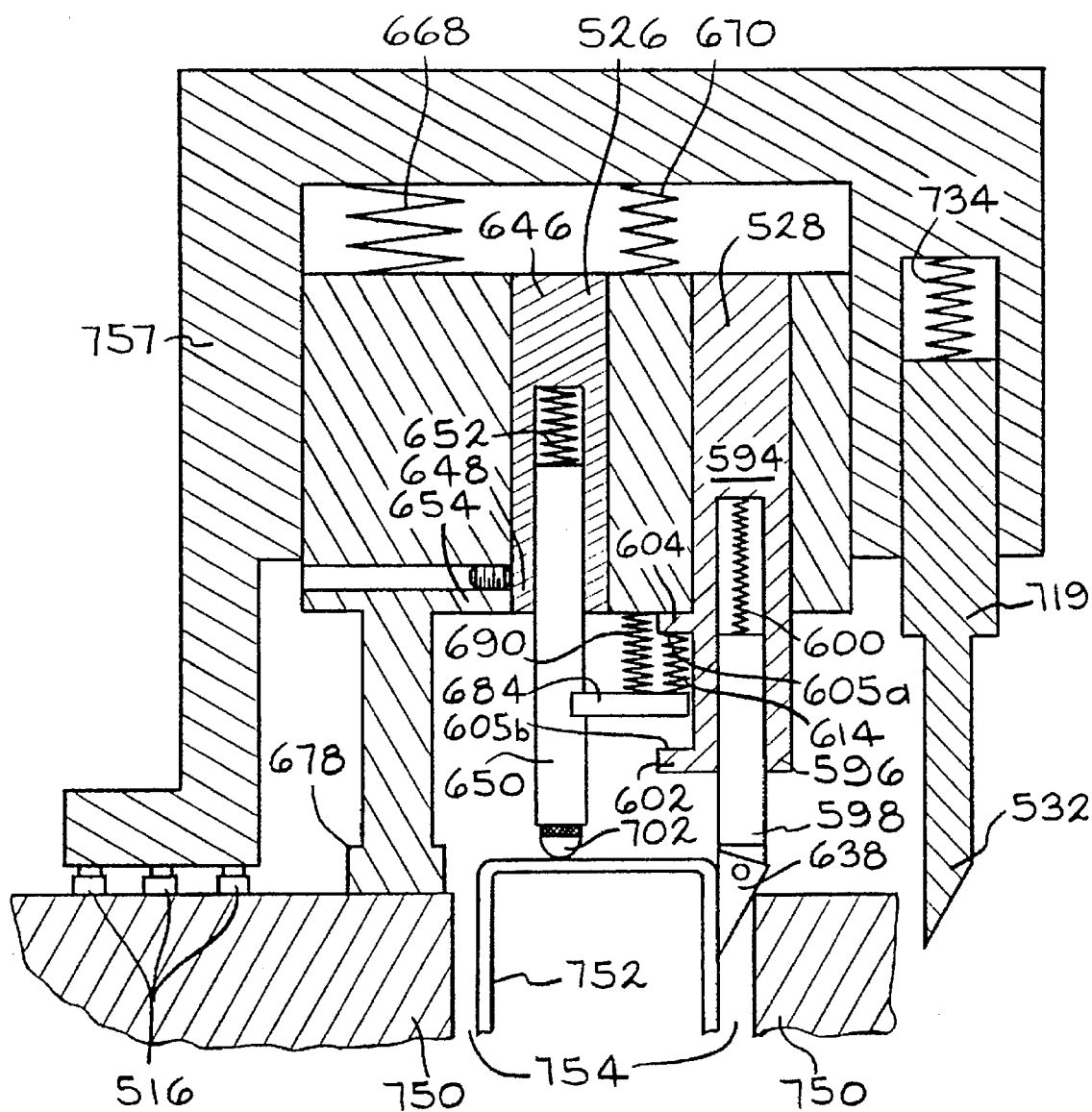
FIG. 54 is also a view similar to FIG. 52 with the part higher than the frame.

A first reference member 514 is fixed to the housing 502. The reference member 514 is provided with three spaced apart vertical orientation pads 516 similar to the reference pads 38 of the first embodiment shown in FIG. 1. As will be further explained below, and shown in FIG. 35, the vertical orientation pads 516 are screwed into respective plates 517 which are mounted on respective spring loaded rods 517a which extend vertically through the reference member 514. The vertical orientation pads 516 hold the reference member 514 in a desired vertical orientation which is normal to the plane defined by the three vertical orientation pads 516. The three vertical orientation pads 516 cooperate to provide a steady platform to support the measuring device 500 in engagement with a first part 518 along a gap 520 between the first part 518 and a second part 522, as shown in FIG. 54.

A probe and positioning assembly, indicated generally at 524, is mounted in the housing 502. As will be described in detail below, the probe and positioning assembly 524 includes a contour measuring element 526 (similar in purpose to the contour measuring element 56 illustrated in FIG. 1), a gap measuring element 528 (similar to the gap measuring element 40 illustrated in FIG. 1), a reference shoe 530 (which helps establish a reference plane for the gap measuring element 528 and the contour measuring element 526), and a spring loaded gap locating wedge 532 (which helps position the measuring device 500 relative to a gap, such as the gap 520).

As shown in FIG. 34, the spring loaded gap locating wedge 532 is positioned adjacent the gap measuring element 528, and extends into the gap 520 to be measured as the measuring device 500 is moved into engagement with the first part 518. The gap locating wedge 532 is transversely fixed relative to the housing 502 and thus helps to laterally located the measuring device 500 relative to the gap 520. If the gap 520 is narrower than the gap locating wedge 532, the gap locating wedge 532 will retract against the force of a spring (as discussed below) once the gap locating wedge 532 comes into contact with both the first part 518 and the second part 522, on either side of the gap 520. In certain circumstances, such as when the vertical orientation pads 516 are placed in prepared locating recesses (such as the locating recesses 295 illustrated in FIGS. 26 through 28), or when gap measurement is otherwise not desired, it is possible to keep the gap locating wedge 532 retracted. This is accomplished by manually pushing the gap locating wedge 532 to the retracted position, and screwing in a lock screw 534, which is threaded through the housing 502, to engage the gap locating wedge 532 and hold the gap locating wedge 532 in the retracted position. Unscrewing the lock screw 534 releases the gap locating wedge 532 to spring return to an extended position as shown in FIG. 32.

Figure 1:
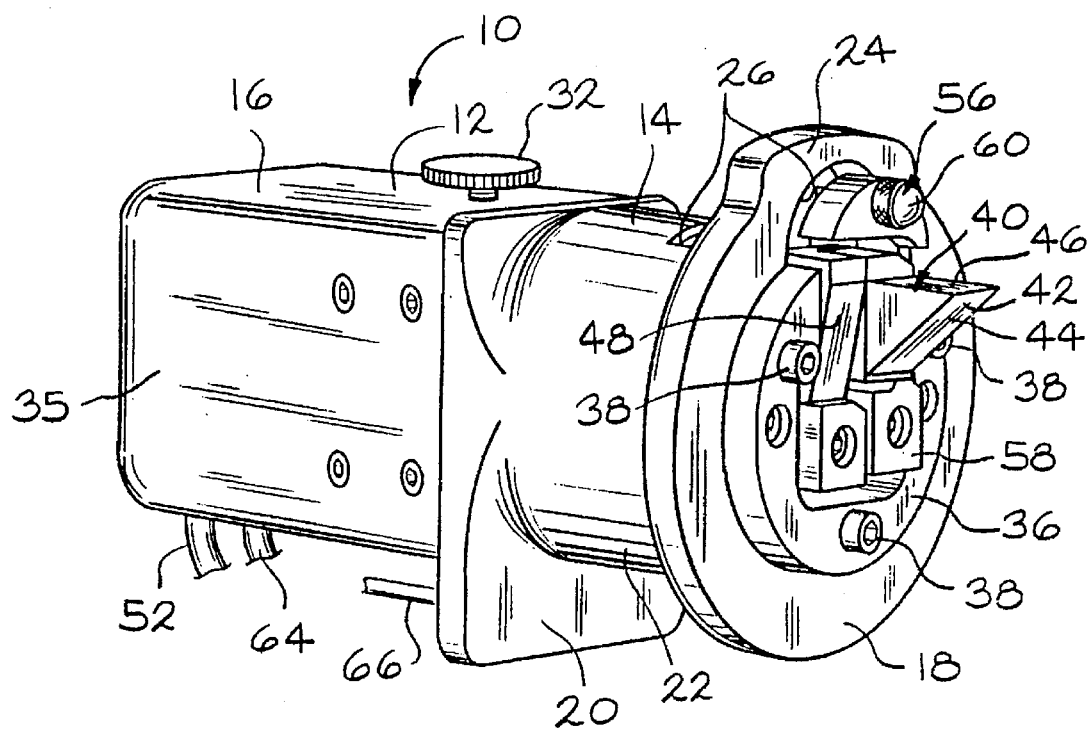
FIG. 1 is a perspective view of a hand-held gap and contour measuring device according to the invention.
Figure 2:
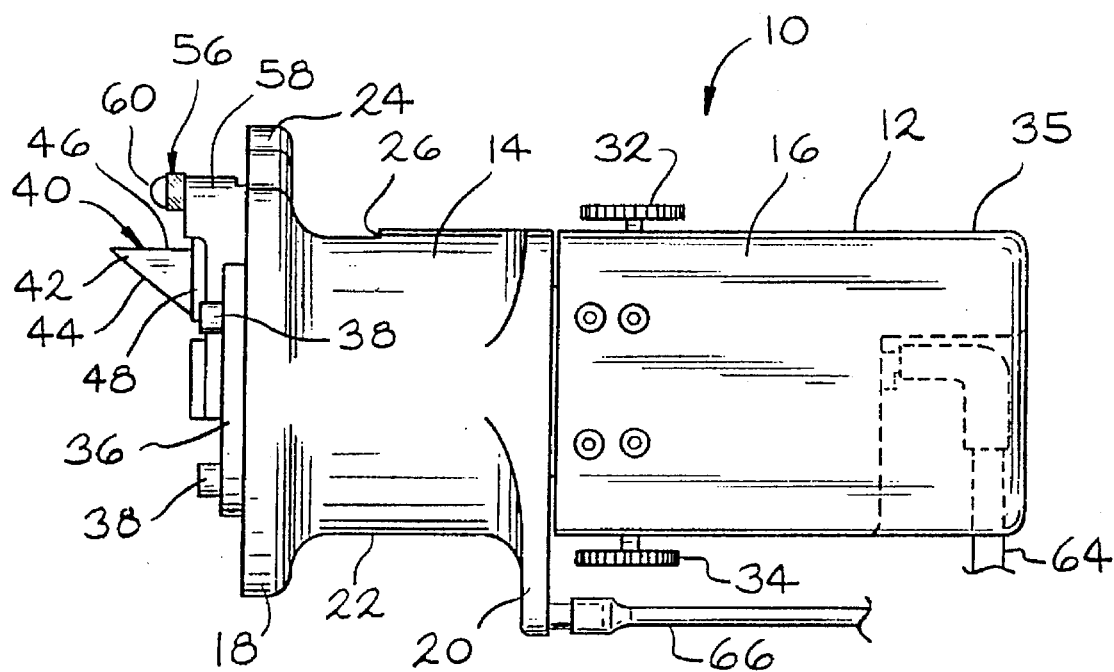
FIG. 2 is a side view of the measuring device illustrated in FIG. 1.
Figure 3:
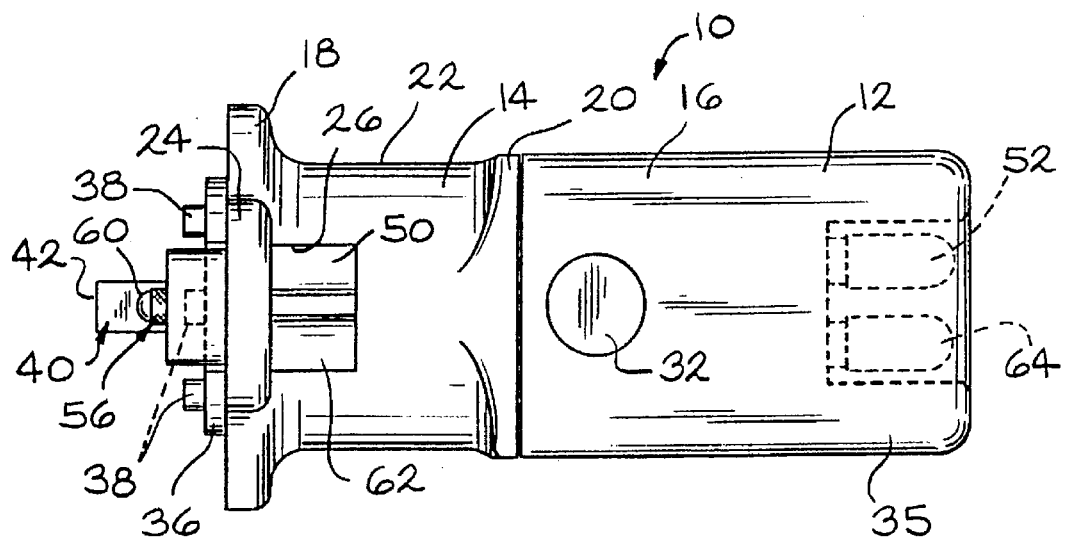
FIG. 3 is a top view of the measuring device illustrated in FIG. 1.
Figure 4:
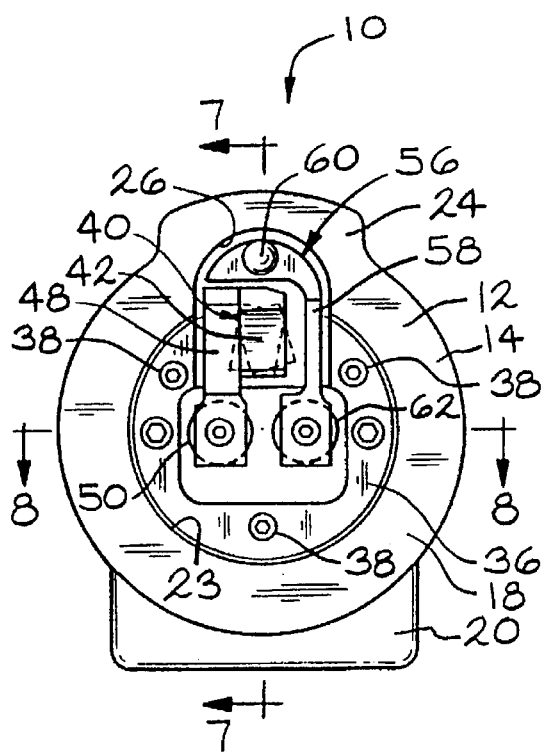
FIG. 4 is a first end view of the measuring device illustrated in FIG. 1.
Figure 5:
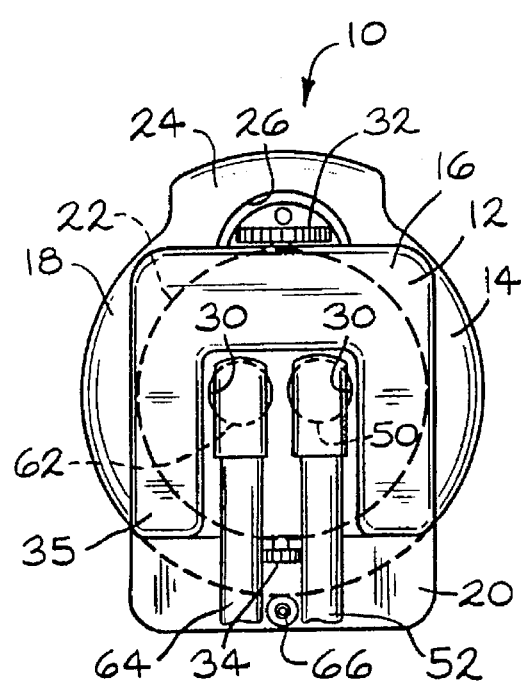
FIG. 5 is a second end view of the measuring device illustrated in FIG. 1, opposite from the end view of FIG. 4.
Figure 35:
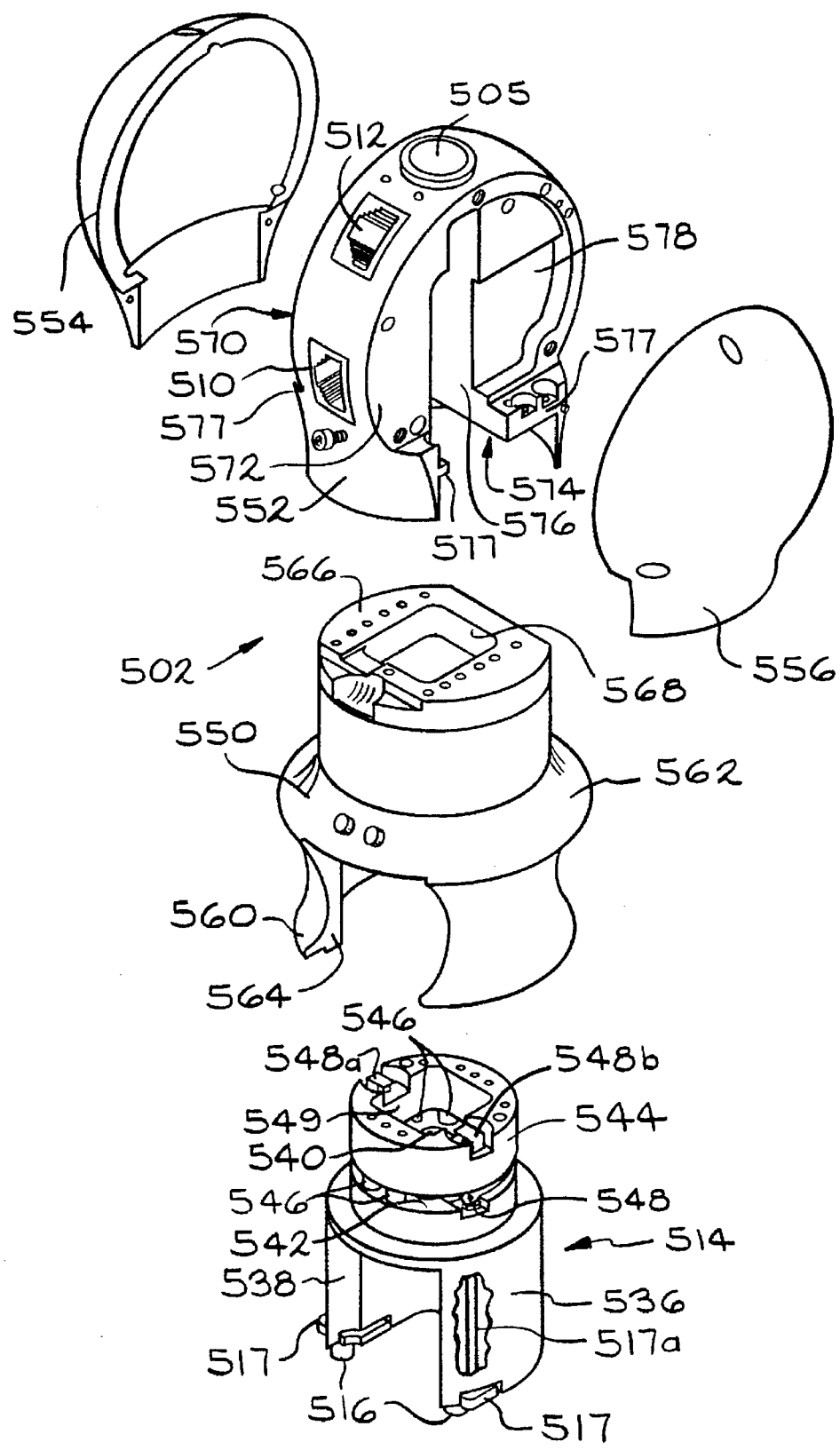
FIG. 35 is an exploded view of a housing and a reference member of the measuring device shown in FIG. 32.

FIG. 35 shows an exploded view of the housing 502 and reference member 514. The reference member 514 is generally cylindrical, with a lower skirt portion 536. The three vertical orientation pads 516 (only two are visible) are fixed to respective mounting plates 517 at the lower surface of the skirt portion 536. Preferably each mounting plate 517 has a plurality of threaded openings to permit affixing vertical orientation pads 516 in any of several configurations. Each plate 517 is mounted on a rod 517a. The rods 517a extend through, respective passages through the skirt portion 536. The rods 517a are spring loaded in a distal direction. A portion of each rod 517a is formed of an electrically insulating material such that the distal end and proximal ends of the rods 517a are electrically isolated from one another. A downwardly opening notch 538, similar in purpose to the opening 26 shown in FIG. 1, is formed in a front part of the skirt portion 536. A generally square vertical bore 540 is formed through the center of an otherwise closed upper surface 542 of the reference member 514.

The reference member 514 is rigidly connected to a mounting ring 544 by threaded fasteners. At three circumferentially spaced locations, pairs of spacers 546 (only two pairs of spacers 546 are visible) separate the mounting ring 544 from the reference member 514 to form a gap therebetween. Three cooperating pairs of electrical contacts 548 (only one pair is visible) are distributed such that one pair of contacts 548 is located between each two pairs of spacers 546. At each of these three locations, each pair of contacts 548 is disposed above a respective one of the rods 517a such that when one of the rods 517a is moved proximally, the rod 517a will cause the associated pair of contacts 548 to close. The three pairs of contacts 548 are connected in a series circuit. The two ends of that series circuit within the reference member 514 are two contact surfaces 548a and 548b on the proximal surface of the mounting ring 544, the purpose of which will be explained below.

The mounting ring 544 has a centrally disposed, generally square opening 549 extending vertically therethrough. The opening 549 is generally vertically aligned with the bore 540 in the reference member 514.

As indicated above, the three pairs of electrical contacts 548 are connected in series as part of an electrical circuit which indicates whether or not the measuring device 500 is properly engaging the first part 518. The mounting ring 544 is fixed to the housing 502 for movement therewith. Two electrical contacts (not shown) are mounted on the housing 502 which engage the contacts 548a and 548b to electrically couple the series circuit of the contacts 548 in the reference member 514 and mounting ring 544 with the rest of the electrical circuit. If, after all of the vertical orientation pads 516 are in contact with the surface of the first part 518, the housing 502 is pressed toward the surface of the first part 518 along a path which is not normal to the plane defined by the three vertical orientation pads 516, at least one of the pads 516 will not fully move the associated plate 517 and rid 517a to a proximal position. Therefore, at least one of the pairs of contacts 548 will not be closed to complete the circuit and the LED 506 will not illuminate, thereby indicating that the measuring device 500 is not yet properly engaging the part 518. When the measuring device 500 is properly oriented along an axis normal to the plane defined by the vertical orientation pads 516, all of the rods 517a will be moved proximally to close the associated pairs of the contacts 548, causing the LED 506 to illuminate.

The housing 502 includes a cylindrical grip portion 550, a U-shaped head portion 552, and two semi-hemispherical end caps 554 and 556.

The grip portion 550 includes a lower skirt portion 558. Two vertically spaced apart radially extending flanges 560 and 562 are part of a gripping surface which enables a user to easily grasp and position the measuring device 500 as shown in FIGS. 32 through 34. The LEDs 506 and 508 are prominently positioned on the front portion of the upper flange 562 where they are easily observed by the user. The tape switch 504 extends circumferentially about the grip portion 550 just above the upper flange 562 where the tape switch 504 may be easily selectively pressed by the thumb or forefinger of a user grasping the measuring device 500 as shown in FIGS. 32 through 34. A downwardly opening notch 564, similar in purpose to the opening 26 shown in FIG. 1, is formed in a front part of the skirt portion 558. The grip portion 550 has an upper end wall 566 with a generally square opening 568 centrally located therein to provide passage vertically through the grip portion 550. The mounting ting 544 of the reference member 514 is fastened to the lower surface of the upper end wall 566 so that the mounting ring 544 and the reference member 514 moves with the housing 502, as previously discussed. The opening 568 is vertically aligned with the opening 549 in the mounting ring 544 and the vertical bore 540 in the reference member 514.

The head portion 552 of the housing 502 is a generally spherical member, with two opposed flattened sides 570 and 572, a flattened bottom 574, and a notch 576 which opens to each of the sides 570 and 572 and the bottom 574. Flanges 577 extend outwardly from the sides 570 and 572 on each side of the notch 572, and are provided with openings through which threaded fasteners (not shown) extend to fasten the head portion 552 to the upper end wall 566 of the grip portion 550 of the housing 552. The notch 576 is vertically aligned over the opening 568 in the upper end wall 566.

The sides 570 and 572 have recessed portions 578 which, along with the notch 576 provide a space within which some of the electronic components (not shown) of the measuring device 500 are contained. Additionally, the two end caps 554 and 556, which are respectively mounted to the sides 570 and 572 are hollowed out to provide additional room within the housing 502 for the electronic equipment which includes such items as analog-to-digital converters, batteries, wiring to the first and second output ports 510 and 512 and to the tape switch 504 and the manual record switch 505 (which are mounted in the head portion 552 of the housing 502). Indeed, it is contemplated that the components of a complete micro computer may be contained within the housing 502. The micro computer may transmit a visual output to the display unit 511 via the second output port 512 and the previously mentioned infrared communications link. As will be further explained below, it is also contemplated that the micro computer could be wirelessly linked to another computer, such as by radio.

Figure 36:
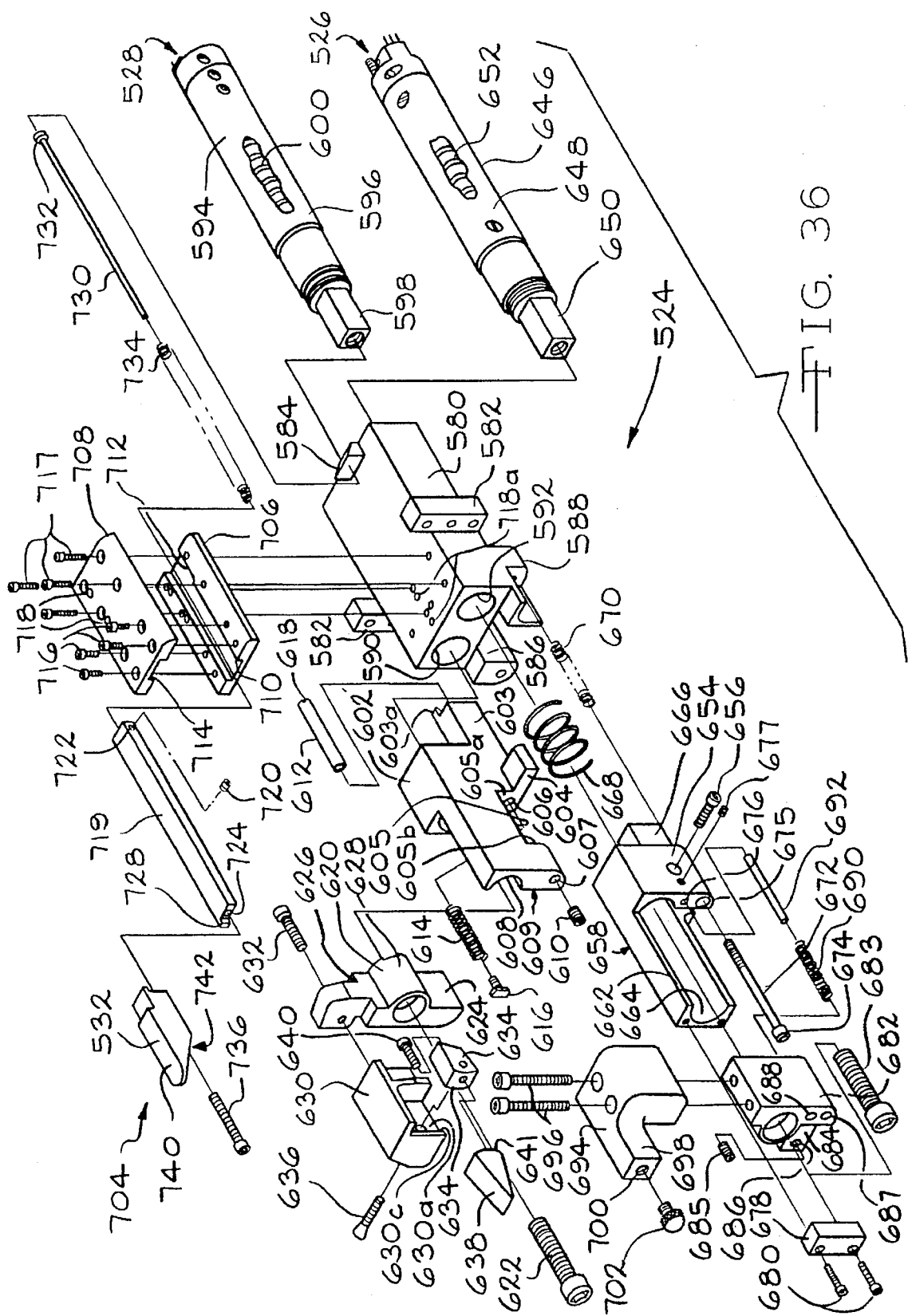
FIG. 36 is an exploded view of the probe and positioning assembly forming part of the measuring device shown in FIG. 32.

FIG. 36 is an exploded perspective view of the probe and positioning assembly 524, while FIGS. 37 through 42 illustrate the probe and positioning assembly 524 in assembled form. The probe and positioning assembly 524 includes a mounting body 580. The mounting body 580 includes a pair of outwardly extending flanges 582 and are provided with openings through which threaded fasteners (not shown) extend to fasten the mounting body 580 to the upper surface of the upper end wall 566 of the grip portion 550. One of the flanges 582 fits in the notch 576 between the flanges 577 on the side 570 of the head portion 552, while the other of the flanges 582 fits in the notch 576 between the flanges 577 on the side 572 of the head portion 552. The mounting body 580 also includes a third flange 584, a fourth flange 586 and a fifth flange 588, the purpose of which will be discussed below. A pair of spaced apart, axially extending bores 590 and 592 are formed through the mounting body 580.

The bore 590 receives a transducer 594, similar to the transducer 50 of the first embodiment described above. The transducer 594 is part of the gap measuring element 528. The transducer 594 includes a housing 596 and a plunger 598 which is urged toward an extended position by a spring 600 within the housing 596 (shown in FIG. 36). The transducer housing 596 is free to slide is within the bore 590.

Figure 37:
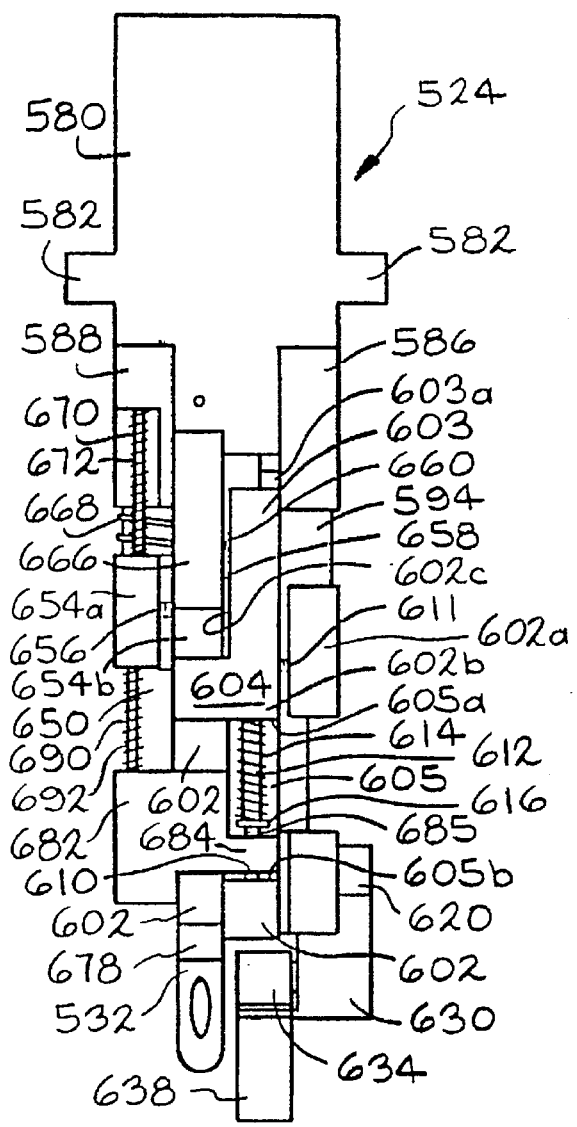
FIG. 37 is a rear elevation view of the probe and positioning assembly illustrated in FIG. 36.
Figure 38:
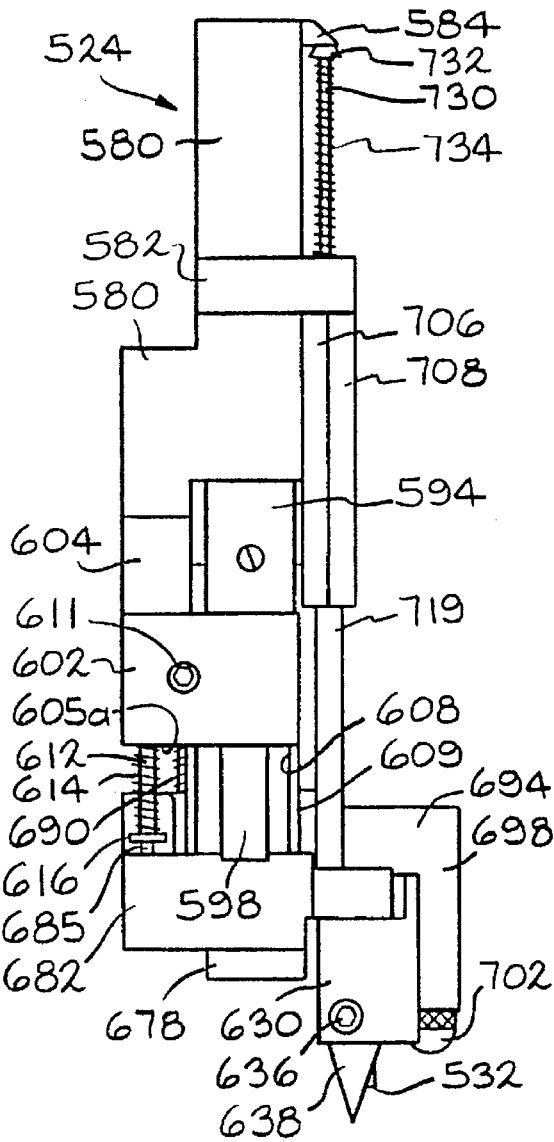
FIG. 38 is a right side elevation view of the probe and positioning assembly.
Figure 39:
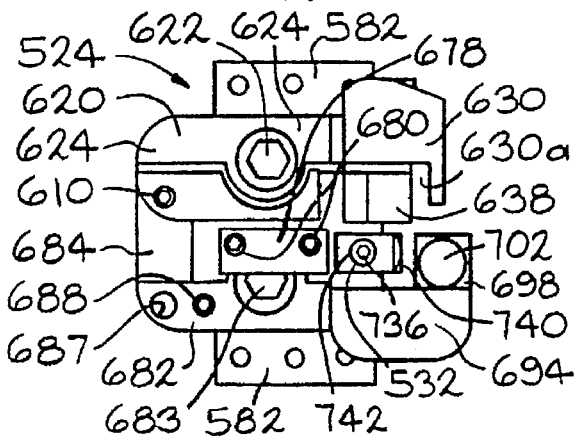
FIG. 39 is a bottom plan view of the probe and positioning assembly.

A split-ring clamp 602 has two arms 602a and 602b which are clamped about the transducer housing 596 to prevent relative movement therebetween. As best seen in FIG. 37, the clamp 602 includes an arm 603 extending vertically from the arm 602b. A boss 603a on the right edge of the upper surface of the arm 603 guides the upper end of the clamp 602 on the adjacent surface of the flange 586. The boss 603a may be formed from a threaded fastener, the head of which is suitably ground flush with the right vertical surface of the arm 603. An arm 604 extends horizontally leftward (again as seen in FIG. 37) from a face 602c of the clamp 602. A notch 605 is formed in the rearward face of the clamp 602. The notch 605 has two opposed faces, 605a and 605b. The face 605a is the face closest to the mounting body 580. The face 605b is, therefore, the face of the notch 605 farthest from the mounting body 580. A smooth sided bore 606 is formed in the face 605a. A threaded bore 607 extends axially from a distal face of the clamp 602 to the face 605b of the notch 605. An axially extending groove 608 having a semicircular cross section is formed on a face 609 of the clamp 602 opposite the face 605. A set screw 610 is threaded into the bore 607, for a purpose which will be explained below. As seen in FIGS. 37 and 38, a threaded fastener 611 passes through the arm 602a of the clamp 602 and is screwed in to the other arm 602b to draw the arms 602a and 602b of the split ring clamp 602 tightly about the housing 596 of the transducer 594.

An internally threaded tube 612 is slidably received in the bore 606. The tube 612 extends out of the bore 606 through a spring 614, and is threaded onto a T-shaped bolt 616. Preferably the tube 612 is provided with a screwdriver slot 618 at one end thereof to facilitate threading the T-shaped bolt 616 onto the other end thereof.

The plunger 598 of the transducer 594 is rigidly fixed to a first intermediate member 620 by a threaded fastener 622. The first intermediate member 620 has a pair of opposed arms 624 and 626 joined by an arcuate web 628. As the first intermediate member 620 reciprocates with the plunger 598, the web 628 travels in the groove 608 in the clamp 602. The arms 624 and 626 extend perpendicularly to the travel path of the plunger 598.

Figure 43:
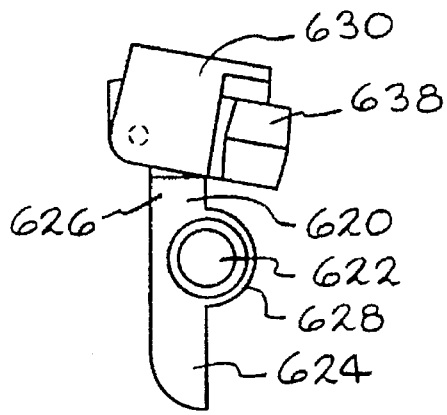
FIG. 43 is an enlarged view of a gap measuring element shown in FIG. 39, shown with a second intermediate member pivoted to a fully clockwise position.
Figure 44:
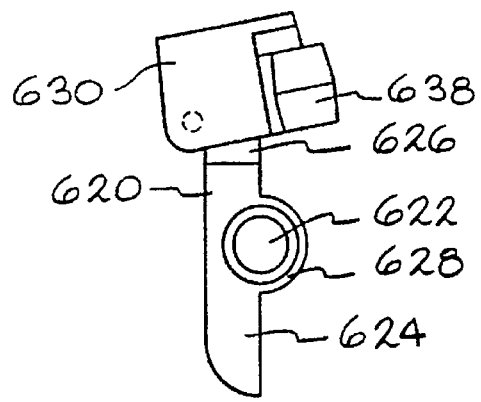
FIG. 44 is a view similar to FIG. 43 showing the second intermediate member pivoted fully counter clockwise.

A second intermediate member 630 is pivotally attached to the first intermediate member 620 by a threaded fastener 632 which is threaded into both the second intermediate member 630 and the first intermediate member 620. FIGS. 43 and 44 show the second intermediate member 620 in, respectively, forward-most and rearward-most positions. The second intermediate member 630 pivots about an axis which is parallel to, but in front of, the axis of movement of the plunger 598. The threaded fastener 632 is partially unscrewed from the fastener 632 and moves away from the first intermediate member 620 as the second intermediate member 630 pivots counterclockwise to the forward-most position, and is screwed onto the fastener 632 and moves toward the first intermediate member 620 as the second intermediate member 630 is rotated clockwise. This threaded pivoting movement allows the second intermediate member 630 to pivot freely, but without the relatively large clearances and resultant "slop" that would be required to achieve the same freedom of movement if the second intermediate member 630 were pivoting about a smooth pin without prohibitively expensive precision machining.

Figure 42:
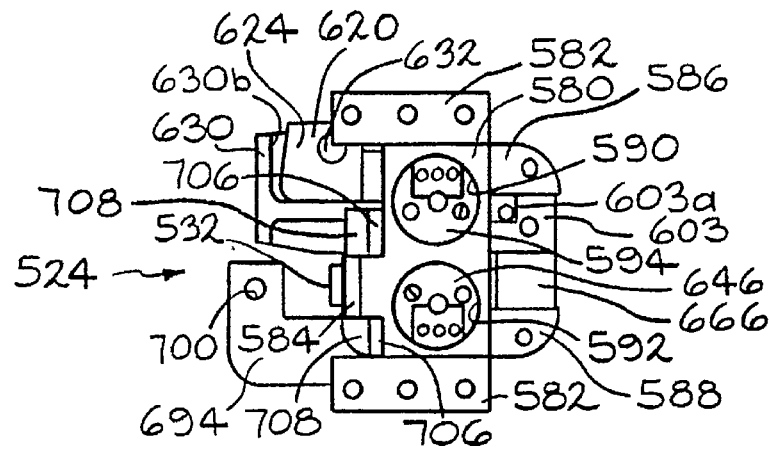
FIG. 42 is a top plan view of the probe and positioning assembly.
Figure 40:
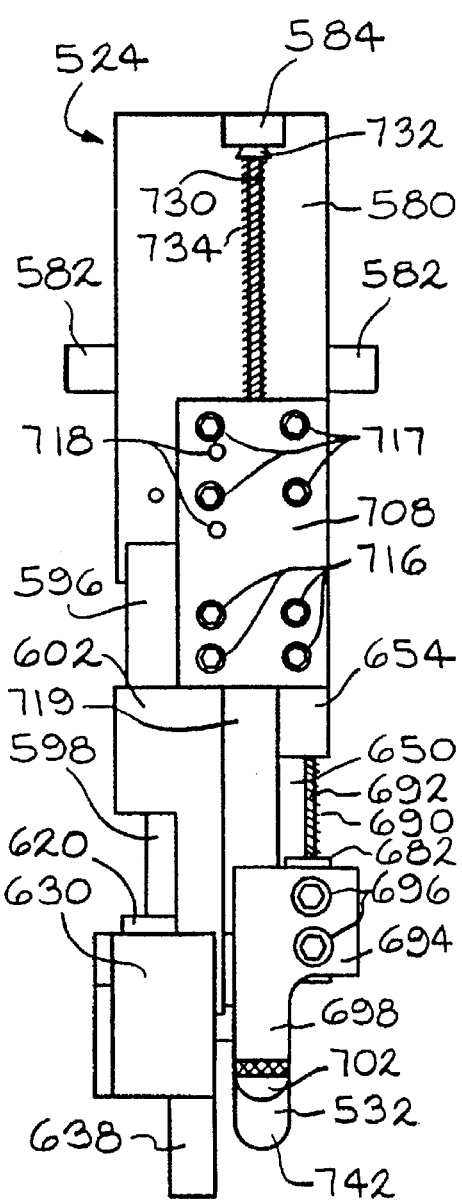
FIG. 40 is a front elevation view of the probe and positioning assembly.

The second intermediate member 630 is a generally rectangular block with cubical recesses 630a (seen in FIGS. 36, 39 and 41) and 630b (seen in FIGS. 38 and 42) where a pair of diametrically opposed corners would otherwise be. The recess 630a has a lip 630c along the distal edge thereof. As best seen in FIG. 42, the arm 624 of the first intermediate member 620 is pivotally attached to the second intermediate member 630 within the recess 630b. The sides of the recess 630b limit the range of pivotal movement between the first intermediate member 620 and the second intermediate member 630. Thus the second intermediate member 630 cannot be pivoted about 360° to unscrew the second intermediate member 630 from the fastener 632. A tool must be used to unscrew the fastener 632 from the second intermediate member 630 and first intermediate member 620.

Figure 45:
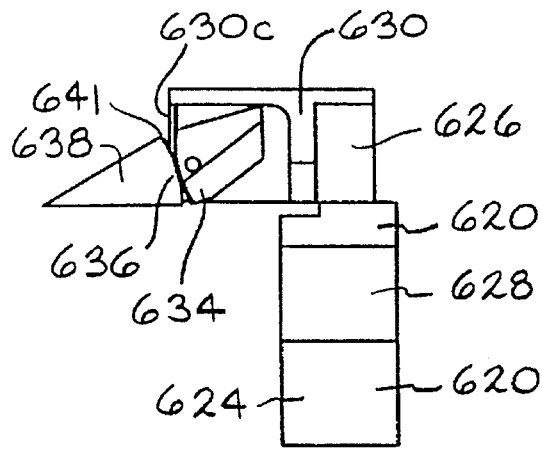
FIG. 45 is an elevational view of the gap measuring element showing a third intermediate member in a proximal end forward-most a position.
Figure 46:
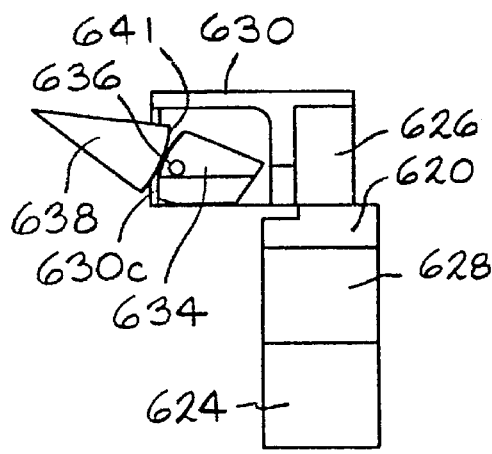
FIG. 46 is a view similar to FIG. 45 showing the third intermediate member in a proximal end rearward-most position.

A third intermediate member 634 is pivotally attached to the second intermediate member 630 within the recess 630a of the second intermediate member 630 by a threaded fastener 636. The third intermediate member 634 pivots about an axis which is perpendicular to, but in front of, the axis of movement of the plunger 598. The distal face of the third intermediate member 634 engages the lip 630c of the recess 630a, thus limiting the pivotal movement of the third intermediate member 634 relative to the second intermediate member 630. FIGS. 45 and 46 show the third intermediate member 634 in, respectively, upper end forward-most and upper end rearward-most positions.

Figure 47:
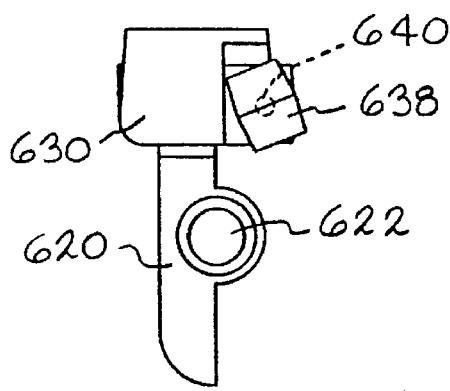
FIG. 47 is a view similar to FIGS. 43 and 44 showing the wedge in a counterclockwise-most position.
Figure 48:
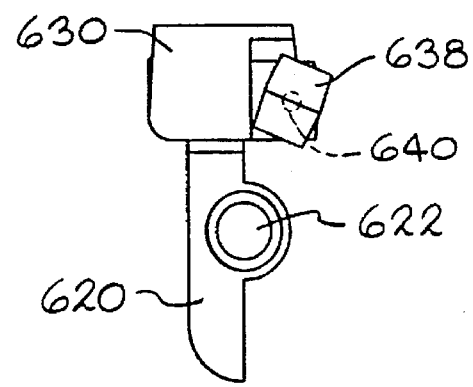
FIG. 48 is a view similar to FIG. 47 showing the wedge in a clockwise-most position.

A wedge 638 is pivotally fastened to the third intermediate member 634 by a threaded fastener 640 which is threaded into both the wedge 638 and the third intermediate member 634. The third intermediate member 634 pivots about an axis which is parallel to, but in front of, the axis of movement of the plunger 598. The wedge 638 preferably has a rounded proximal face 641 to minimize binding between the proximal face 641 thereof and the adjacent distal face of the third intermediate member 634 when the wedge 638 pivots. The distal face of the third intermediate member 634 is also preferably rounded. The wedge 638 is narrower than the third intermediate member 634, and thus does not engage the lip 630c of the recess 630 except at the extremes of pivotal movement of the wedge 638. FIGS. 47 and 48 show the wedge 638 in, respectively, counterclockwise-most and clockwise-most positions. The wedge 638 is screwed onto the fastener 640 and toward the third intermediate member 634 as the wedge 638 is pivoted clockwise, and unscrewed therefrom as the wedge 638 is pivoted counterclockwise. The wedge 638 hits the lip 630c at the limits of rotation of the wedge 638 and so is prevented from rotating 360°. The wedge 638 thus cannot be removed from the third intermediate member 634 without unscrewing the fastener 640 with a tool.

Figure 49:
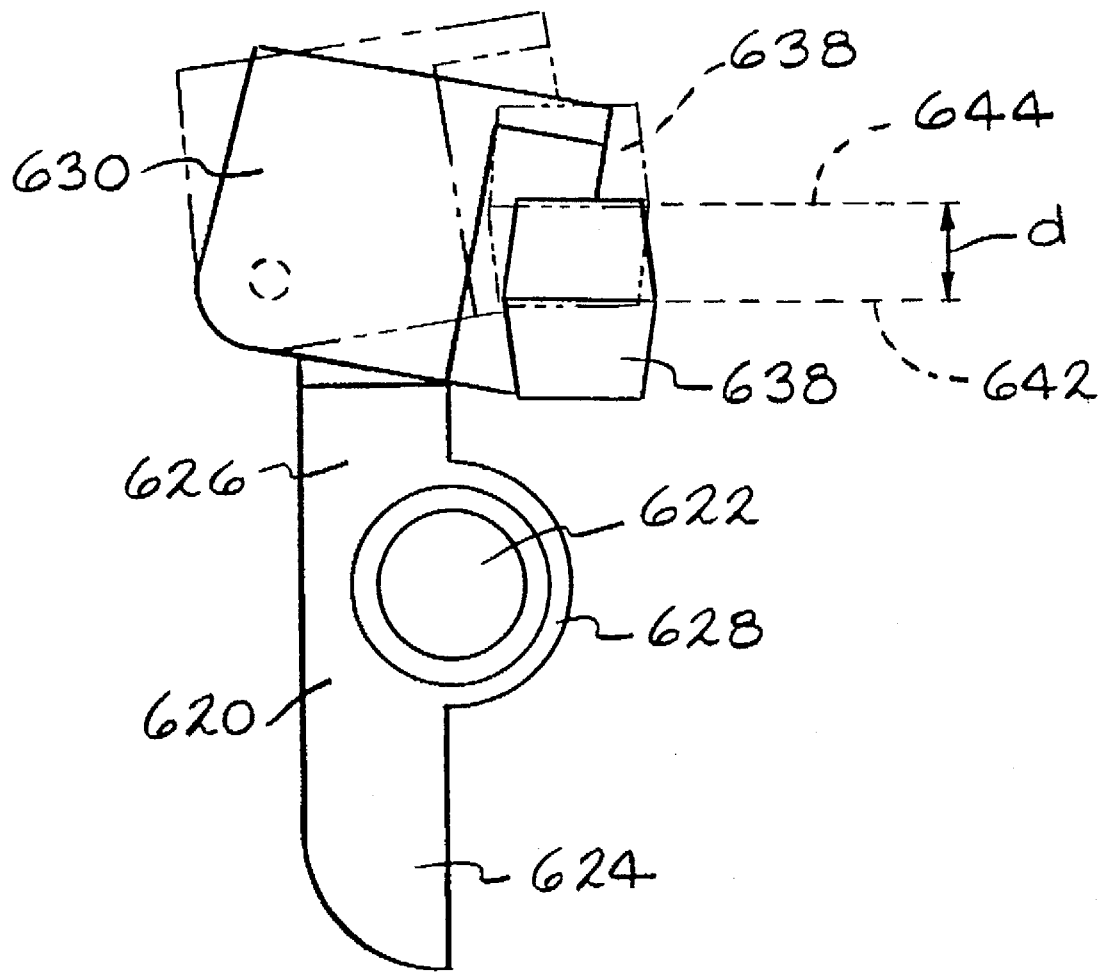
FIG. 49 is a view similar to FIGS. 43 and 44, illustrating the range of movement of the wedge relative to the gap measuring element transducer.

FIG. 49 illustrates how the pivoting of the second intermediate member 630 and the wedge 638 cooperate to allow the wedge 638 to engage a gap at a variety of distances within a range "d" from the axis of the plunger 598, which passes through the center of the fastener 622. The dashed line 642 represents the centerline of a first gap which the wedge 638 is shown (in the solid line) lined up to engage. However, if the gap were further away from the axis of the plunger 598, for example at the position marked with the dashed line 644, the second intermediate member 630 could be rotated counterclockwise to the position shown in phantom to move the wedge 638 forwardly over the gap. At the same time the wedge 638 could be rotated clockwise to the position shown in phantom, to bring the lower edge of the wedge into alignment with the centerline 644 of the gap.

Referring again to FIGS. 36 through 48, the threaded fastener 640 has a thread pitch which is equal to the thread pitch on the threaded fastener 632. Thus as the fastener 632 and the second intermediate member 630 are screwed out of the first intermediate member 620, the distance between the first intermediate member 620 and the second intermediate member 630 will increase. However, as the wedge 638 is moved forwardly, in order to maintain the bottom edge of the wedge 638 parallel to its original position, the wedge 638 is pivoted clockwise, screwing the wedge 638 onto the fastener 640, and decreasing the distance between the first intermediate member 620 and the wedge 638. The effects of movement of the second intermediate member 630 and the wedge 638 will tend to cancel each other out, so that the wedge 638 tends to remain at a relatively constant distance from the first intermediate member 620.

The bore 592 receives a transducer 646, similar to the transducer 62 of the first embodiment described above. The transducer 646 is part of the contour measuring element 526. The transducer 646 is free to slide within the bore 592. The transducer 592 includes a housing 648 and a plunger 650 which is urged toward an extended position by a spring 652 within the housing 648 (as shown in FIG. 36).

Figure 41:
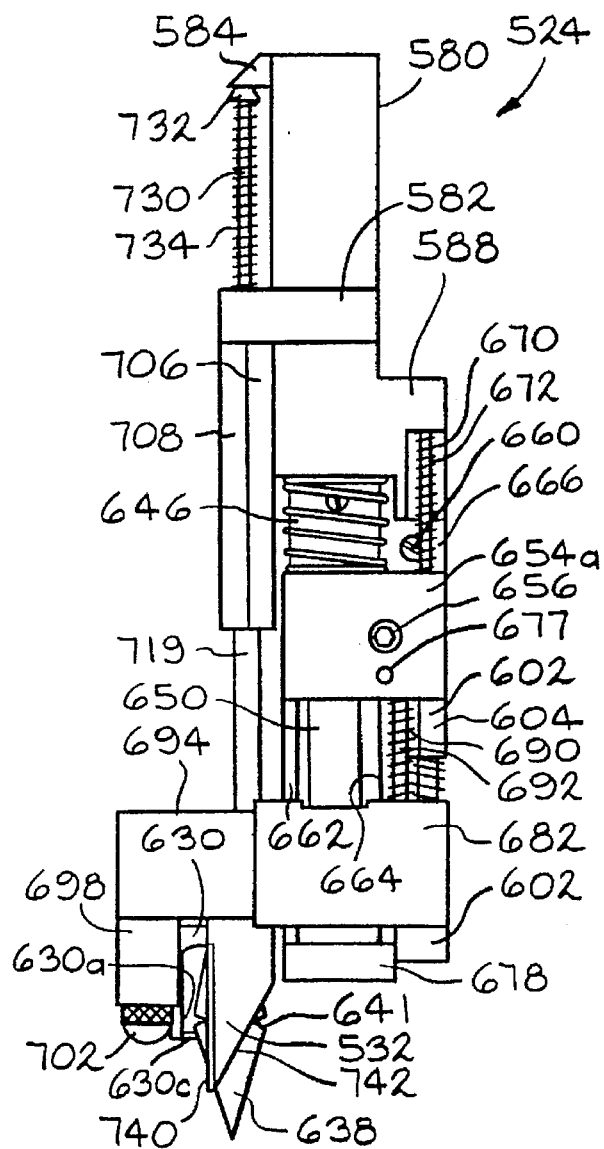
FIG. 41 is a left side elevation view of the probe and positioning assembly.

A split-ring clamp 654 has two arms 654a and 654b which are clamped about the transducer housing 648. Referring to FIGS. 37 and 41, the clamp 654 is tightened by inserting a threaded fastener 656 through the arm 654a of the clamp 654 and screwing the fastener 656 into the other arm 654b. The clamp 654 has a first face 658 disposed adjacent the face 602c of the clamp 602. In order to prevent the adjacent faces 602c and 658 from rubbing together and possibly galling, a threaded bearing member 660 (which may be, for example, made of nylon) is provided. The bearing member 660 is screwed into a bore through the clamp 654 so that the member 660 emerges from the bore to engage the face 602c of the clamp 602. The bearing member 660 spaces the faces 602c of the clamp 602 away from the face 658 of the clamp 654.

The clamp 654 has a face 662 opposite the face 658. An axially extending groove 664 having a semicircular cross section is formed in the face 662, similar to the groove 608 formed on the clamp 602. A flange 666 extends rightwardly (as seen in FIG. 41) and upwardly (as seen in FIG. 37) from the clamp 654.

As will be described below, the flange 666 can be engaged by the arm 604 of the clamp 602 to urge the clamp 654 toward the mounting body 580. A spring 668 is coiled about the transducer housing 650 between the clamp 602 and the mounting body 580. The spring 668 urges the clamp 602 away from the mounting body 580.

Acting in parallel to the spring 668 is a spring 670 also acting between the flange 588 on the mounting body 580 and the clamp 602 to urge the clamp 602 away from the mounting body 580. A threaded fastener 672 having an enlarged head 674 extends through a stepped bore 675 in the clamp 654, through the spring 670, and is threaded into the flange 588 on the mounting body 580. The fastener is 672 retains the spring 670 in position. The head 674 on the fastener 672 acts as a stop limiting movement of the clamp 654 away from the mounting body 580 by engaging the step (not shown) in the bore 675. An axially extending recess 676 is formed in the clamp 654 adjacent the bore 675. A set screw 677 is threaded into the clamp 654 in a threaded bore which intersects the recess 676 at right angles to the axis of the recess 676. The purpose of the recess 676 and set screw 677 will be explained below.

A reference shoe 678 is fixed to the lower end (as shown in FIG. 41) of the clamp 654 by a pair of threaded fasteners 680. As will be discussed below, the reference shoe 678, which is connected in fixed relation to the transducer housing 648 of the contour measuring element 526, contacts the surface of the fixture or part acting as a reference surface during contour measurements to position the transducer housing 648 a precise distance away from the surface, thereby setting the position of the mechanical zero for readings by the transducer 646.

A first support member 682 is rigidly fixed by a threaded fastener 683 to the end of the plunger 650 of the transducer 646. An arcuate web 682a cooperates with the main portion of the first support member 682 to define a stepped bore which extends axially through the first support member 682 and which receives the threaded fastener 683. As the first support member 682 reciprocates with the plunger 650, the arcuate web 682a of the first support member 682 travels in the groove 664 in the clamp 654. The first support member 682 has an arm 684 which extends (as shown in FIG. 37) horizontally rightwardly into the notch 605 formed in the clamp 602. A set screw 685 is threaded into an axially extending bore 686 which extends axially through the arm 684. The set screw 685 may extend out of the proximal face of the arm 684 to bear against the T-shaped bolt 616. Advancing the set screw 685 toward the clamp 602 increases the spring tension in the spring 614, while unscrewing the set screw 685 retracts the set screw 685 into the arm 684 and lessens the spring tension in the spring 614.

An axially extending access bore 687 through the first support member 682 allows a user to insert a driver tool shaft (not shown) through the access bore 687 to engage the threaded fastener 672. Thus, awkward offset driver tools (e.g., 90° bend alien wrenches) would not be needed to screw the fastener 672 into or out of the clamp 654. Such an adjustment might be required, for example to adjust the axial position of the head 674 of the fastener 672, which, as discussed above, acts as a mechanical stop determining the farthest position of the clamp 602 away from the mounting body 580.

A second axial bore 688 through the first support member 682 is stepped with an enlarged bore opening toward the clamp 654. A spring 690 is seated at one end on the step within the bore 688, and at the other end is seated against the clamp 654 about the recess 676. A pin 692 extends axially through the spring 690 and is seated in the recess 676. The set screw 677 retains one end of the pin 692 in the recess 676 in the clamp 654. The other end of the pin 692 is sliding to be received in the reduced diameter portion of the bore 688, extending beyond the step (not shown) in the bore 688. The pin 692 acts to retain the spring 690 in position.

The spring 690 urges the first support member 682 away from the clamp 654. Since the clamp 654 is fastened about the housing 646 of the transducer 646, and the first support member 682 is fixed to the plunger 650 of the transducer 646, the spring 690 acts in parallel to the spring 652 within the transducer 652 to urge the plunger 650 toward an extended position.

A second support member 694 is fastened to the front face of the first support member 682 by a pair of threaded fasteners 696. The second support member 694 has a distally extending probe arm 698. The probe arm 698 has an threaded bore 700 extending axially therethrough. A threaded contact tip 702, similar to the contact tip 60 described above, is screwed into the distal end of the threaded bore 698 to complete the contour measuring element 526.

The gap locating wedge 532 is part of a locating assembly 704 which also includes the lock screw 534 shown in FIGS. 32 through 35. The locating assembly 704 includes a pair of bearing plates 706 and 708. The bearing plate 706 includes an axially extending stepped groove 710. The groove 710 has a rectangular cross section. The width of the groove 710 on the proximal side of a step 712 defined in one side of the groove 710 is greater than the width of the groove on the distal side of the step 712. The bearing plate 708 similarly has an axially extending stepped groove 714 which is a mirror image of the groove 710 in the bearing plate 706.

The distal portion of the bearing plates 706 and 708 are fastened together by four threaded fasteners 716 passing through the plate 708 and threaded into the bearing plate 706. The stepped grooves 710 and 714 are mated to form an axially extending stepped passage through the joined bearing plates 706 and 708. The bearing plates 706 and 708 are fastened to the front of the mounting block 580 by four threaded fasteners 717 passing through the plates 706 and 708 and threaded into the distal end of the front face of the mounting body 580. To facilitate alignment of the fasteners with the corresponding threaded recesses in the mounting body 580 during assembly, the bearing plates 706 and 708 are provided with a pair of alignment holes 718 through which temporary alignment pins can be inserted into corresponding alignment recesses 718a formed in the mounting body 580.

A shaft 719 having a rectangular cross section is slidably received in the passage formed by the stepped grooves 710 and 714. A set screw 720 is threaded into a threaded recess 722 in the shaft 719 near the proximal end thereof, for a purpose which will be described below.

A bore 724 extends axially through the shaft 719. The proximal of the bore 724 has an enlarged diameter to define a step (not shown) within the bore 724 near the proximal end thereof. The distal end of the bore 724 is threaded. A flange 728 extends distally from one side of the distal face of the shaft 719 adjacent the bore 724. The purpose of the threads in the bore 724 and of the flange 728 will be explained below.

A pin 730 is slidably received in the proximal end of the bore 724. The pin 730 has an enlarged head 732 at the proximal end thereof. A spring 734 is coiled about the pin 730 and acts between the step within the bore 724 and the head 732 to urge the shaft 719 and the pin 730 apart. The head 732 of the pin bears against the flange 584 on the mounting body 580. The spring 734 therefore acts to urge the shaft 719 to extend distally with respect to the mounting body 580 and the bearing plates 706 and 708 fixed to the mounting body 580. The set screw 720, which extends out of the side of the shaft 719, engages the step 712 on the beating plate 706 and the corresponding step on the beating plate 708 to limit the distal range of motion of the shaft 719 and to prevent the spring 734 from ejecting the shaft 719 from between the bearing plates 706 and 708.

The bore 724 through the shaft 719 is threaded at the distal end thereof to accept a threaded fastener 736. The fastener 736 rigidly fixes the locating wedge 532 to the distal end of the shaft 719. The flange 728 extends from the distal face of the shaft 719 adjacent the locating wedge 532 to prevent the locating wedge 532 from rotating relative to the shaft 719. A flange 738 on the proximal face of the locating wedge 532 abuts the front face of the shaft 719, and thus also prevents the locating wedge 532 from pivoting about the fastener 736.

The locating wedge 532 has an axially extending front face 740, and a rear face 742 which is inclined distally toward the front face 740. The fastener 736 passes through an axially extending bore 744 which extends between the rear face 742 and the proximal face of the locating wedge 532 (best seen in FIGS. 37 and 39).

As previously indicated the locating wedge 532 can be locked in a retracted position. To accomplish this, the locating wedge 532 is manually pushed proximally, compressing the spring 734. The lock screw 534 is then screwed into the head portion 552 of the housing 502 such that the lock screw engages the shaft 719 above the bearing plates 706 and 708. The lock screw 534 will then frictionally hold the shaft 719 in place against the force of the spring 734, with the locating wedge 532 retracted, until the lock screw 532 is backed off by the user.

Figure 50:
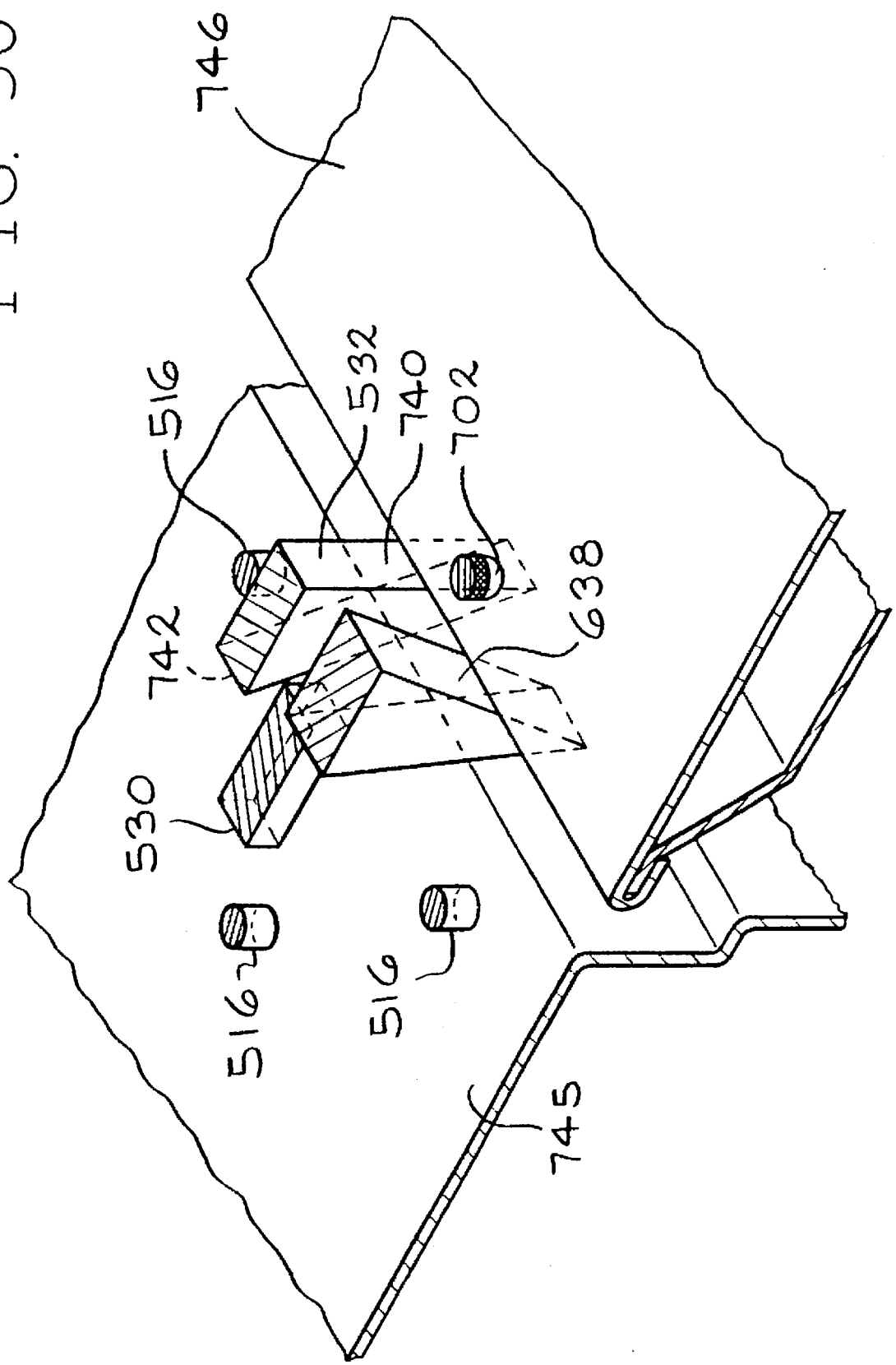
FIG. 50 is a broken perspective view of the measuring device positioned to measure a gap.

FIG. 50 is a partial view of the components of the measuring device 500 which come into contact with either a first part 745 or a second part 746. The three vertical orientation pads 516 are spaced apart to form a stable platform for supporting the measuring device 500 on the first part 745. The measuring device 500 is vertically oriented along an axis normal to the plane defined by the three vertical orientation pads 516. The reference shoe 530 contacts the first part 745 at a location generally centrally located within the area bounded by the vertical orientation pads 516. The gap locating wedge 532 extends into the gap between the first part 745 and the second part 746, as does the wedge 638 of the gap measuring element 528. The contact tip 702 of the contour measuring element 526 contacts the second part 746.

In use, the measuring device 500 is moved downwardly so that the wedge 638 of the gap measuring element 528 and the gap locating wedge 532 are inserted into the gap between the first part 745 and the second part 746. The measuring device 500 is then simultaneously urged downwardly until the vertical orientation pads 516 contact the first part 645 and forwardly so that that front face 740 contacts the edge of the second part 746. If the rear face 742 of the gap locating wedge 532 contacts the first part 745, the spring 730 will compress to allow the gap locating wedge 532 to retract as required. With the gap locating wedge 532 in contact with the edge of the second part 746, and the measuring device 500 with the front of the measuring device 500 generally facing the second part 746, the measuring device 500 will be positioned so that the gap between the first part 745 and the second part 746 is within the range "d" of the pivotally mounted wedge 638 shown in FIG. 49. If the measuring device 500 is then pressed downwardly so as to remain in the vertical orientation determined by the vertical orientation pads 516, the contacts 548 will close, allowing measurements to be taken of the width of the gap between the parts 745 and 746 and of the difference in height between the parts 745 and 746.

Figure 51:
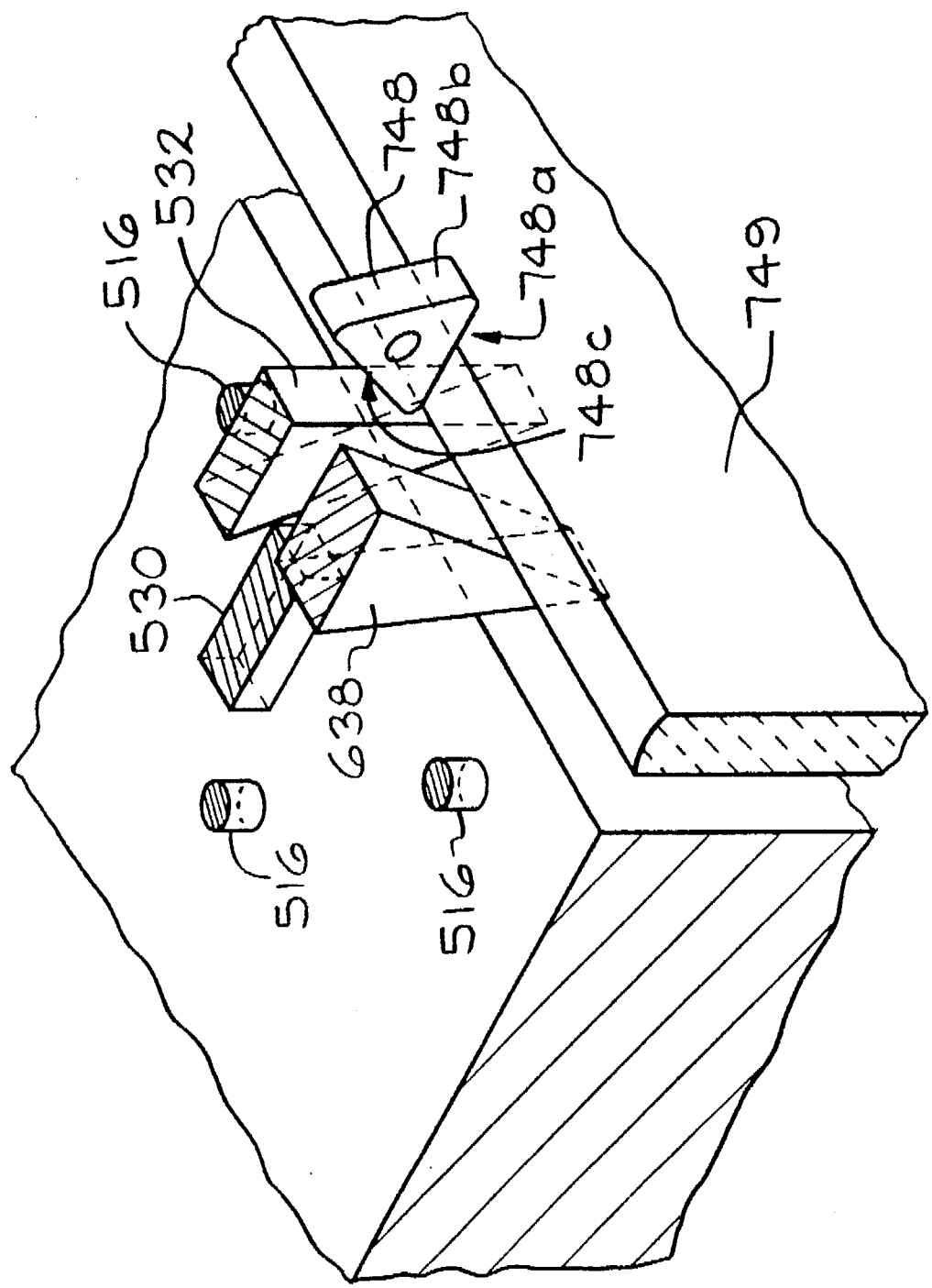
FIG. 51 is a view similar to FIG. 50, but showing a different type flush probe which is especially suited for measurement against abrasive surfaces such as an edge of a sheet of glass.

FIG. 51 is a view similar to that of FIG. 50, except showing a triangular contact tip 748 which is used in place of the contact tip 702. The triangular contact tip 748 has three surfaces 748a, 748b, and 748c which may be alternatively in measuring. When one of the surfaces 748a, 748b, and 748c become worn (for example, after repeated measurements of abrasive surfaces), the triangular contact tip 748 can be rotated to allow the use of another of the surfaces 748a, 748b, and 748c in contour measuring.

The triangular contact tip 748 is, of course, connected to move with the plunger 598 of the gap measuring element 528. For example, the triangular contact tip 748 may be connected by a suitably shaped connecting member to the probe arm 698 of the second support member 694, or the connecting member may be fixed directly to the first support member 682 in place of the second support member 694.

The triangular contact tip 748 is especially useful when measuring against narrow rounded surface such the edge surface of a sheet of glass 749, as shown in FIG. 51. With one of the surfaces 748a, 748b, and 748c locked facing the glass 749 and parallel to the plane defined by the vertical orientation pads 516, the highest point of the glass 749 will be measured by the contour measuring element 526, regardless of minor horizontal positioning changes of the measuring device 500 closer to or away from glass 749. Thus, in this situation the triangular contact tip 748 may be expected to produce improved repeatability of measurements compared to the results which may be expected using the rounded contact tip 702.

Figure 52:
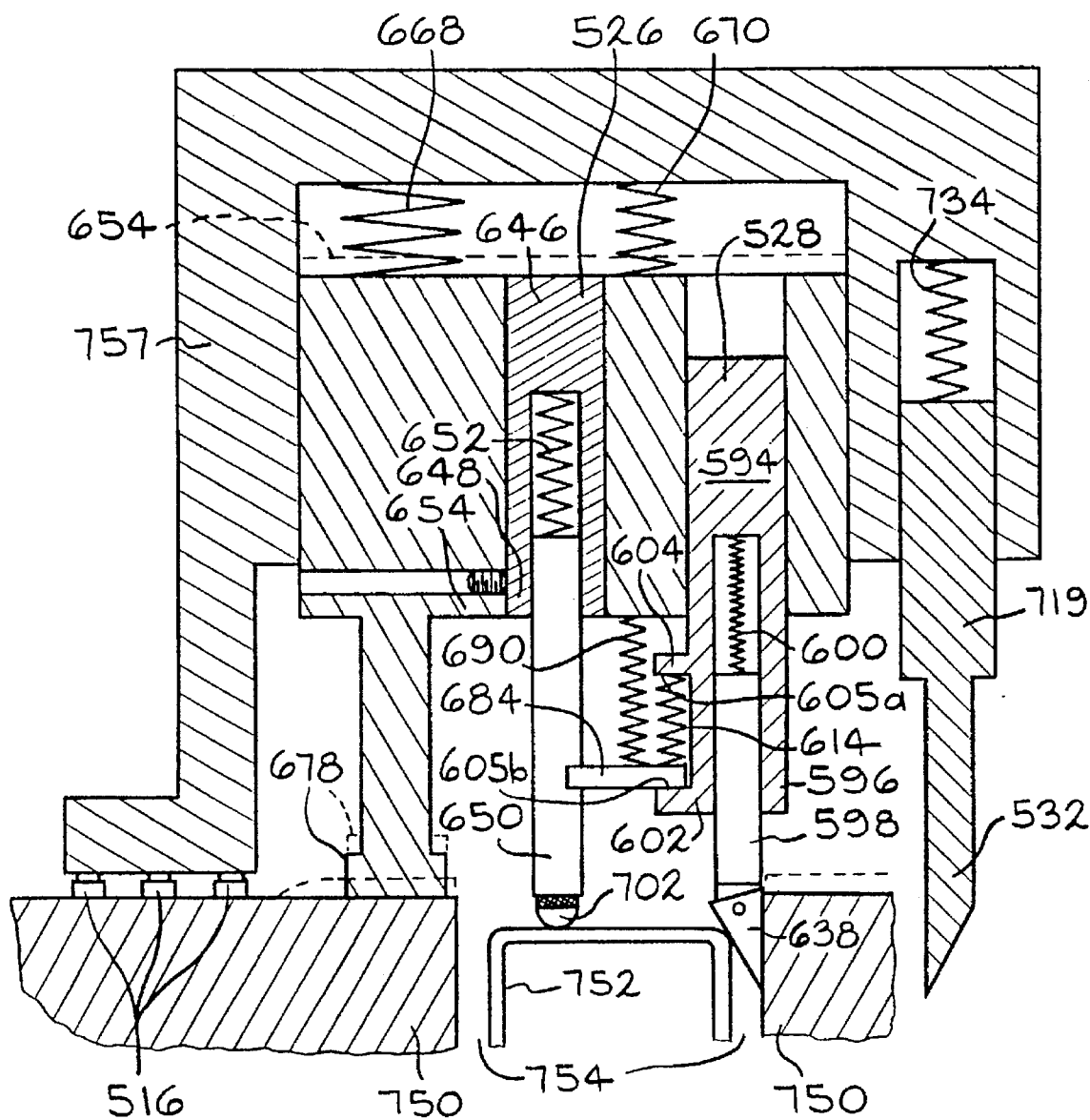
FIG. 52 is a schematic view of the measuring device positioned on a frame adjacent a part, with the part lower than the frame.
Figure 53:
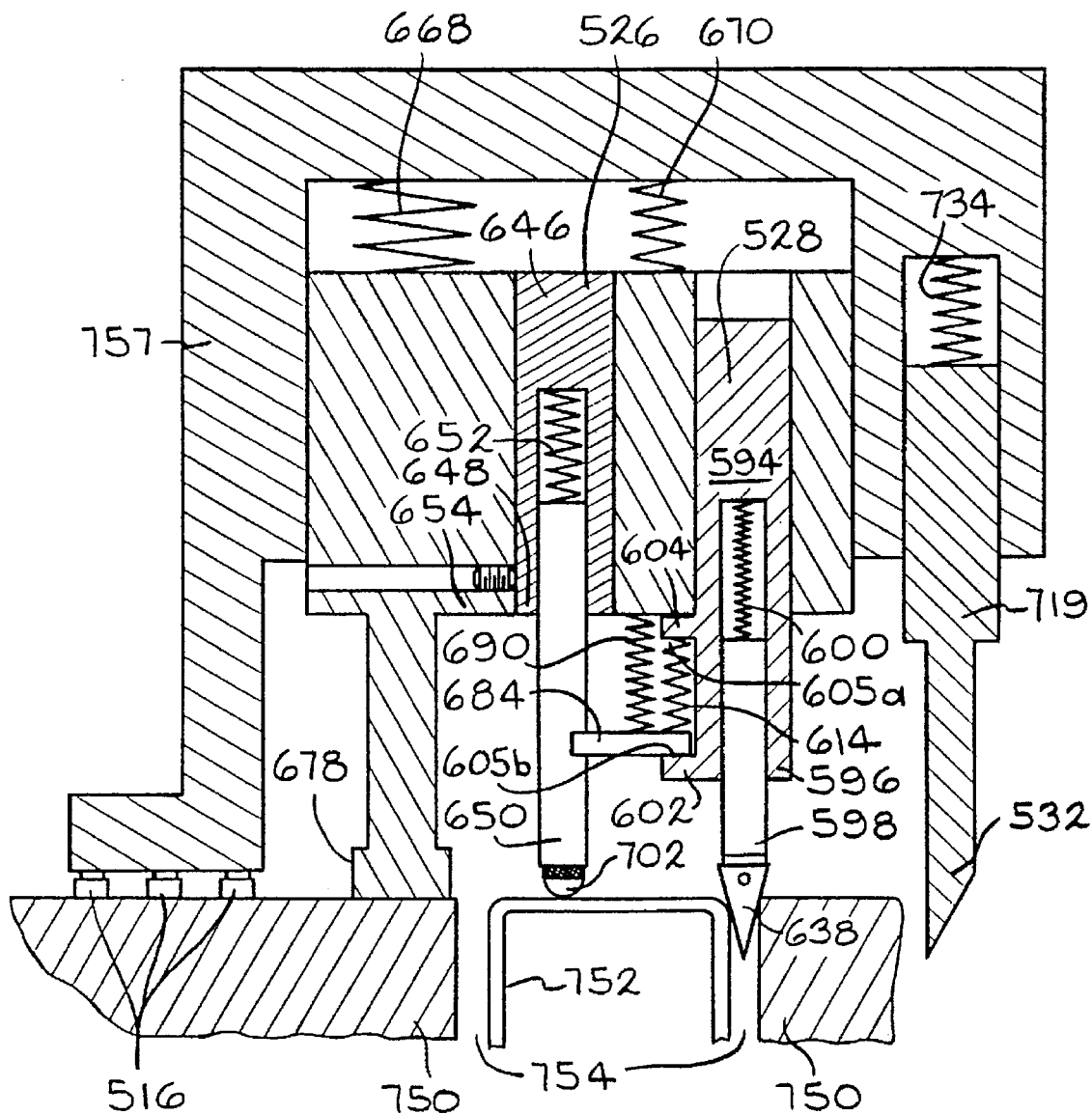
FIG. 53 is a view similar to FIG. 52 with the part flush with the frame.

FIGS. 52 through 54 are schematic views of the measuring device 500 positioned on a fixture 750 adjacent a part 752. In these schematic views, the measuring device 500 is shown with the various major components side by side, which is a distortion of the actual arrangement. As a result, what is actually a single gap 754 between the fixture 750 and the part 752 is shown schematically on both sides of the part 752. The gap locating wedge 532 is not shown within the gap 754, but, as described above, is actually located in the gap 754 adjacent the wedge 638 of the gap measuring element 528. The housing 502, the mounting ring 544 of the reference member 514, the mounting body 580, and the bearing plates 706 and 708, and similar components which are all fixed to one another, are schematically represented by a single combined member 757 All three vertical orientation pads 516 are shown adjacent one another on the fixture 750, but of course, are actually spaced apart to form a stable platform for supporting the measuring device 500.

It is important to understanding the operation of the measuring device 500 that the relative strength of the springs and spring pairs within the measuring device 500 be understood. The weakest spring is the spring 600 within the transducer housing 596 of the gap measuring element 528. The spring 652, within the transducer housing 648 of the contour measuring element 526, and the spring 690, acting between the clamp 654 and the arm 684, act in parallel but combine to form a spring pair which have the second weakest spring force. The spring 614 is stronger than the spring pair 652 and 690. Therefore, the arm 684 of the contour measuring element 526 will remain pressed against the surface 605b of the gap measuring element 528 and the transducer housing 596 will be moved in fixed relationship with the contour measuring element 526 as long as the contact tip 702 of the contour measuring element 526 is lower than the level of the reference shoe 678, as will be explained below. The strongest spring force is produced by the springs 668 and 670 acting in parallel as a spring pair.

Referring now to FIG. 52, the part 752 is shown lower than the fixture 750. As in the embodiments described above, the contour measuring element 526 of the measuring device 500 measures the difference in elevation between the upper surface of the fixture 750 and the upper surface of the part 752. The contour measuring element 526 transducer 646 generates a signal indicative of where the probe 650 is within its range of travel. If the contour measuring element 526 is calibrated to read zero when the contact tip 702 is at the same level as the reference shoe 678, the situation illustrated in FIG. 52 would generate a negative measurement, indicating the distance that the part 752 is lower than the fixture 750.

The gap measuring element 528 would generate a signal indicative of the position of the plunger 598 relative to the housing 596, which, as in the previously described embodiments, is directly related to the width of the gap 754. Note that the wedge 638 will orient itself in this situation to tilt backwards against the fixture 750. This helps assure repeatability of the measurements taken by the measuring device 500.

The dotted lines in FIG. 52 depict the situation where there is a difference in height between the plane defined by the three vertical orientation pads 516 and the surface of the fixture 750 in contact with the reference shoe 678. As will be appreciated, if the reference shoe 678 is higher, the clamp 654 and housing 648 of the contour measuring element 526 will also be higher, compressing the springs 68 and 670. However, the springs 652 and 690 will act to keep the plunger 650 pressed against the surface of the part 752, and so the plunger 650 will not be changed in height. The arm 684, which moves with the plunger 650, will keep the gap measuring element 528 stationary, with no change in the distance between the plunger 598 and the housing 596 of the gap measuring element 528. It will be when the part 752 is lower than the fixture 750, the zero point of the gap measuring element 528 is controlled by the position of the plunger 650 of the contour measuring element 526, not the position of the reference shoe 678.

In FIG. 53, the upper surface of the part 752 is shown flush with the upper surface of the fixture 750. The arm 684 remains pressed against the surface 605b of the clamp 602, so that the zero point of the gap measuring element 528 is still controlled by the position of the plunger 650 of the contour measuring element 526. Since the plunger 650 of the contour measuring element 526 is retracted further into the housing 648 of the contour measuring element 526, the reading of the contour measuring element 526 will change to indicate that the part 752 is flush with the fixture 750. The plunger 650 holds the housing 596 in the raised position, so the zero point of the gap measuring element 528 is moved upwardly compared to the position in FIG. 52. The plunger 598 is extended the same amount from the housing 596 as shown in FIG. 52, and the gap measuring element 528 will show that the gap 754, which is the same in FIGS. 52 and 53, is unchanged. Note that the proximal surface of the arm 604 abuts the distal surface of the flange 666 of the clamp 654 in this position. In this position the distal point of the contact tip 702 is in a plane perpendicular to the path of the contact tip 702, which plane is coplanar with the distal surface of the reference shoe 678. Note also that the wedge 638 self-orients itself to a vertical position within the gap 754 when the wedge 638 is inserted into the gap 754 in this situation.

FIG. 54 shows the part 752 above the fixture 750. The plunger 650 is retracted further into the housing 648. As a result, the contour measuring element 526 will be changed to reflect the difference in height between the part 752 and the fixture 750 in FIG. 54 and the part 752 and the fixture 750 in FIG. 53.

However, as noted above the housing 596 of the gap measuring element 528 is prevented from further upward movement by contact between the arm 604, which moves with the housing 596 of the gap measuring element 528, and the flange 666 of the clamp 654, which is connected to the reference shoe 678 in position against the upper surface of the fixture 750. Therefore, the housing 596 is unchanged in height in FIG. 54 compared to FIG. 53, and the zero point of the contour measuring element 526 is unchanged between the two figures. The zero point of the gap measuring element 528 is controlled by the position of the reference shoe 678 when the contact tip 702 is higher than the reference shoe 678. It will be appreciated that if the part 752 were to be further raised upwardly relative to the fixture 750, the contour measuring element 526 would see the probe 650 retracting within the housing 648, and would generate an appropriately changed reading. Note that the wedge 638 of the gap measuring element 528 is tilted so as to lie flush against the part 752. If the part 752 is moved upwardly, the part 752 would slide past the wedge 638 without pushing the wedge 638 upwardly. Thus the gap reading of the gap measuring element 528 would remain constant, reflecting the fact that raising the part 752 does not move it closer to the fixture 750.

In summary, the path of movement of the contact tip 702 of the contour measuring element 526 can be divided into a first region and a second region. The first region can be defined between the transducer housing 646 and a plane which includes the distal surface of the reference shoe 678 and which is perpendicular to path of the contact tip 702. The contact tip 702 is illustrated as being in the first region in FIG. 52, and is shown as being on the border between the first and second regions in FIG. 53. The second region can be defined as the remainder of the path of movement of the contact tip 702, that is, the region of movement of the contact tip 702 distally of the position shown in FIG. 53. The contact tip 702 is shown in the second region in FIG. 54.

The plunger 650 of the contour measuring element 526 is coupled to the transducer housing 596 of the gap measuring element 528 such that movement of the contact tip 702 in the second region causes the transducer housing 596 to move with the plunger 650. Moving the transducer housing 596 moves the zero point of the gap measuring element 528 relative to the housing 502 of the measuring device 500. The plunger 650 of the contour measuring element 526 is further coupled to the transducer housing 596 of the gap measuring element 528 such that the transducer housing 596 of the gap measuring element 528 remains in a fixed position relative to the transducer housing 648 of the contour measuring element 526 housing during movement of the contact tip 702 of the contour measuring element 526 in the first region. This is because contact between the proximal surface of the arm 604 and the distal surface of the flange 666 prevents further proximal movement of the transducer housing relative to the transducer housing 648.

Figure 55:
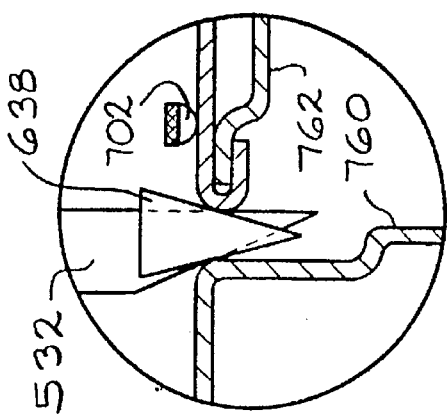
FIGS. 55 through 57 show the positioning of the wedge of the measuring device shown in FIG. 32 with a flat panel part positioned, respectively, higher, lower and flush with a reference surface of a second part.
Figure 56:
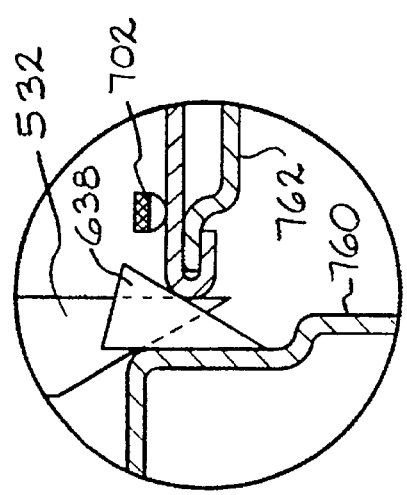
Figure 57:
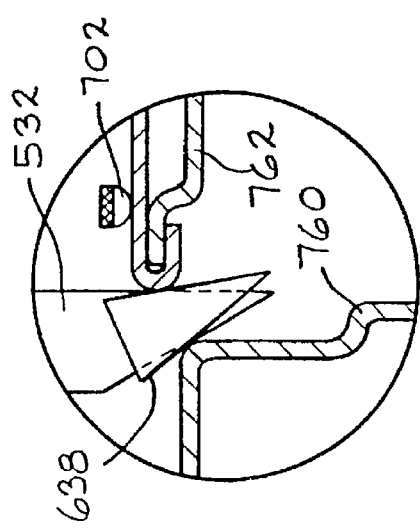

FIGS. 55, 56, and 57 illustrate the self-alignment of the wedge 638 when inserted between two exemplary sheet metal parts 760 and 762. The contact tip 702 bears against the part 762, while the part 760 is the reference part, and remains stationary in each of the FIGS. 55, 56, and 57. The gap locating wedge 532 is shown beside the wedge 638 of the gap measuring element 528 in the gap between the parts 760 and 762. Note that the wedge 638 is tilted so that the distal edge of the wedge 638 is closest to the lower of the two parts 760 and 762, if any. Note also that the depth of the wedge 638 within the gap between the parts 760 and 762 remains constant relative to the reference part 760. Thus the readings of the gap measuring element 528 would reflect the fact that in each of the situations illustrated in FIGS. 55, 56, and 57, the gap width is unchanged. Note that the non-tilting gap locating wedge 532 extends to different depths of the gap between the parts 760 and 762. Although this does not affect readings of either of the gap measuring element 528 or contour measuring element 526, it is useful to illustrate the error which would result if a gap measuring element had a rigid (non-tilting) wedge- or cone-shaped probe tip.

Figure 58:
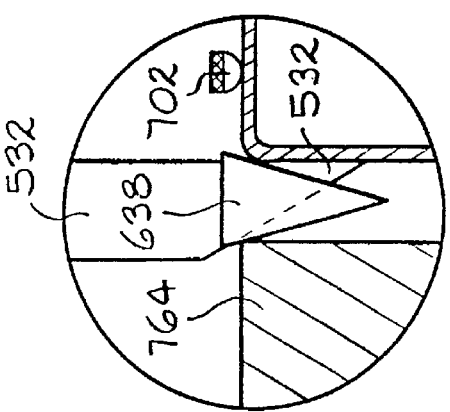
FIGS. 58 through 60 show the positioning of the wedge of the measuring device shown in FIG. 32 inserted into a gap between a part and a fixture, wherein the gap is sloping at various angles relative to the reference surface.
Figure 59:
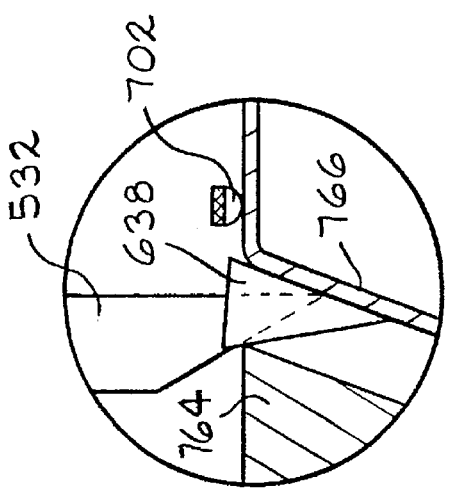
Figure 60:
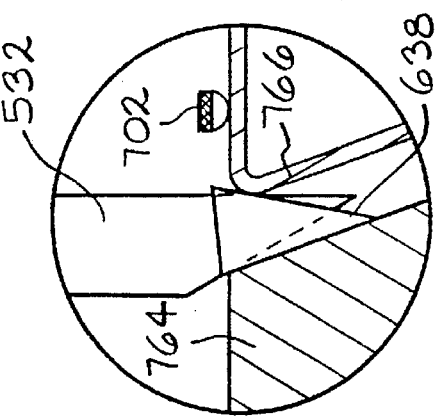

FIGS. 58, 59, and 60 are similar to FIGS. 55, 56, and 57, illustrating the measurement of a gap between a fixture 764 and a part 766. In each case, the part 766 is flush with the fixture 764, but the gap between the fixture 764 and the part 766 extends, respectively, rightward downwardly, leftward downwardly, and straight down. Note especially in FIG. 59 how the ability of the wedge 638 to tilt about a horizontal axis enables the wedge 638 to fully enter the gap between the fixture 764 and the part 766. In comparison the non-tilting gap locating wedge 532 enters the gap enough to help locate the measuring device 500 relative to the gap, but, because of contact with the part 766, is positioned significantly higher than the gap locating wedge 532 illustrated in the FIG. 60. If the wedge 638 of the gap measuring element 528 were similarly non-tilting, the transducer 594 of the gap measuring element 528 would erroneously indicate that the gap in FIG. 59 was much narrower than the gap actually is.

Figure 61:
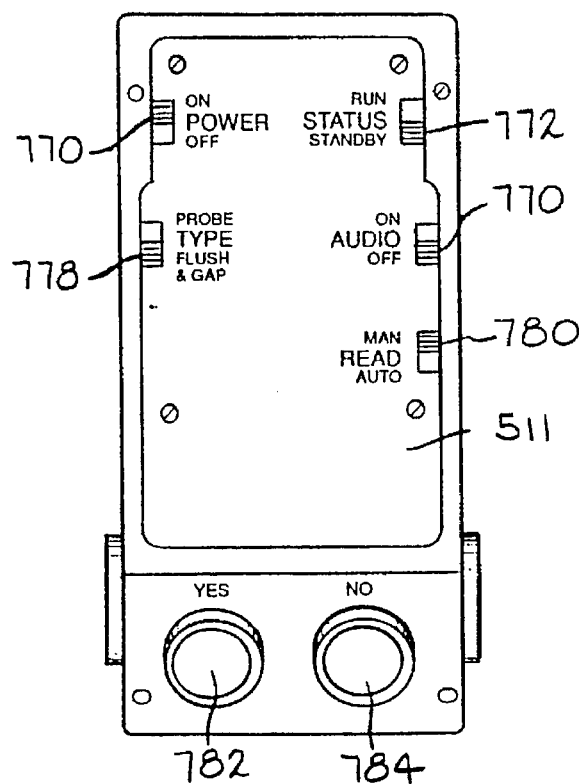
FIG. 61 is a plan view of the operating face of a display unit which may be used with the measuring device illustrated in FIGS. 32 through 60.
Figure 62:
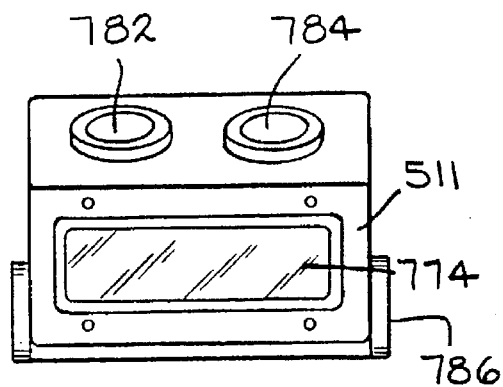
FIG. 62 is a view of the bottom of the display unit illustrated in FIG. 61.
Figure 63:
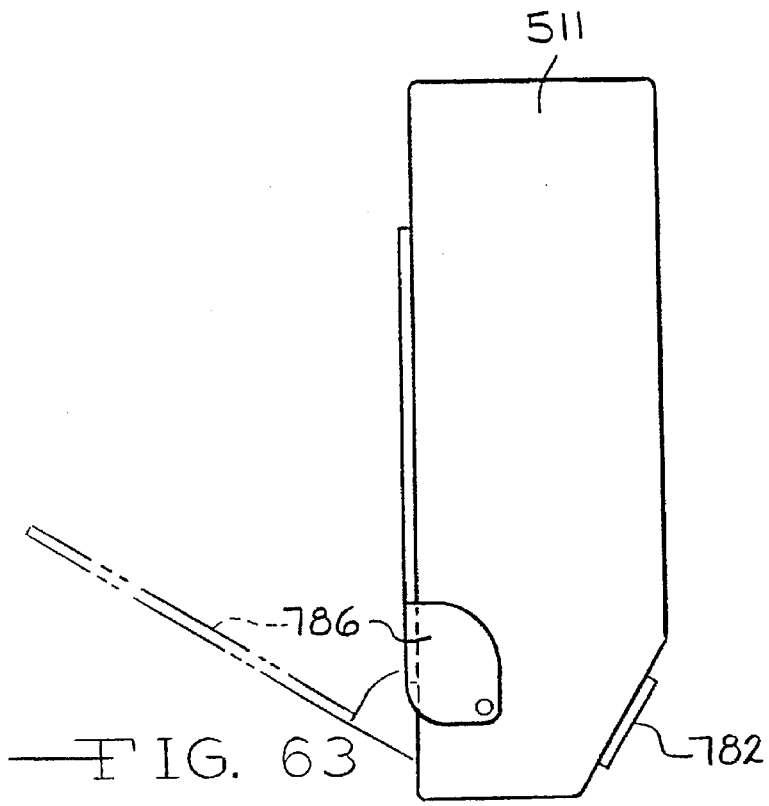
FIG. 63 is a side elevational view of the display unit illustrated in FIG. 61.

FIGS. 61 through 63 illustrate an embodiment of the display unit 511. The display unit 511 includes a power switch 770 which is used to turn off or on electrical power to the components of the display unit 511.

The display unit 511 also has a status switch 772 which may be switched between "Run" and "Standby" positions. In the "Run" position, the display unit 511 can store reading information in an on-board micro computer (if provided), display this information on a display screen 774 (seen in FIG. 62.), or transmit information via a radio link to a radio receiver (not shown). In the "Standby" position, relatively high power consumption uses such as transmitting or displaying information are terminated, but relatively low power consumption uses, such as data storage, are continued. The "Standby" position is used to conserve the power of the display unit 511 batteries (not shown).

The display unit 511 has an audio switch 776. With the audio switch 776 in the "On" position, the display unit 511 can provide audio cues about the status of taking measurements by the measuring device 500, such as readiness to take a contour and gap reading, and whether or not data is currently being acquired. Such audio cues may be any suitable cue, such as buzzes, chimes, or perhaps is synthesized voice cues.

A read switch 780 can be moved between "Manual" and "Automatic" positions. The function of the read switch 780 is similar to that of the auto/manual toggle switch 164 described above.

A type switch 778 has "Probe" and "Flush And Gap" positions. The display unit 778 can be simultaneously connected to the measuring device 500 and to a single probe such as a fixture mounted probe of one of the embodiments described in my co-pending U.S. patent application No. 08/253,770. The type switch 778 enables the user to select which of these sources of data is being recorded and displayed.

The display unit 511 also includes a Yes push-button 782 and a No push-button 784. The push-buttons 782 and 784 can be used to provide responses to questions displayed on the display screen 774 during operation of the display unit 511 and the measuring device 500. For example, it is anticipated that a computer similar to the microprocessor 159, which might be contained within the display unit 511 or the housing 502, would ask as part of an initializing subroutine whether a calibration should be performed. If the user decides that calibration of the measuring device 500 was not required, the No push-button 784 could be depressed to input that response to the computer. The push buttons 782 and 784 could also be used, for example, to scroll through and select items from a computer generated menu of actions to take, which menu could be displayed on the display screen 774.

The display unit 511 is preferably provided with a flap 786 which is pivotally connected to the sides of the case of the display unit 511. In the position illustrated shown in solid line in FIG. 63, the flap 786 can suitably be used to hang the display unit 511 from a user's belt. As shown by the dotted lines, the flap 786 could be pivoted to a position in which the flap 786 could be used to support the display unit 511 at a convenient angle on a table top.

Figure 64:
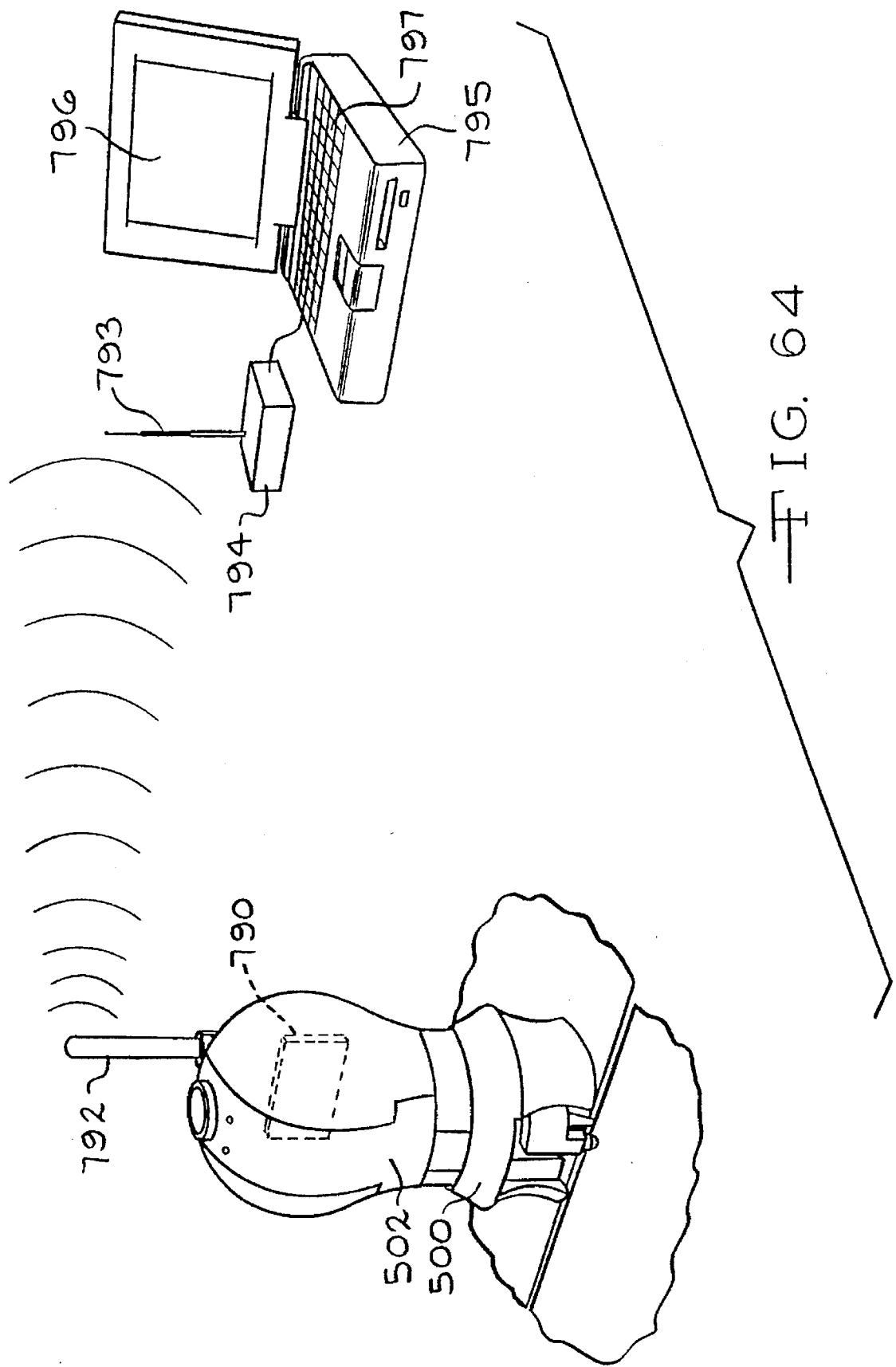
FIG. 64 is a schematic view of the measuring device of this invention wirelessly linked to a remote computer.

As indicated above, it is contemplated that the measuring device 500 may be directly linked by radio or other wireless communication method to a separate microcomputer. As illustrated in FIG. 64, a radio transceiver or other communicator 790 is contained within the housing 502 of the measuring device 500. The communicator 790 is preferably includes a microcomputer within the housing 502 which is interfaced with the transducer 594 of the gap measuring element 528, the transducer 646 of the contour measuring element 528, the LEDs 506 and 508, the tape switch 504, the manual record switch 505, and the electrical circuit containing the contacts 548. It is also contemplated that a number of the switches and perhaps the display screen 774 of the display unit 511 may be mounted on the housing 502 of the measuring device 500, and interfaced with the microcomputer oft he communicator 790.

The communicator 790 is provided with an antenna 792. While the antenna 792 is shown as external to the housing 502, the antenna 792 may be mounted internally to the housing 502, provided that appropriate provisions are made to ensure that the signal from the antenna 792 will propagate to the antenna 793 of a second transceiver 794 when the antennas 792 and 793 are positioned a desired distance apart.

The transceiver 794 is coupled to a microcomputer 795 having a display screen 796 and a keyboard 797. Note that while a laptop type computer 795 is illustrated, any suitable computer 795 may be used. For example, the computer 795 may be a rack-mounted computer designed or modified for extended use in a harsh industrial environment. The computer 795 may be used to record, analyze, and display data transmitted from the measuring device 500 on the screen 796. The keyboard 797 may be used, for example, to enter programming changes or commands, which are then transmitted to the communicator 790 within the measuring device 500, and input into the computer therein.

While the invention has been described using a wedge, such as the wedge is 638, as a gap measuring element. However, geometrical shapes other than wedges are contemplated for this use. For example, the wedge 638 may suitably be replaced with a conical probe element. Such a conical probe element should be mounted to enable tilting about a horizontal axis. However, it will be appreciated that such a cone would not have to be pivotable along its longitudinal axis, since all diameters in any single transverse section through the cone would be equal. Thus, instead of being pivotally mounted to the third intermediate member 634 by the fastener 640, as was the wedge 638, such a cone could be fixed to the third intermediate member 634 or even integrally formed on the third intermediate member 634.

The principle and mode of operation of the present invention have been explained and illustrated in the preferred embodiment, however, it will be understood that the present invention may be practiced otherwise than as specifically explained and illustrated without departing from its spirit or scope.

What is claimed is:

1. A device for simultaneously measuring a gap between spaced apart opposed surfaces and a contour between adjacent outwardly facing surfaces of a first part and a second part, comprising:

a main body;

a gap measuring element supported relative to said main body and movable along a first path relative to a first reference member carried by said main body, said first reference member being selectively engagable with one of the first and second parts, said gap measuring element insertable into the gap for engagement with both of the first and second parts, said gap measuring element coupled to a first transducer for generating a first signal representative of the relative position of said gap measuring element along said first path and proportional to the gap between the opposed surfaces; and a contour measuring element supported relative to said main body and movable along a second path relative to a second reference member carded by said main body, said second reference member being selectively engagable with the outwardly facing surface of one of the first and second parts, said contour measuring element engagable with the outwardly facing surface of the other of the first and second parts, said contour measuring element coupled to a second transducer for generating a second signal representative of the relative position of said contour measuring element along said second path and proportional to the contour of the adjacent outwardly facing surfaces.

2. The device of claim 1 wherein said gap measuring element includes a wedge having a pair of angled surfaces, said wedge being insertable into the gap for engagement of each of said angled surfaces with a respective one of the opposed surfaces, said wedge being movable along said first path relative to said first reference member.

3. The device of claim 2 wherein said second reference member is combined with said first reference member to form a unitary reference member.

4. The device of claim 3 wherein said first and second paths are parallel linear paths, and wherein said main body includes a base which carries said unitary reference member and a head which carries said wedge, said contour measuring element, and said first and second transducers, and wherein said head is slidably mounted relative to said base along an axis generally perpendicular to said paths.

5. The device of claim 3 wherein said unitary reference member includes a plurality of spaced apart vertical orientation pads for engagement with the outwardly facing surface of the one of the first and second parts for stabilizing said main body relative to the one of the first and second parts.

6. The device of claim 5 including means for generating a signal when all of said vertical orientation pads are in engagement with the outwardly facing surface of the one of the first and second parts.

7. The device of claim 2 wherein said first path is a linear path, and wherein said wedge is pivotable about an axis parallel to said first path.

8. The device of claim 2 wherein said first path is a linear path, and wherein said wedge is tiltable about an axis perpendicular to said first path.

9. The device of claim 1 wherein said main body is adapted to be hand-held by an operator to hold said first reference member in engagement with the one of the first and second parts.

10. A device for measuring a gap between the spaced apart opposed surfaces of two parts comprising:

a main body having a reference member engagable with an outwardly facing surface of one of the parts; and a wedge supported relative to said main body and having a pair of angled planar surfaces, said wedge insertable into the gap for engagement of each of said angled planar surfaces with a respective one of the opposed surfaces, said wedge movable relative to said reference member along a predetermined path, said wedge coupled to a transducer for generating a signal representative of the relative position of said wedge along said path and proportional to the gap between the opposed surfaces.

11. The device of claim 10 wherein said path is a linear path, and. wherein said main body includes a base which carries said reference member, said wedge, and said transducer, and wherein said wedge is movable relative to said base along an axis generally perpendicular to said path.

12. The device of claim 10 wherein said first reference member includes a plurality of spaced apart pads for engagement with the outwardly facing surface of the one part for stabilizing said main body relative to the one part.

13. The device of claim 12 including an indicator automatically generating a signal when all of said pads are in engagement with the outwardly facing surface of the one part.

14. The device of claim 10 wherein said path is a linear path, and wherein said wedge is pivotable about an axis parallel to said path.

15. The device of claim 10 wherein said path is a linear path, and wherein said wedge is tiltable about an axis perpendicular to said path.

16. The device of claim 15 wherein said wedge is pivotable about an axis parallel to said path.

17. The device of claim 10 wherein said main body is adapted to be hand-held by an operator to hold said reference member in engagement with the one part.

18. The device of claim 10 including an intermediate member coupling said main body and said wedge to permit movement of said wedge relative to said reference member along a second path perpendicular to said predetermined path, whereby said wedge can be inserted into the gap between the two parts with said reference member positioned at one of a plurality of distances from the gap.

19. The device of claim 18 wherein said intermediate member is pivotally connected to said main body at a first pivot and pivotally connected to said wedge at a second pivot.

20. The device of claim 19 wherein said first pivot has threads and said second pivot has threads with the same pitch as the first pivot.

21. A device for measuring a gap between spaced apart opposed surfaces of a first part and a second part, comprising:

a main body;

a gap measuring element supported relative to said main body and insertable into the gap for engagement with at least one of the first and second parts, said gap measuring element mounted to be movable along a path relative to a reference member carded by said main body and engagable with the other of the first and second parts, said gap measuring element coupled to a transducer for generating a signal representative of the relative position of said element along said path and proportional to the gap between the facing surfaces; and an indicator for automatically indicating when said reference member is in engagement with one of the first and second parts.

22. The device of claim 21 wherein said indicator comprises at least one electrical switch in an electrical circuit, which switch changes state when said reference member engages the one of the first and second parts.

23. A device for measuring a contour between adjacent outwardly facing surfaces of a first part and a second part, comprising:

a main body;

a contour measuring element supported relative to said main body and engagable with the outwardly facing surface of one of the first and second parts, said contour measuring element mounted to be movable along a path relative to a reference member carried by said main body and engagable with the outwardly facing surface of the other of the first and second parts, said contour measuring element coupled to a transducer for generating a signal representative of the relative position of said element along said path and proportional to the contour of the adjacent outwardly facing surfaces; and an indicator for automatically indicating when said reference member is in engagement with one of the first and second parts.

24. The device of claim 23 wherein said indicator comprises at least one electrical switch in an electrical circuit, which switch changes state when said reference member engages the one of the first and second parts.

25. A device for simultaneously measuring a gap between spaced apart opposed surfaces and a contour between adjacent outwardly facing surfaces of a first part and a second part, comprising:

a main body being selectively engagable with one of the first and second parts;

a tapered gap measuring element supported relative to said main body and movable along a first path relative to said main body, said tapered gap measuring element insertable into the gap for engagement with both of the first and second parts;

a first transducer including a first housing and a first plunger reciprocably received within said first housing, said first plunger coupled to said gap measuring element for generating a first signal representative of the relative position between said first housing and said gap measuring element;

a contour measuring element supported relative to said main body and movable along a second path relative to said main body, said contour measuring element engagable with the outwardly facing surface of the other of the first and second parts; and a second transducer including a second housing, a second plunger reciprocably received within said second housing, and a reference shoe, said reference shoe engaging said outwardly facing surface of the one of the first and second parts to hold said housing of said second transducer in a fixed position relative to the one of the first and second parts, said second plunger coupled to said contour measuring element for generating a second signal representative of the position of said contour measuring element relative to said second housing along said second path relative to said transducer, said second path being divided into a first region and a second region, said first region being defined between said second transducer housing and a plane which includes said reference shoe and is perpendicular to said second path, a second region being defined as the remainder of said second path, said second plunger being coupled to said first transducer housing such that movement of said contour measuring element in said second region causes said first housing to move with said second plunger, and such that said second housing remains in a fixed position relative to said first housing during movement of said contour measuring element in said first region.

26. The device of claim 25 wherein said main body is supported on the one of the first and second parts by a plurality of pads, said reference shoe being movable relative to said pads.

27. A hand-held device for measuring a distance between two parts, comprising:
a body held in contact with one of the parts;
a transducer mounted on said body having a probe movable relative to said body to contact at least the other of the parts, said transducer producing a signal representative of a relative distance between the two parts;
a first computer operatively connected to said transducer for processing said signal as data; and
a second computer wirelessly linked to said first computer to receive data from said first computer.

28. The device of claim 27 wherein said second computer is capable of transmitting programming instructions to said first computer.

29. The device of claim 27 wherein said relative distance is a contour measurement of the two parts.

30. The device of claim 29, further including a second transducer having a probe movable relative to said body and having a tapered portion, said tapered portion of said probe being inserted into a gap between the two parts and contacting each of the parts, said second transducer producing a second signal representative of the width of the gap between the two parts, said second signal being an input to said first computer.

31. The device of claim 27, further including a data display unit separate from said housing for displaying said data on a display screen, said first computer being mounted in said data display unit and connected to said transducer by electrical wires.

32. A device for simultaneously measuring a gap between spaced apart opposed surfaces and a contour between adjacent outwardly facing surfaces of a first part and a second part, comprising:
a main body;
a gap measuring element supported relative to said main body and movable along a first path relative to a first reference member carried by said main body, said first reference member being selectively engagable with the first part, said gap measuring element having a contact portion engagable with the second part, said gap measuring element being coupled to a first transducer for generating a first signal representative of the position of said gap measuring element along said first path relative to said first reference member and related according to a known relationship to the gap between the opposed surfaces; and
a contour measuring element supported relative to said main body and movable along a second path relative to a second reference member carried by said main body, said second reference member being selectively engagable with the first part, said contour measuring element having a contact portion which is movable relative to said contact portion of said gap measuring element and which is selectively engagable with the second part, said contour measuring element being coupled to a second transducer for generating a second signal representative of the position of said contour measuring element along said second path relative to said second reference member and related according to a known relationship to the contour of the adjacent outwardly facing surfaces.

33. The device of claim 32 wherein said contour measuring element is supported on said body independently of said gap measuring element.

34. The device of claim 32 wherein said second reference member includes a plurality of spaced apart pads for engaging the first part for stabilizing said main body relative to the first part.

35. A device for simultaneously measuring a gap between spaced apart opposed surfaces and a contour between adjacent outwardly facing surfaces of a first part and a second part, comprising:
a main body;
a contour measuring element supported relative to said main body and movable relative to a first reference member carried by said main body, said first reference member being selectively engagable with the first part, said contour measuring element having a contact portion which is selectively engagable with the second part, said contour measuring element being coupled to a first transducer for generating a first signal representative of the position of said contour measuring element relative to said first reference member and related according to a known relationship to the contour of the adjacent outwardly facing surfaces; and
a gap measuring element supported relative to said main body and movable relative to a second reference member carded by said main body, said second reference member being selectively engagable with the first part, said gap measuring element having a contact portion movable independently of said contact portion of said contour measuring element and which is engagable with the second part, said gap measuring element being coupled to a second transducer for generating a second signal representative of the position of said gap measuring element relative to said second reference member and related according to a known relationship to the gap between the opposed surfaces.

36. The device of claim 35 wherein said gap measuring element is supported on said body independently of said contour measuring element.

37. The device of claim 35 wherein said second reference member includes a plurality of spaced apart pads for engaging the first part for stabilizing said main body relative to the first part.

38. The device of claim 35 wherein said second reference member is combined with said first reference member to form a unitary reference member.

39. The device of claim 38 wherein said unitary reference member includes a plurality of spaced apart pads for engaging the first part for stabilizing said main body relative to the first part.

40. The device of claim 39 including means for generating a signal when all of said pads are in engagement with the first part.

* * * * *

UNITED STATES PATENT AND TRADEMARK OFFICE
CERTIFICATE OF CORRECTION

PATENT NO. : 5,657,550
DATED : August 19, 1997
INVENTOR(S) : James E. Struble

It is certified that error appears in the above-identified patent and that said Letters Patent is hereby corrected as shown below:

Column 32, Claim 1, Line 19,  after "member", change "carded" to -- carried --.

Column 33, Claim 11, Line 2,  change "and." to -- and --.

Column 34, Claim 21, Line 9,  after "member", change "carded" to -- carried --.

Column 36, Claim 35, Line 20, after "ber", change "carded" to -- carried --.

Signed and Sealed this

Twenty-seventh Day of October, 1998

Attest:

BRUCE LEHMAN

Attesting Officer

Commissioner of Patents and Trademarks